US009715187B2

(12) United States Patent
Mukumoto et al.

(10) Patent No.: US 9,715,187 B2
(45) Date of Patent: Jul. 25, 2017

(54) METHOD OF PRODUCING A COMPOUND HAVING A COLORANT STRUCTURE, AND TONER CONTAINING A COMPOUND OBTAINED BY THE PRODUCTION METHOD

(71) Applicant: CANON KABUSHIKI KAISHA, Tokyo (JP)

(72) Inventors: Kosuke Mukumoto, Yokohama (JP); Yasuaki Murai, Kawasaki (JP); Yuki Hasegawa, Yokohama (JP); Takayuki Toyoda, Yokohama (JP); Ayano Mashida, Kawasaki (JP); Waka Hasegawa, Tokyo (JP); Chiaki Nishiura, Kawasaki (JP); Masanori Seki, Yokohama (JP); Masashi Hirose, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 100 days.

(21) Appl. No.: 14/673,860

(22) Filed: Mar. 30, 2015

(65) Prior Publication Data

US 2015/0277254 A1    Oct. 1, 2015

(30) Foreign Application Priority Data

Apr. 1, 2014    (JP) ................. 2014-075124

(51) Int. Cl.
| | |
|---|---|
| G03G 9/09 | (2006.01) |
| C08F 112/08 | (2006.01) |
| C09B 67/00 | (2006.01) |
| C09B 67/22 | (2006.01) |
| C09B 69/10 | (2006.01) |

(52) U.S. Cl.
CPC .......... *G03G 9/0924* (2013.01); *C08F 112/08* (2013.01); *C09B 67/0041* (2013.01); *C09B 67/0046* (2013.01); *C09B 67/0051* (2013.01); *C09B 68/41* (2013.01); *C09B 69/106* (2013.01); *G03G 9/0906* (2013.01)

(58) Field of Classification Search
CPC ............................. G03G 9/0924; C08F 112/08
See application file for complete search history.

(56) References Cited

U.S. PATENT DOCUMENTS

| 7,250,479 B2 | 7/2007 | Le et al. |
|---|---|---|
| 8,377,616 B2 | 2/2013 | Tani et al. |
| 8,628,899 B2 | 1/2014 | Kawamura et al. |
| 8,815,485 B2 | 8/2014 | Tanaka et al. |
| 2013/0224645 A1* | 8/2013 | Toyoda ............ G03G 9/08 430/108.22 |

FOREIGN PATENT DOCUMENTS

| CN | 103097341 | 5/2013 |
|---|---|---|
| CN | 103097465 | 5/2013 |
| CN | 103124773 | 5/2013 |
| EP | 2 581 790 A1 | 4/2013 |
| JP | 3-113462 A | 5/1991 |
| JP | 6-148927 A | 5/1994 |
| JP | 2000-515181 A | 11/2000 |
| JP | 2006-30760 A | 2/2006 |
| JP | 2012-67285 A | 4/2012 |
| JP | 2012-77297 A | 4/2012 |
| WO | 2009/060886 A1 | 5/2009 |
| WO | 2013/129639 A1 | 9/2013 |
| WO | 2013/129695 A1 | 9/2013 |
| WO | 2013/129696 A1 | 9/2013 |

OTHER PUBLICATIONS

Niederl, et al., "Disproportionation in Aryloxymalonic Acid Syntheses", Journal of American Chemical Society, vol. 62, 1940, pp. 1154-1156.
Kamigaito, et al., "Metal-Catalyzed Living Radical Polymerization", Chemical Reviews, vol. 101, No. 12, 2001, pp. 3689-3745.
Lacroix-Desmazes, et al., "Reverse Iodine Transfer Polymerization of Methyl Acrylate and n-Butyl Acrylate", Macromolecules, vol. 38, 2005, pp. 6299-6309.
Sheehan, et al., "A Convenient Synthesis of Water-Soluble Carbodiimides", J. Org. Chem., vol. 26, No. 7, 1961, pp. 2525-2528.
Sonntag, "The Reactions of Aliphatic Acid Chlorides", Chem. Rev., vol. 52, No. 2, 1953, pp. 237-416.
Ponde, et al., "Selective Catalytic Transesterification, Transthiolesterification, and Protection of Carbonyl Compounds over Natural Kaolinitic Clay", J. Org. Chem., vol. 63, No. 4, 1998, pp. 1058-1063.
Kumar, et al., "Knorr Cyclizations and Distonic Superelectrophiles", J. Org. Chem., vol. 72, 2007, pp. 9761-9764.
Jikken Kagaku Koza (Experimental Chemistry Guide Book), Maruzen Co., Ltd., 1st edition, vol. 17-2, pp. 162-179.

(Continued)

*Primary Examiner* — Robert Harlan
(74) *Attorney, Agent, or Firm* — Fitzpatrick, Cella, Harper & Scinto

(57) ABSTRACT

Provided are a method of producing a compound having a colorant structure suitable for a pigment dispersant, and a pigment dispersant, a pigment composition, a pigment dispersion, and a toner each containing the compound. The production method is a method of producing a compound in which a polymer portion and a colorant portion are bonded to each other through a linking group, the method including the steps of: (a) polymerizing a vinyl-based polymerizable monomer represented by the formula (A) with a radical initiator having a protective group by living radical polymerization to provide a polymer having the protective group at a terminal thereof; (b) hydrolyzing the protective group of the polymer having the protective group at a terminal thereof obtained by the step (a) to deprotect the polymer; and (c) bonding the deprotected polymer obtained by the step (b) and a colorant to each other through a covalent bond.

8 Claims, 5 Drawing Sheets

(56) References Cited

OTHER PUBLICATIONS

Shin Jikken Kagaku Koza (New Experimental Chemistry Guide Book), Maruzen Co., Ltd., 1st edition, vol. 15, pp. 390-448.
Hashimoto, "Organic Pigments Handbook", 2006, pp. 510-577.
Peyser, "Glass Transition Temperatures of Polymers", Polymer Handbook, Brandrup, et al. (eds.), Third Edition, 1989, pp. VI 209-VI 277.
European Search Report dated Aug. 12, 2015 in European Application No. 15161850.1.

\* cited by examiner

METHOD OF PRODUCING A COMPOUND HAVING A COLORANT STRUCTURE, AND TONER CONTAINING A COMPOUND OBTAINED BY THE PRODUCTION METHOD

BACKGROUND OF THE INVENTION

Field of the Invention

The present invention relates to a method of producing a compound having a colorant structure suitable for a pigment dispersant, a pigment dispersant containing the compound, a pigment composition containing the pigment dispersant, and a pigment dispersion and a toner each containing the pigment composition.

Description of the Related Art

The dispersion of a pigment having a small particle diameter in a medium such as an organic solvent or a molten resin is liable to be insufficient because a cohesive force between the particles of the pigment tends to be strong. Accordingly, the use of a dispersant for dispersing the pigment together with the pigment has been proposed for improving the dispersibility of the pigment.

A dispersant obtained by bonding, to a terminal of a polymer that imparts dispersibility in a medium, a compound having a high affinity for a pigment has heretofore been used as a dispersant having high dispersibility. For example, Japanese Patent Application Laid-Open No. 2012-077297 discloses an example in which a dispersant obtained by bonding, to a terminal of a polymer obtained by radical polymerization involving using a thiol-based transfer agent, a colorant compound having a high affinity for a pigment is used for improving the dispersibility of the pigment in toner, and a method of producing the dispersant.

As described above, various dispersants have been proposed in toners of respective colors such as yellow, magenta, cyan, and black colors in order to improve the dispersibility of a pigment in a toner particle.

Japanese Patent Application Laid-Open No. 2012-067285 discloses an example in which a compound having a colorant skeleton structure is used as a dispersant for improving the dispersibility of an azo-based pigment in a yellow toner, and a method of producing the compound. Japanese Patent Application Laid-Open No. 2006-030760 discloses that a specific polyester-based dispersant is used for improving the dispersibility of a magenta pigment in a magenta toner. Japanese Patent Application Laid-Open No. H03-113462 discloses that a polymer containing sodium styrene sulfonate as a monomer unit is used as a dispersant for improving the dispersibility of a phthalocyanine pigment in a cyan toner. Japanese Patent Application Laid-Open No. H06-148927 discloses that a copolymer formed of a styrene-based monomer and an acrylic acid ester-based (or methacrylic acid ester-based) monomer is used as a dispersant for improving the dispersibility of carbon black in a black toner.

SUMMARY OF THE INVENTION

However, in the production method described in Japanese Patent Application Laid-Open No. 2012-077297, the ratio at which the colorant compound is introduced to the polymer is not sufficient. Accordingly, under a predetermined environment, only the polymer single body is present in the pigment dispersant and hence the amount of the dispersant to be added needs to be increased for obtaining a certain level of pigment dispersibility. Accordingly, concern has been raised in that the addition of an excessive amount of the dispersant affects characteristics to be required depending on applications.

In addition, in each of the methods described in Japanese Patent Application Laid-Open No. 2012-067285, Japanese Patent Application Laid-Open No. 2006-030760, Japanese Patent Application Laid-Open No. H03-113462, and Japanese Patent Application Laid-Open No. H06-148927 as well, the amount of the dispersant to be added needs to be increased for obtaining a certain level of pigment dispersibility, and hence a pigment dispersant having an additionally high dispersing effect and a method of producing the dispersant have been required.

Therefore, an object of the present invention is to provide a method of producing a compound that can improve the dispersibility of each of pigments of respective colors such as yellow, magenta, cyan, and black colors. Moreover, an object of the present invention is to provide a pigment dispersant that can improve the dispersibility of each of pigments of respective colors such as yellow, magenta, cyan, and black colors. Another object of the present invention is to provide a pigment composition, a pigment dispersion, and a toner each having satisfactory coloring power.

The above-mentioned objects are achieved by the present invention described below. That is, according to a first embodiment of the present invention, there is provided a method of producing a compound represented by the following formula (1), including the steps of:

(a) polymerizing a vinyl-based polymerizable monomer represented by the formula (A) with a radical initiator having a protective group by living radical polymerization to provide a polymer having the protective group at a terminal thereof;

(b) hydrolyzing the protective group of the polymer having the protective group at a terminal thereof obtained by the step (a) to deprotect the polymer; and (c) bonding the deprotected polymer obtained by the step (b) and a colorant to each other through a covalent bond:

$$X\text{-}L\text{-}Y \qquad \text{formula (1)}$$

in the formula (1), X represents a polymer portion having a monomer unit derived from the vinyl-based polymerizable monomer represented by the following formula (A), L represents a linking group, and Y represents a colorant portion;

formula (A)

in the formula (A), $R_1$ represents a hydrogen atom or an alkyl group, and $R_2$ represents a phenyl group, a phenyl group having a substituent, a carboxy group, an alkoxycarbonyl group, or a carboxamide group.

In addition, a second embodiment of the present invention relates to a toner, including toner particles each containing a binder resin, a pigment and a compound produced by aforementioned method.

The production method according to the embodiment of the present invention enables the introduction of a colorant having a high affinity for a pigment to a polymer terminal at a high introduction ratio. Accordingly, the compound that improves the dispersibility of each of pigments of respective colors such as yellow, magenta, cyan, and black colors can be obtained. In addition, the pigment composition, pigment dispersion, and toner obtained by the production method according to the embodiment of the present invention can each have satisfactory coloring power.

Further features of the present invention will become apparent from the following description of exemplary embodiments with reference to the attached drawings.

DESCRIPTION OF THE EMBODIMENTS

Figure 1:
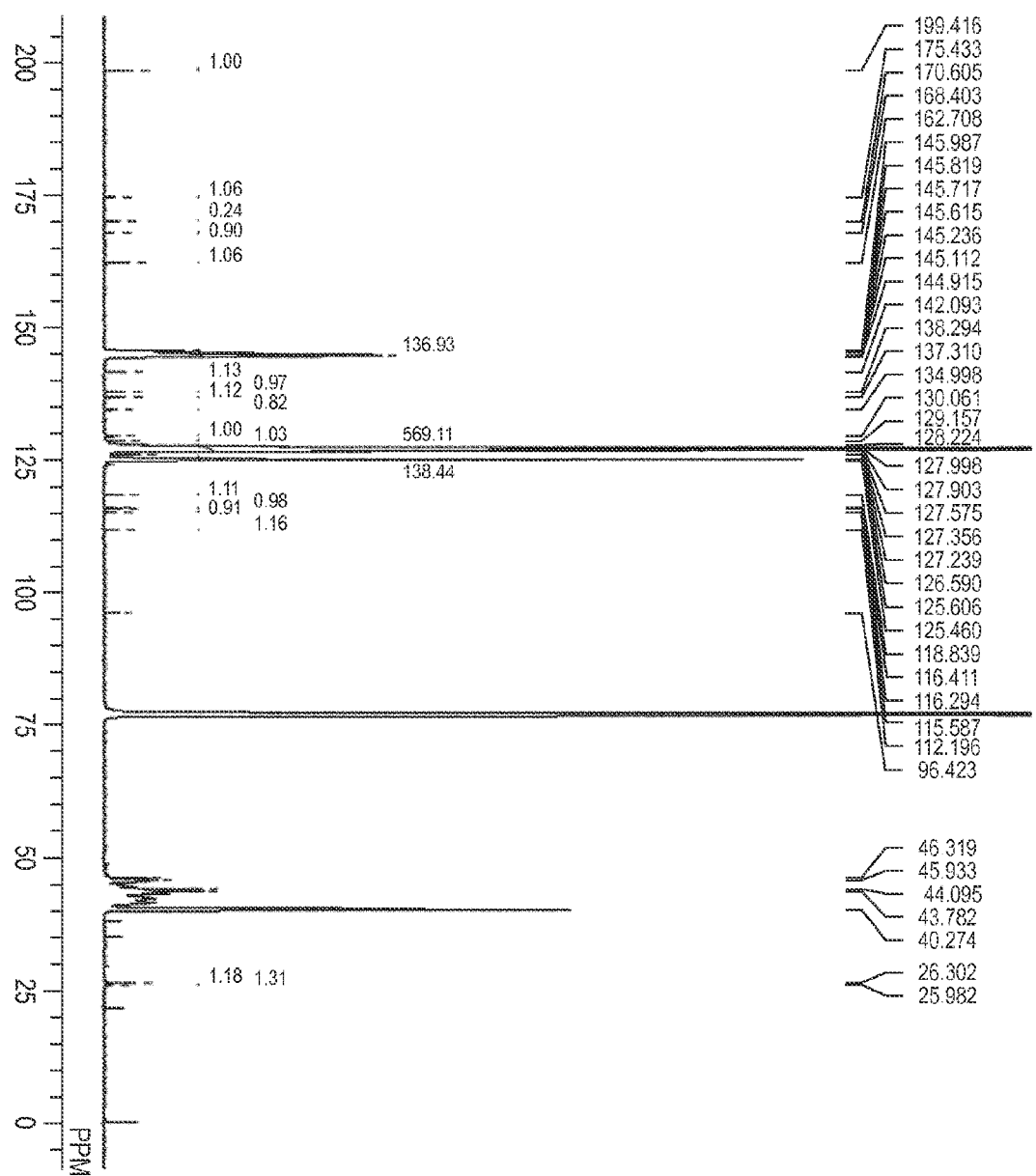
FIG. 1 shows the $^{13}$C NMR spectrum of a compound (102) of the present invention in CDCl$_3$ at room temperature and 150 MHz.

Now, the present invention is described in detail by way of a preferred embodiment.

A production method of the present invention is a method of producing a compound represented by the following formula (1), the method including the steps of:

(a) polymerizing a polymerizable monomer represented by the formula (A) with a radical initiator having a protective group by living radical polymerization to provide a polymer having the protective group at a terminal thereof;

(b) hydrolyzing the polymer having the protective group at a terminal thereof obtained by the step (a) to deprotect the polymer; and (c) bonding the deprotected polymer obtained by the step (b) and a colorant to each other through a covalent bond.

X-L-Y    formula (1)

[In the formula (1), X represents a polymer portion having a monomer unit derived from a vinyl-based polymerizable monomer represented by the following formula (A), L represents a linking group, and Y represents a colorant portion.]

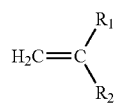

formula (A)

[In the formula (A), R$_1$ represents a hydrogen atom or an alkyl group, and R$_2$ represents a phenyl group, a phenyl group having a substituent, a carboxy group, an alkoxycarbonyl group, or a carboxamide group.]

It should be noted that in the following description, when only the polymer formed by polymerizing the polymerizable monomer represented by the formula (A) is indicated, the polymer is also referred to as "polymer moiety." In addition, a structure that has the colorant and the linking group, and is represented by the formula (3) or the formula (4) is also referred to as "colorant skeleton structure." In addition, a linking group constituting a bonding portion with the polymer moiety in the colorant skeleton structure is referred to as "linking group." In addition, a compound in which the colorant skeleton structure is linked to the polymer moiety through the linking group is also referred to as "compound having a colorant structure."

First, each step in the production method of the present invention is described in detail.

The step (a) in the present invention is a step of polymerizing the polymerizable monomer represented by the formula (A) with a radical initiator having a protective group by living radical polymerization to produce a polymer having the protective group at a terminal thereof, especially a polymer having the protective group at its α-terminal.

The radical initiator having a protective group has a protective group that has protected a functional group such as a hydroxyl group, an amino group, or a carboxyl group, and an initiation group that generates a radical under a polymerization condition. The introduction of the protective group advances the polymerization without the quenching of the radical to be generated during the polymerization by the functional group. Further, an interaction between a catalyst to be used in the living radical polymerization and the functional group of the initiator is suppressed, and hence the polymerization advances without being inhibited by the functional group. Accordingly, the use of the radical initiator having the protective group improves the efficiency with which the polymerizable monomer is polymerized. In addition, the protective group is preferably a protective group that is deprotected by hydrolysis in the presence of a catalyst or under an acid or alkaline condition in the step (b) of the present invention to reproduce the functional group. As a protective group that produces a hydroxyl group through deprotection, there are given, for example, a methyl ether group, a benzyl ether group, a p-methoxybenzyl ether group, a trityl ether group, and a silyl ether group. As a protective group that produces an amino group through deprotection, there are given, for example, a carbamate group, a trifluoroacetyl group, a phthaloyl group, and a sulfonamide group. As a protective group that produces a carboxyl group through deprotection, there are given, for example, a methoxycarbonyl group, an ethoxycarbonyl group, a tert-butoxycarbonyl group, and a benzoxycarbonyl group. In particular, a tert-butoxycarbonyl group or a benzoxycarbonyl group is preferably used from the viewpoint of the efficiency of the deprotection.

In addition, the initiation group that generates a radical is selected from compounds each generating a radical through the action of a catalyst to be used in the living radical polymerization, or heat, light, a radiation, or an oxidation-reduction reaction. Examples thereof include an organohalogen compound, an azo compound, an organic peroxide, an inorganic peroxide, and an organometallic compound. In particular, an initiation group having high radical generation efficiency is preferred from the viewpoint of the control of the molecular weight distribution of the polymer. Thus, examples of the initiation group include benzyl bromide, benzyl chloride, 1-bromoethylbenzene, 1-chloroethylbenzene, an α-bromophenylacetic acid ester, an α-chlorophenylacetic acid ester, 2-bromoisobutyric acid ester, a 2-chloroisobutyric acid ester, a 2-bromopropionic acid ester, a 2-chloropropionic acid ester, 2,2'-azobis(isobutyronitrile), 2,2'-azobis(2-methylbutyronitrile), 2,2'-azobis(4-methoxy-2,4-dimethylvaleronitrile), 2,2'-azobis(2,4-dimethylvaleronitrile), and 4,4'-azobis(4-cyanovaleric acid).

The usage amount of the radical initiator to be used is preferably regulated within the range of from 0.1 to 20 parts by mass with respect to 100 parts by mass of the polymerizable monomer so that a polymer having a target molecular weight or molecular weight distribution may be obtained.

A known method can be utilized for the living radical polymerization in the step (a). Specifically, the polymer can be produced by employing, for example, an ATRP method involving polymerization with a metal catalyst and a ligand [e.g., Masami Kamigaito and two others, "Chemical Reviews" (US), American Chemical Society, 2001, Vol. 101, p. 3689-3746], a RAFT method involving using a dithiocarboxylic acid ester, a xanthate compound, or the like as a catalyst (e.g., Japanese Patent Translation Publication No. 2000-515181), or a method involving utilizing iodine as a chain transfer agent (e.g., Patrick Lacroix-Desmazes and two others, "Macromolecules" (US), American Chemical Society, 2005, Vol. 38, No. 15, p. 6299-6309). In particular, the ATRP method and the RAFT method can each be suitably employed in the production method of the present invention because in each of the methods, polymerization initiation efficiency is high and hence the polymer having the protective group at its α-terminal can be produced with high efficiency.

The usage amount of the catalyst to be used in the polymerization method is preferably regulated within the range of from 0.01 to 1.0 part by mass with respect to 100 parts by mass of the polymerizable monomer so that a polymer having a target molecular weight or molecular weight distribution may be obtained.

The ATRP method in the step (a) of the present invention can control the molecular weight distribution by selecting the kind of the ligand. Specific examples of the ligand include 2,2'-bipyridyl (Bpy), 4,4'-dinonyl-2,2'-dipyridyl (dNbpy), N,N,N',N'',N''-pentamethyldiethylenetriamine (PMDETA), tris(2-pyridylmethyl)amine (TPMA), and tris[2-(dimethylamino)ethyl]amine (Me$_6$TREN).

The metal catalyst to be used in the ATRP method is not particularly limited, but is preferably at least one kind of transition metal selected from Groups 7 to 11 of the periodic table. Specifically, as a low valent metal to be used in a redox catalyst (redox conjugated complex) capable of undergoing reversible conversion between a low valent complex and a high valent complex, there is given a metal selected from the group consisting of $Cu^+$, $Ni^0$, $Ni^+$, $Ni^{2+}$, $Pd^0$, $Pd^+$, $Pt^0$, $Pt^+$, $Pt^{2+}$, $R^{h+}$, $Rh^{2+}$, $Rh^{3+}$, $Co^+$, $Co^{2+}$, $Ir^0$, $Ir^+$, $Ir^{2+}$, $Ir^{3+}$, $Fe^{2+}$, $Ru^{2+}$, $Ru^{3+}$, $Ru^{4+}$, $Ru^{5+}$, $Os^{2+}$, $Os^{3+}$, $Re^{2+}$, $Re^{3+}$, $Re^{4+}$, $Re^{6+}$, $Mn^{2+}$, and $Mn^{3+}$. Of those, preferred are $Cu^+$, $Ru^{2+}$, $Fe^{2+}$, and $Ni^{2+}$, and from the viewpoint of ease of availability of a raw material, $Cu^+$ is particularly preferred. As a monovalent copper compound, there may be suitably used cuprous chloride, cuprous bromide, cuprous iodide, and cuprous cyanide.

The RAFT method in the step (a) of the present invention can control the molecular weight distribution by selecting the kind of a RAFT agent (thioester). Specific examples of the RAFT agent include: dithiocarbamates such as 2-cyanomethyl N-methyl-N-phenyldithiocarbamate; dithiobenzoates such as benzyl dithiobenzoate, 4-cyano-4-(thiobenzoylthio)pentanoic acid, and 2-cyano-2-propyl dithiobenzoate; and trithiocarbonates such as 4-cyano-4-(dodecylsulfanylthiocarbonyl)sulfanylpentanoic acid, S-cyanomethyl-S-dodecyl trithiocarbonate, S,S-dibenzyl trithiocarbonate, and 2-methyl-2-[(dodecylsulfanylthiocarbonyl)sulfanyl]propanoic acid. In particular, from the viewpoint of polymerization efficiency, it is preferred that S-cyanomethyl-S-dodecyl trithiocarbonate or 2-methyl-2-[(dodecylsulfanylthiocarbonyl)sulfanyl]propanoic acid be used for the polymerization of an acrylic acid ester-based polymerizable monomer, 2-cyano-2-propyl dithiobenzoate, 4-cyano-4-(thiobenzoylthio)pentanoic acid, S-cyanomethyl-S-dodecyl trithiocarbonate, or 4-cyano-4-(dodecylsulfanylthiocarbonyl)sulfanylpentanoic acid be used for the polymerization of a methacrylic acid ester-based polymerizable monomer, and S-cyanomethyl-S-dodecyl trithiocarbonate, S-cyanomethyl-S-dodecyl trithiocarbonate, 4-cyano-4-(dodecylsulfanylthiocarbonyl)sulfanylpentanoic acid, or 2-methyl-2-[(dodecylsulfanylthiocarbonyl)sulfanyl]propanoic acid be used for the polymerization of a styrene-based polymerizable monomer.

The usage amount of the RAFT agent to be used in the RAFT method is preferably regulated within the range of from 0.01 to 10 parts by mass with respect to 100 parts by mass of the polymerizable monomer so that a polymer having a target molecular weight or molecular weight distribution may be obtained.

With regard to a polymerization mode in the living radical polymerization, the polymer can be produced by employing any one of the following polymerization modes: solution polymerization, suspension polymerization, emulsion polymerization, dispersion polymerization, precipitation polymerization, and bulk polymerization. Of those, solution polymerization in a solvent that can dissolve each component to be used at the time of the production is preferred, though the mode is not particularly limited thereto. Specifically, as the solvent, for example, one kind of the following solvents may be used alone, or two or more kinds thereof may be used as a mixture: polar organic solvents such as alcohols, e.g., methanol, ethanol, and 2-propanol, ketones, e.g., acetone and methyl ethyl ketone, ethers, e.g., tetrahydrofuran and diethyl ether, ethylene glycol monoalkyl ethers or acetates thereof, propylene glycol monoalkyl ethers or acetates thereof, diethylene glycol monoalkyl ethers, aprotic solvents, e.g., N,N-dimethylformamide, dimethyl sulfoxide, and N-methylpyrrolidone; and nonpolar solvents such as toluene, anisole, and xylene. It is more preferred that of those solvents, one kind of solvents whose boiling points fall within the temperature range of from 60 to 180° C. be used alone, or two or more kinds thereof be used as a mixture.

A preferred temperature range of a polymerization temperature varies depending on the kind of a polymerization initiator to be used and is not particularly limited. However, specifically, the polymerization is generally performed at a temperature in the range of from −30 to 200° C. and a more preferred temperature range is from 40 to 180° C.

An unreacted polymerizable monomer, the radical initiator, and the catalyst in the polymer obtained in the step (a) can be removed from the polymer by a reprecipitation method, dialysis, or column chromatography involving using aluminum oxide.

The polymer moiety obtained in the step (a) of the production method of the present invention is obtained by polymerizing the vinyl-based polymerizable monomer represented by the following formula (A). That is, the polymer moiety has a unit represented by the formula (2).

formula (A)

formula (2)

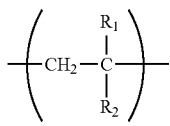

[In the formula (2) or (A), $R_1$ represents a hydrogen atom or an alkyl group, $R_2$ represents a phenyl group, a phenyl group having a substituent, a carboxy group, an alkylcarbonyl group, or a carboxamide group.]

The alkyl group represented by $R_1$ in the formula (2) or (A) is not particularly limited, and examples thereof include linear, branched, and cyclic alkyl groups such as a methyl group, an ethyl group, a n-propyl group, a n-butyl group, a n-pentyl group, a n-hexyl group, an isopropyl group, an isobutyl group, a sec-butyl group, a tert-butyl group, and a cyclohexyl group. Of the groups, $R_1$ in the formula (2) or (A) preferably represents a hydrogen atom or a methyl group from the viewpoint of the polymerizability of the polymerizable monomer for forming the monomer unit.

The alkoxycarbonyl group represented by $R_2$ in the formula (2) or (A) is not particularly limited, and examples thereof include linear and branched alkoxycarbonyl groups such as a methoxycarbonyl group, an ethoxycarbonyl group, a n-propoxycarbonyl group, an isopropoxycarbonyl group, a n-butoxycarbonyl group, an isobutoxycarbonyl group, a sec-butoxycarbonyl group, a tert-butoxycarbonyl group, an octoxycarbonyl group, a nonoxycarbonyl group, a decoxycarbonyl group, a undecoxycarbonyl group, a dodecoxycarbonyl group, a hexadecoxycarbonyl group, an ocatadecoxycarbonyl group, an eicosoxycarbonyl group, a docosoxycarbonyl group, a 2-ethylhexoxycarbonyl group, a phenoxycarbonyl group, a benzoxycarbonyl group, and 2-hydroxyethoxycarbonyl group.

The carboxamide group represented by $R_2$ in the formula (2) or (A) is not particularly limited, and examples thereof include a carboxamide group in which one hydrogen atom bonded to a nitrogen atom is substituted with an alkyl group (—CONHR), and a carboxamide group in which two hydrogen atoms bonded to a nitrogen atom are substituted with alkyl groups (—CONRR). Examples of the carboxamide group (—CONHR) include an N-methylamide group, an N-ethylamide group, an N-isopropylamide group, an N-n-butylamide group, an N-isobutylamide group, an N-sec-butylamide group, an N-tert-butylamide group, an N-octylamide group, an N-nonylamide group, an N-decylamide group, an N-undecylamide group, an N-dodecylamide group, an N-hexadecylamide group, an N-octadecylamide group, an N-phenylamide group, and an N-(2-ethylhexyl)amide group. Examples of the carboxamide group (—CONRR) include an N,N-dimethylamide group, an N,N-diethylamide group, an N,N-diisopropylamide group, an N,N-di-n-butylamide group, an N,N-diisobutylamide group, an N,N-di-sec-butylamide group, an N,N-dioctylamide group, an N,N-dinonylamide group, an N,N-didecylamide group, an N,N-diundecylamide group, an N,N-didodecylamide group, and an N,N-di(2-ethylhexyl)amide group.

When $R_2$ in the formula (2) or (A) represents a phenyl group, the group may be further substituted with a substituent as long as the substituent does not inhibit the polymerizability of the polymerizable monomer forming the monomer unit or remarkably reduce the solubility of the compound having a colorant skeleton structure. Examples of the substituent include: alkoxy groups such as a methoxy group and an ethoxy group; amino groups such as an N-methylamino group and an N,N-dimethylamino group; acyl groups such as an acetyl group; and halogen atoms such as a fluorine atom and a chlorine atom.

$R_2$ in the formula (2) or (A) preferably represents a phenyl group or an alkoxycarbonyl group out of the foregoing groups in terms of the dispersibility and compatibility of the compound having a colorant skeleton structure in a medium.

The affinity of the polymer moiety for a dispersion medium can be controlled by changing the ratio of the monomer unit represented by the formula (2). When the dispersion medium is a nonpolar solvent such as styrene, the ratio of such monomer unit that $R_2$ in the formula (2) represents a phenyl group is preferably increased in terms of the affinity for the dispersion medium. In addition, when the dispersion medium is a solvent having some degree of polarity such as an acrylic acid ester, the ratio of such monomer unit that $R_2$ in the formula (2) represents a carboxy group, an alkoxycarbonyl group, or a carboxamide group is preferably increased in terms of the affinity for the dispersion medium. In addition, a polymerizable monomer having a structure that is not included in the formula (A) may be used as long as the solubility of the compound having a colorant skeleton structure is not remarkably reduced.

The number-average molecular weight of the polymer moiety is preferably 500 or more in terms of an improvement in pigment dispersibility. Further, the number-average molecular weight of the polymer moiety is preferably 200,000 or less in order to improve its affinity for a water-insoluble solvent. Further, the number-average molecular weight of the polymer moiety is more preferably from 2,000 to 50,000 from the viewpoint of the ease of production.

The step (b) in the present invention is a step of deprotecting the protective group present at the terminal of the polymer obtained by the step (a) through hydrolysis to produce a polymer having a functional group at a terminal thereof. The functional group is reformed at the terminal of the polymer by the step (b). Examples of the functional group at the terminal of the polymer include a hydroxyl group, an amino group, and a carboxy group.

The deprotection through the hydrolysis is performed with an acid or an alkali, and the rate of the hydrolysis can be increased by heating or reflux. In addition, a reduction reaction with a catalyst or an electrolytic reduction method can be utilized. For example, a hydrogenation reaction involving using a palladium catalyst can be utilized. The solvent to be used at the time of the hydrolysis is preferably a solvent that dissolves the polymer and dissolves the acid or the alkali, and specifically, one kind of 1,4-dioxane, tetrahydrofuran, N,N-dimethylformamide, dimethyl sulfoxide, and N-methylpyrrolidone can be used alone, or a solvent obtained by mixing two or more kinds thereof can be used. The acid and alkali to be used in the hydrolysis are preferably a strong acid and a strong alkali, and examples thereof include hydrochloric acid, sulfuric acid, nitric acid, sodium hydroxide, and potassium hydroxide. A preferred temperature range of a hydrolysis temperature varies depending on the kind of a solvent to be used and is not particularly limited. However, specifically, the hydrolysis is preferably performed at a temperature in the range of from 40 to 200° C.

As in the foregoing, an unreacted product can be removed from the polymer obtained in the step (b) by a reprecipitation method, dialysis, or column chromatography.

The step (c) in the present invention is a step of bonding the deprotected polymer obtained by the step (b) and a colorant to each other through a covalent bond to produce a compound having a colorant skeleton structure.

A known method can be utilized as a method of forming the bond in the step (c). Of such methods, a method involving causing a substituent in the colorant skeleton structure and the functional group of the deprotected polymer to react with each other to form a carboxylic acid ester bond (—COO—), a carboxylic acid amide bond (—CONH—), a sulfonic acid ester bond (—SO$_2$—), a sulfonic acid amide bond (—SO$_2$NH—), or an ether bond (—O—) is preferred in terms of the ease of production and reaction yield.

Specific examples thereof include a method involving using a dehydration-condensation agent such as 1-ethyl-3-(3-dimethylaminopropyl)carbodiimide hydrochloride (for example, John C. Sheehan and two others, "The Journal of Organic Chemistry," (US), American Chemical Society, 1961, Vol. 26, No. 7, p. 2525-2528), a Schotten-Baumann method (for example, Norman O. V. Sonntag, "Chemical Reviews," (US), American Chemical Society, 1953, Vol. 52, No. 2, p. 237-416), and a Williamson method (for example, Joseph B. Niederl and one other, "Journal of American Chemical Society," (US), American Chemical Society, 1940, Vol. 62, p. 1154-1156).

This step may be performed without using any solvent, but is preferably performed in the presence of a solvent in order to prevent the reaction from proceeding abruptly. The solvent is not particularly limited as long as it does not inhibit the reaction. Examples thereof include: ethers such as diethyl ether, tetrahydrofuran, and dioxane; hydrocarbons such as benzene, toluene, xylene, hexane, and heptane; halogen-containing hydrocarbons such as dichloromethane, dichloroethane, and chloroform; amides such as N,N-dimethylformamide, N-methylpyrrolidone, and N,N-dimethylimidazolidinone; and nitriles such as acetonitrile and propionitrile. In addition, depending on the solubility of a solute, the solvents may be used as a mixture of two or more kinds thereof, and a mixing ratio upon the mixed use may be set to any ratio. The usage amount of the solvent may be set to any usage amount, but preferably falls within the range of from 1.0 to 20 times as large as the mass of the polymer moiety in terms of a reaction rate.

This step is generally performed in the temperature range of from 0° C. to 250° C., and is generally completed within 24 hours.

A colorant obtained by a known method may be used as the colorant that is applicable to the step (c) of the production method of the present invention. Specific examples thereof include an anthracene colorant, an indigo colorant, an acridine colorant, an azine colorant, an oxazine colorant, a thiazine colorant, a quinoline colorant, a polymethine colorant, a cyanine colorant, a quinophthalone colorant, a hydrazone colorant, a triazene colorant, a porphine colorant, an azaporphine colorant, a quinacridone colorant, a formazan colorant, a tetrazolium colorant, a nitroso colorant, a quinonimide colorant, an azomethine colorant, an azo colorant, a quinone colorant, a spiropyran colorant, a phthalone colorant, a phthalide colorant, an oxazole colorant, a thiadiazole colorant, an oxadiazole colorant, a triazole colorant, a thiophene colorant, a furan colorant, a stilbene colorant, a coumarin colorant, an isoindoline colorant, a naphtholactam colorant, a naphthalimide colorant, a phthalimide colorant, a perinone colorant, a benzoxanthene colorant, and a benzothioxanthene colorant. Out of the listed colorants, an azo colorant is preferred from the viewpoints of the affinity for a pigment and the ease of production.

An example of the azo colorant is a compound in which an azo group is linked with acetoacetanilide, benzene, naphthalene, triazole, benzothiazole, pyrazole, imidazole, thiadiazole, pyrrole, thiophene, pyridone, or barbituric acid. Out of the listed azo colorants, an azo colorant having an acetoacetanilide structure is preferred from the viewpoints of the affinity for a pigment and the ease of production.

The colorant needs to have a substituent for forming a linking group in order to cause the deprotected polymer and the colorant to react with each other. The substituent for forming a linking group is preferably, for example, a substituent having a hydroxyl group, a substituent having a sulfonic group, a substituent having an amino group, or a substituent having a carboxy group in terms of the ease of production.

Examples of the substituent having a hydroxyl group include: a hydroxyl group; hydroxyalkyl groups such as a hydroxymethyl group, a hydroxyethyl group, and a hydroxypropyl group; and a methylene glycol group, an ethylene glycol group, and an oligoethylene glycol group having 3 to 10 methylene chains.

Examples of the substituent having a sulfonic group include: a sulfonic group; and sulfoalkyl groups such as a sulfomethyl group, a sulfoethyl group, and a sulfopropyl group.

Examples of the substituent having an amino group include: an amino group; and aminoalkyl groups such as an aminomethyl group, an aminoethyl group, and an aminopropyl group.

Examples of the substituent having a carboxy group include: a carboxy group; and carboxyalkyl groups such as a carboxymethyl group, a carboxyethyl group, and a carboxypropyl group.

The colorant skeleton structure (colorant moiety having a linking group) is preferably a structure represented by the following formula (3).

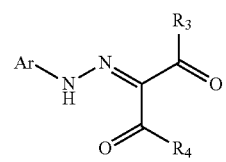

formula (3)

[In the formula (3):

at least one of $R_3$, $R_4$, and Ar represents a functional group having bonded thereto the linking group L;

$R_3$ and $R_4$ when the linking group L is not bonded thereto each independently represent an alkyl group, an alkyl group having a substituent, a phenyl group, a phenyl group having a substituent, an $OR_5$ group, or an $NR_6R_7$ group, and $R_5$ to $R_7$ each independently represent a hydrogen atom, an alkyl group, a phenyl group, or an aralkyl group;

Ar when the linking group L is not bonded thereto represents an aryl group or an aryl group having a substituent;

when the linking group L is bonded to $R_3$, $R_3$ represents a group formed by removal of a hydrogen atom from the functional group that $R_3$ to which the linking group L is not bonded may represent;

when the linking group L is bonded to $R_4$, $R_4$ represents a group formed by removal of a hydrogen atom from the functional group that $R_4$ to which the linking group L is not bonded may represent; and when the linking group L is bonded to Ar, Ar represents a group formed by removal of a hydrogen atom from the functional group that Ar to which the linking group L is not bonded may represent.]

Examples of the alkyl group represented by $R_3$ or $R_4$ in the azo skeleton structure represented by the formula (3) include linear, branched, and cyclic alkyl groups such as a methyl group, an ethyl group, a n-propyl group, a n-butyl group, a n-pentyl group, a n-hexyl group, an isopropyl group, an isobutyl group, a sec-butyl group, a tert-butyl group, and a cyclohexyl group.

The alkyl group or phenyl group represented by $R_3$ or $R_4$ in the formula (3) may be substituted with any one of the foregoing substituents as long as the affinity of the compound for a pigment is not remarkably inhibited. The substituent in the alkyl group having the substituent is a functional group selected from the group consisting of a halogen atom, a nitro group, an amino group, a hydroxyl group, a cyano group, and a trifluoromethyl group, and the substituent in the phenyl group having the substituent is a functional group selected from the group consisting of a halogen atom, an alkyl group, an alkoxy group, a hydroxyl group, a cyano group, a trifluoromethyl group, a carboxy group, an alkoxycarbonyl group, an alkoxysulfonyl group, a sulfonate group, a carboxamide group, a sulofonamide group, a urea group, a thiourea group, a nitro group, and an amino group. The urea group may form a five-membered heterocycle with two adjacent carbon atoms.

Out of those groups, $R_3$ in the formula (3) preferably represents a methyl group from the viewpoint of the affinity for a pigment.

Examples of the aryl group represented by Ar in the formula (3) include a phenyl group and a naphthyl group.

Ar in the formula (3) may have the above-mentioned substituent in addition to the linking group as long as the affinity for a pigment is not remarkably inhibited. The substituent in the aryl group having the substituent is a functional group selected from the group consisting of a halogen atom, an alkyl group, an alkoxy group, a hydroxyl group, a cyano group, a trifluoromethyl group, a carboxy group, an alkoxycarbonyl group, an alkoxysulfonyl group, a sulfonate group, a carboxamide group, a sulfonamide group, a urea group, and a thiourea group.

Further, the partial structure represented by the formula (3) is preferably a structure represented by the following formula (4) from the viewpoints of the affinity for a pigment and the ease of production.

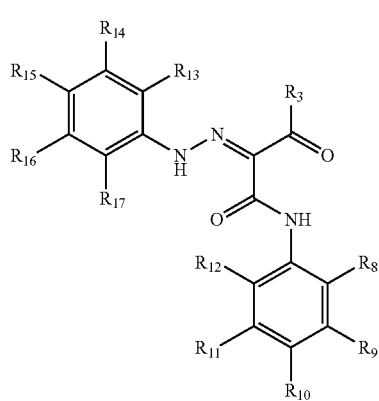

formula (4)

[In the formula (4):
$R_3$ represents an alkyl group or a phenyl group;
$R_8$ to $R_{12}$ and $R_{13}$ to $R_{17}$ satisfy at least one of the following condition (i) and (ii):

(i) at least one of $R_8$ to $R_{12}$ represents the linking group L; and
(ii) at least one of $R_{13}$ to $R_{17}$ represents the linking group L; and
when $R_8$ to $R_{12}$ and $R_{13}$ to $R_{17}$ do not represent the linking group L, $R_8$ to $R_{12}$ and $R_{13}$ to $R_{17}$ each independently represent a group represented by a hydrogen atom, a halogen atom, an alkyl group, an alkoxy group, a hydroxyl group, a cyano group, a trifluoromethyl group, a carboxy group, an alkoxycarbonyl group, an alkoxysulfonyl group, a sulfonate group, a carboxamide group, a sulofonamide group, a urea group, or a thiourea group, provided that the urea group may form a ring with two adjacent carbon atoms of $R_8$ to $R_{12}$ and $R_{13}$ to $R_{17}$ to provide a five-membered heterocycle.]

With regard to $R_8$ to $R_{12}$ and $R_{13}$ to $R_{17}$ in the formula (4), at least one of $R_8$ to $R_{12}$ and $R_{13}$ to $R_{17}$ preferably represents the linking group L out of the foregoing groups from the viewpoint of the affinity for a pigment. Further, from the viewpoint of the ease of production, it is more preferred that at least one of $R_8$ to $R_{12}$ and $R_{13}$ to $R_{17}$ represent the linking group L, and $R_8$ to $R_{12}$ and $R_{13}$ to $R_{17}$ that are free of the linking group L each represent a hydrogen atom.

The number of substitutions with the polymer bonded to the partial structure represented by the formula (3) or (4) is not particularly limited. However, from the viewpoint of the ease of production, the partial structure is preferably substituted with the polymer at one site or two sites.

It should be noted that the azo skeleton structure represented by the formula (3) has tautomers represented by the following formulae (5) and (6) as represented by the following scheme, and these tautomers also fall within the scope of rights of the present invention.

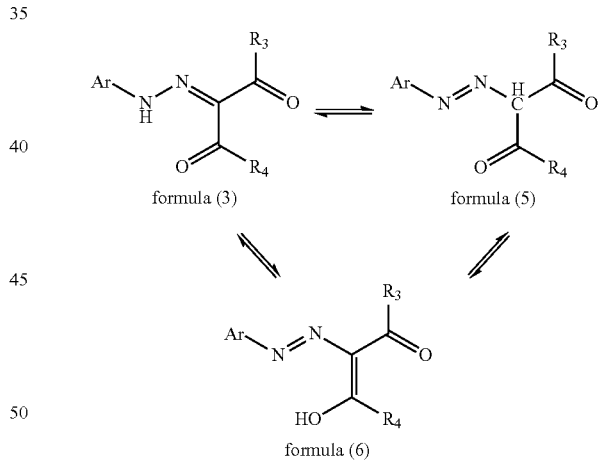

formula (3)　　formula (5)

formula (6)

[$R_3$, $R_4$, and Ar in the formulae (5) and (6) are identical in meaning to $R_3$, $R_4$, and Ar in the formula (3), respectively.]

The compound having a colorant skeleton structure obtained by the production method can be purified by employing an ordinary method for the isolation and purification of an organic compound. Examples of the method for the isolation and purification include a recrystallization method or reprecipitation method with an organic solvent, and column chromatography involving using a silica gel. A high-purity compound can be obtained by performing purification based on one kind of those methods alone, or a combination of two or more kinds thereof.

The identification, purity measurement, and molecular weight measurement of the compound having a colorant skeleton structure can be performed by nuclear magnetic resonance spectrometry, HPLC analysis, or size exclusion chromatography.

As described above, the linking group L between the polymer moiety and the colorant to be formed by the production method of the present invention is formed by bonding between the deprotected functional group in the polymer moiety produced in the step (b) and the substituent in the colorant skeleton in the step (c). In particular, the linking group L is preferably a linking group having a carboxylic acid ester bond or a carboxylic acid amide bond from the viewpoint of the ease of production. Specific examples of the linking group L include the following formulae $L_1$ to $L_{19}$.

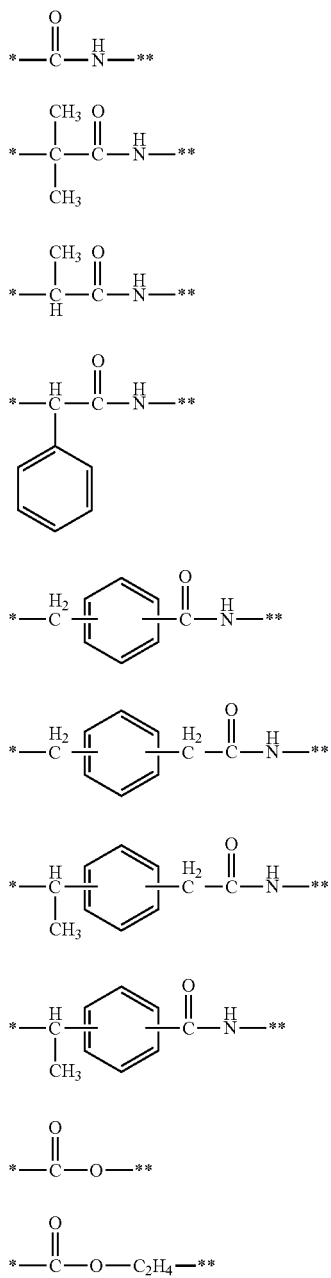
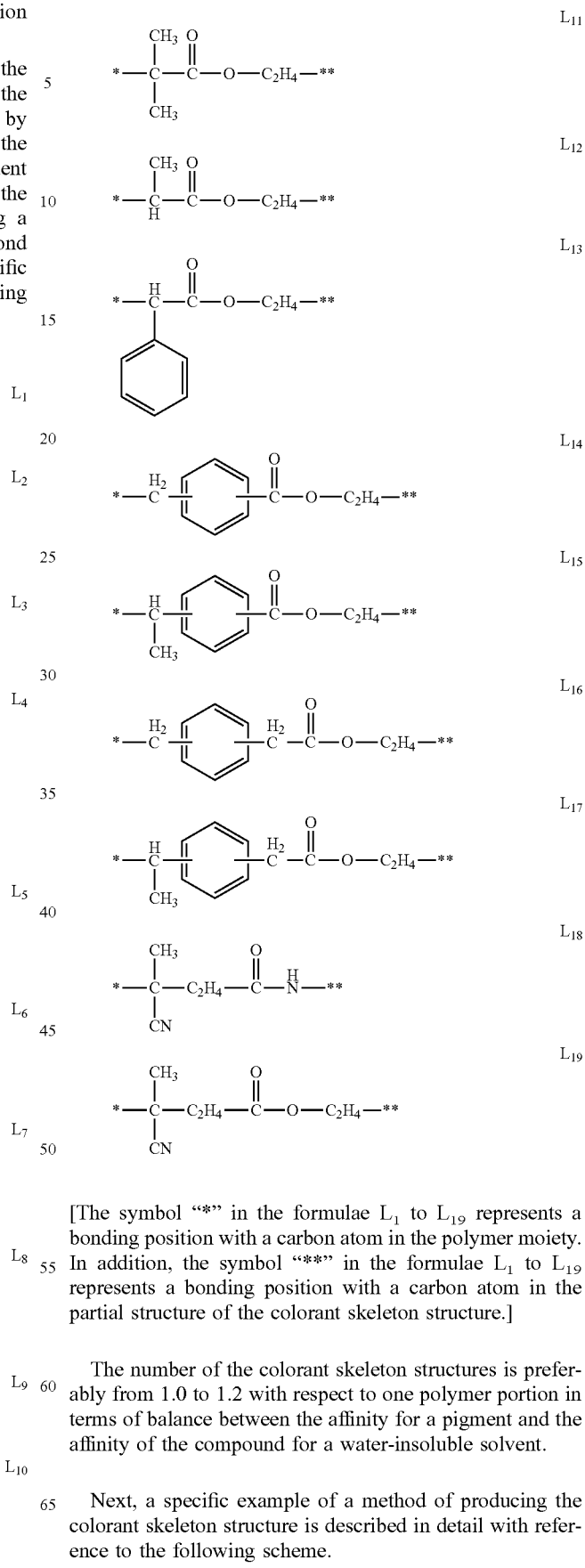

[The symbol "*" in the formulae $L_1$ to $L_{19}$ represents a bonding position with a carbon atom in the polymer moiety. In addition, the symbol "**" in the formulae $L_1$ to $L_{19}$ represents a bonding position with a carbon atom in the partial structure of the colorant skeleton structure.]

The number of the colorant skeleton structures is preferably from 1.0 to 1.2 with respect to one polymer portion in terms of balance between the affinity for a pigment and the affinity of the compound for a water-insoluble solvent.

Next, a specific example of a method of producing the colorant skeleton structure is described in detail with reference to the following scheme.

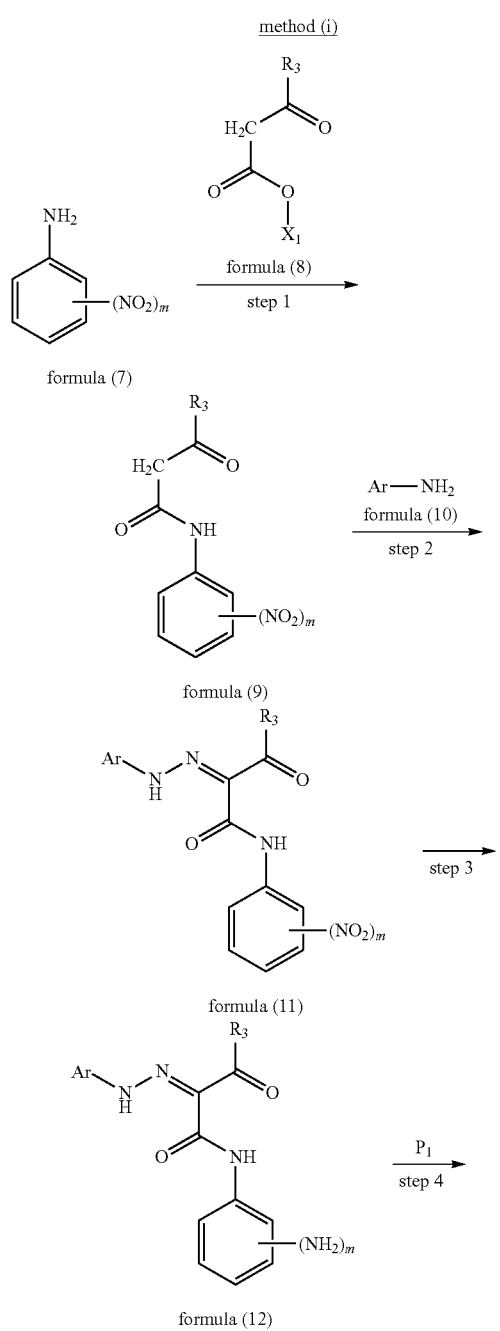

method (i)

formula (7)
formula (8)
step 1 formula (9)

Ar—NH$_2$
formula (10)
step 2 formula (11)

step 3

P$_1$
step 4
Compound having colorant skeleton structure formula (12)

[R$_3$ and Ar in the formulae (7) to (12) are identical in meaning to R$_3$ and Ar in the formula (3), respectively. X$_1$ in the formula (8) represents a leaving group. P$_1$ represents a polymer moiety obtained by polymerizing the vinyl-based polymerizable monomer represented by the formula (A). m in the formula (7), the formula (9), the formula (11), and the formula (12) represents an integer of 1 or 2.]

In the scheme of the method (i) given above, the compound having a colorant skeleton structure represented by the formula (1) can be synthesized through the following steps 1 to 4. In the step 1, a nitroaniline derivative represented by the formula (7) and an acetoacetic acid analog represented by the formula (8) are amidated to synthesize an intermediate (9) as an acylacetanilide analog. In the step 2, the intermediate (9) and an aniline derivative (10) are subjected to diazo coupling to synthesize a colorant compound (11). In the step 3, a colorant compound (12) is synthesized by reducing a nitro group in the colorant compound (11). In the step 4, an amino group of the colorant compound (12) and a functional group of the polymer moiety P$_1$ are bonded to each other through a condensation reaction or the like.

First, the step 1 is described.

A known method can be employed in the step 1. For example, refer to Datta E. Ponde, and four others, "The Journal of Organic Chemistry," (US), American Chemical Society, 1998, Vol. 63, No. 4, p. 1058-1063. In addition, when R$_3$ in the formula (9) represents a methyl group, the synthesis can be performed by a method involving using diketene in place of the raw material (8). For example, refer to Kiran Kumar Solingapuram Sai, and two others, "The Journal of Organic Chemistry," (US), American Chemical Society, 2007, Vol. 72, No. 25, p. 9761-9764.

The nitroaniline derivative (7) and the acetoacetic acid analog (8) are easily available because various kinds thereof are on the market. Further, the derivative and the analog can each be easily synthesized by a known method.

The step 1 may be performed without using any solvent, but is preferably performed in the presence of a solvent in order to prevent the reaction from proceeding abruptly. The solvent is not particularly limited as long as the reaction is not inhibited. Examples thereof include: alcohols such as methanol, ethanol, and propanol; esters such as methyl acetate, ethyl acetate, and propyl acetate; ethers such as diethyl ether, tetrahydrofuran, and dioxane; hydrocarbons such as benzene, toluene, xylene, hexane, and heptane; halogen-containing hydrocarbons such as dichloromethane, dichloroethane, and chloroform; amides such as N,N-dimethylformamide, N-methylpyrrolidone, and N,N-dimethylimidazolidinone; nitriles such as acetonitrile and propionitrile; acids such as formic acid, acetic acid, and propionic acid; and water. Further, the solvents may be used as a mixture of two or more kinds thereof as required, and a mixing ratio upon the mixed use may be set to any ratio depending on the solubility of a solute. The usage amount of the solvent may be set to any usage amount, but preferably falls within the range of from 1.0 to 20 times as large as the mass of the compound represented by the formula (7) in terms of a reaction rate.

The step 1 is generally performed in the temperature range of from 0 to 250° C., and is generally completed within 24 hours.

Next, the step 2 is described.

A known method can be employed in the step 2. Specifically, the following method is given. First, the aniline derivative (10) is caused to react with a diazotization agent such as sodium nitrite or nitrosylsulfuric acid in a methanol solvent in the presence of an inorganic acid such as hydrochloric acid or sulfuric acid so that the corresponding diazonium salt may be synthesized. Further, the diazonium salt is coupled with the intermediate (9) so that the colorant compound (11) may be synthesized.

The aniline derivative (10) is easily available because various kinds thereof are on the market. In addition, the derivative can be easily synthesized by a known method.

The step 2 may be performed without using any solvent, but is preferably performed in the presence of a solvent in order to prevent the reaction from proceeding abruptly. Examples of the solvent include, but are not particularly limited to: alcohols such as methanol, ethanol, and propanol; esters such as methyl acetate, ethyl acetate, and propyl acetate; ethers such as diethyl ether, tetrahydrofuran, and dioxane; hydrocarbons such as benzene, toluene, xylene, hexane, and heptane; halogen-containing hydrocarbons such as dichloromethane, dichloroethane, and chloroform; amides such as N,N-dimethylformamide, N-methylpyrrolidone, and N,N-dimethylimidazolidinone; nitriles such as acetonitrile and propionitrile; acids such as formic acid, acetic acid, and propionic acid; and water. In addition, the solvents may be used as a mixture of two or more kinds thereof as required, and a mixing ratio upon the mixed use may be set to any ratio depending on the solubility of a solute. The usage amount of the solvent may be set to any usage amount, but preferably falls within the range of from 1.0 to 20 times as large as the mass of the compound represented by the formula (9) in terms of a reaction rate.

The step 2 is typically performed in the temperature range of from −50 to 100° C., and is typically completed within 24 hours.

Next, the step 3 is described.

A known method can be employed in the step 3. Specifically, for example, the following methods can be utilized: a method disclosed in "Jikken Kagaku Koza," Maruzen Company, Limited, second edition, Vol. 17-2, p. 162-179 as a method involving using a metal compound or the like; and a method disclosed in "Shin Jikken Kagaku Koza," Maruzen Company, Limited, first edition, Vol. 15, p. 390-448, International Patent WO2009/060886A, or the like as a catalytic hydrogenation method.

The step 3 may be performed without using any solvent, but is preferably performed in the presence of a solvent in order to prevent the reaction from proceeding abruptly. The solvent is not particularly limited as long as the reaction is not inhibited. Examples of the solvent include, but are not particularly limited to: alcohols such as methanol, ethanol, and propanol; esters such as methyl acetate, ethyl acetate, and propyl acetate; ethers such as diethyl ether, tetrahydrofuran, and dioxane; hydrocarbons such as benzene, toluene, xylene, hexane, and heptane; and amides such as N,N-dimethylformamide, N-methylpyrrolidone, and N,N-dimethylimidazolidinone. In addition, the solvents may be used as a mixture of two or more kinds thereof as required, and a mixing ratio upon the mixed use may be set to any ratio depending on the solubility of a solute. The usage amount of the solvent may be set to any usage amount, but preferably falls within the range of from 1.0 to 20 times as large as the mass of the compound represented by the formula (11) in terms of a reaction rate.

The step is typically performed in the temperature range of from 0 to 250° C., and is typically completed within 24 hours.

Finally, in the step 4, as described above, the polymer moiety $P_1$ having a functional group at a terminal thereof obtained in the step (a) and the step (b), and the colorant skeleton structure obtained in the step 3 are bonded to each other through a covalent bond by utilizing a known method. For example, a compound having a colorant skeleton structure in which a linking group has a carboxylic acid amide bond can be synthesized by using the polymer moiety $P_1$ having a carboxyl group and the colorant compound (12) having an amino group.

Next, a method (ii) is described in detail by showing an example of its scheme below.

In the method (ii), a compound having a colorant skeleton structure is synthesized by: synthesizing a colorant compound having a substituent that forms a linking group with a polymer moiety at a position different from that of the method (i) [$Ar_1$ in the formula (16)]; and bonding the colorant compound and the polymer moiety to each other through a condensation reaction.

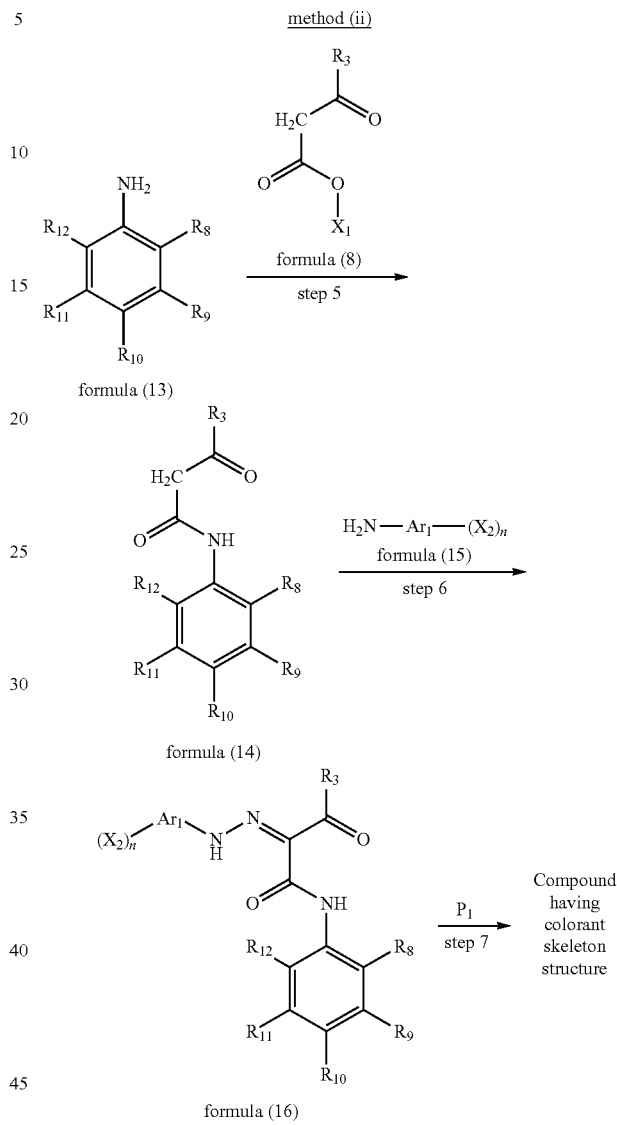

[$R_3$ and $R_8$ to $R_{12}$ in the formulae (13) to (16) are identical in meaning to $R_3$ and $R_8$ to $R_{12}$ in the formula (4), respectively. $X_1$ and $P_1$ are identical in meaning to $X_1$ and $P_1$ in the scheme of the method (i), respectively. $Ar_1$ in the formula (15) and the formula (16) represents an arylene group. $X_2$ in the formula (15) and the formula (16) represents a substituent that reacts with the $P_1$ to form the divalent linking group, and n represents an integer of 1 or 2.]

In the scheme given above, the compound having a colorant skeleton structure can be synthesized through the steps 5 to 7. In the step 5, an aniline derivative represented by the formula (13) and an acetoacetic acid analog represented by the formula (8) are amidated to synthesize an intermediate (14) as an acylacetanilide analog. In the step 6, the intermediate (14) and an aniline derivative (15) are subjected to diazo coupling to synthesize a colorant compound (16). In the step 7, the compound is synthesized through, for example, a condensation reaction between the colorant skeleton structure and the polymer moiety $P_1$.

First, the step 5 is described.

In the step 5, the intermediate (14) as an acylacetanilide analog is synthesized by utilizing the same method as that of the step 1 of the method (i).

Next, the step 6 is described.

In the step 6, the colorant compound (16) can be synthesized by utilizing the same method as that of the step 2 of the method (i).

The aniline derivative (15) is easily available because various kinds thereof are on the market. In addition, the derivative can be easily synthesized by a known method.

Next, the step 7 is described.

In the step 7, the compound having a colorant skeleton structure can be synthesized through, for example, a condensation reaction between the colorant skeleton structure (16) and the polymer moiety $P_1$ by utilizing the same method as that of the synthesis of the polymer moiety $P_1$ of the method (i). Specifically, for example, a compound having a colorant skeleton structure in which a linking group has a carboxylic acid ester bond can be synthesized by using the polymer moiety $P_1$ having a carboxy group and the colorant compound (16) in which $X_2$ represents a substituent having a hydroxyl group. In addition, a compound having a colorant skeleton structure in which a linking group has a carboxylic acid amide bond can be synthesized by using the polymer moiety $P_1$ having a carboxy group and the colorant compound (16) in which $X_2$ represents a substituent having an amino group.

The compound having a colorant skeleton structure obtained by the synthesis method exemplified above, and the compounds represented by the formulae (9), (11), (12), (14), and (16) can each be purified by employing an ordinary method for the isolation and purification of an organic compound. Examples of the method for the isolation and purification include a recrystallization method or reprecipitation method with an organic solvent, and column chromatography involving using a silica gel. A high-purity compound can be obtained by performing purification based on one kind of those methods alone, or a combination of two or more kinds thereof.

The compounds represented by the formulae (9), (11), (12), (14), and (16) were each identified and measured for its purity by nuclear magnetic resonance spectrometry [ECA-400 manufactured by JEOL Ltd.], ESI-TOF MS (LC/MSD TOF manufactured by Agilent Technologies), or HPLC analysis [LC-20A manufactured by Shimadzu Corporation].

The identification and molecular weight measurement of the compound having a colorant skeleton structure were performed by size exclusion chromatography (SEC) [HLC8220GPC manufactured by TOSOH CORPORATION], nuclear magnetic resonance spectrometry [ECA-400 manufactured by JEOL Ltd. or FT-NMR AVANCE-600 manufactured by Bruker BioSpin K.K.], or acid value measurement based on JIS K-0070 [automatic titration measuring apparatus COM-2500 manufactured by HIRANUMA SANGYO Co., LTD.].

Next, a pigment dispersant and pigment composition of the present invention are described.

The pigment dispersant of the present invention exhibits an effect as a pigment dispersant in a medium by containing a compound having a colorant skeleton structure obtained by the production method of the present invention because the compound having a colorant skeleton structure has high affinities for various pigments and has a high affinity for a water-insoluble solvent. In this case, one kind of the compounds having colorant skeleton structures may be used alone as the pigment dispersant, or two or more kinds thereof may be used in combination as the pigment dispersant.

The pigment dispersant of the present invention only needs to contain the compound having a colorant skeleton structure obtained by the production method of the present invention.

In addition, the pigment composition of the present invention includes the pigment dispersant and a pigment. The pigment composition can find use in a paint, an ink, a toner, and a resin molded article.

As a yellow pigment to be incorporated into the pigment composition of the present invention, there can be used, for example, one appropriately selected from yellow pigments described in "Organic Pigments Handbook" published in 2006 (author/publisher; Isao Hashimoto). Specific example thereof include a monoazo-based pigment, a bisazo-based pigment, a polyazo-based pigment, an isoindoline-based pigment, a condensed azo-based pigment, an azomethine-based pigment, an anthraquinone-based pigment, and a quinoxaline-based pigment. Of those, a monoazo-based pigment, a bisazo-based pigment, a polyazo-based pigment, and an isoindoline-based pigment can be suitably used. Specifically, an acetoacetanilide-based pigment such as C.I. Pigment Yellow 74, 83, 93, 128, 155, 175, or 180, or an isoindoline-based pigment such as C.I. Pigment Yellow 139 or 185 is preferred because the pigment has a high affinity for the compound having an azo skeleton structure obtained by the production method of the present invention. In particular, C.I. Pigment Yellow 155, 180, or 185 is more preferred because a dispersing effect on any such pigment by the compound having a colorant skeleton structure obtained by the production method of the present invention is high.

One kind of the yellow pigments may be used alone, or two or more kinds thereof may be mixed.

A known yellow colorant can be used in combination with the yellow pigment as a yellow colorant to be incorporated into the pigment composition of the present invention as long as the dispersibility of the pigment is not inhibited.

Examples of the colorant that can be used in combination with the yellow pigment include compounds typified by a condensed azo compound, an isoindolinone compound, an anthraquinone compound, an azo metal complex, a methine compound, a quinophthalone compound, and an allylamide compound.

Specifically, the following colorants can be used: C.I. Pigment Yellow 12, 13, 14, 15, 17, 62, 94, 95, 97, 109, 110, 111, 120, 127, 129, 139, 147, 151, 154, 168, 174, 176, 181, 191, 194, 213, or 214, C.I. Vat Yellow 1, 3, or 20, Mineral Fast Yellow, Naples Yellow, Naphthol Yellow S, Hansa Yellow G, Permanent Yellow NCG, and C.I. Solvent Yellow 9, 17, 24, 31, 35, 58, 93, 100, 102, 103, 105, 112, 162, or 163.

As a magenta pigment to be incorporated into the pigment composition of the present invention, there can be used, for example, one appropriately selected from magenta pigments described in "Organic Pigments Handbook" published in 2006 (author/publisher; Isao Hashimoto) (a quinacridone-based pigment, a monoazonaphthol-based pigment, a diazonaphthol-based pigment, a perylene-based pigment, a thioindigo-based pigment, a diketopyrrolopyrrole-based pigment, a naphthol AS-based pigment, a BONA lake-based pigment, and the like). Of those, a quinacridone-based pigment, a diketopyrrolopyrrole-based pigment, a naphthol AS-based pigment, and a BONA lake-based pigment are preferred.

Further, out of the pigments, a quinacridone-based pigment represented by the following formula (17), a diketopyrrolopyrrole-based pigment represented by the following formula (18), a naphthol AS-based pigment represented by the following formula (19), and a BONA lake-based pigment are more preferred because the pigments each have a high affinity for the compound having a colorant skeleton structure obtained by the production method of the present invention.

formula (17)

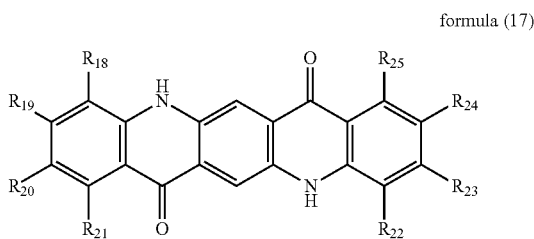

[In the formula (17), $R_{18}$ to $R_{25}$ each independently represent a hydrogen atom, a chlorine atom, or a methyl group.]

formula (18)

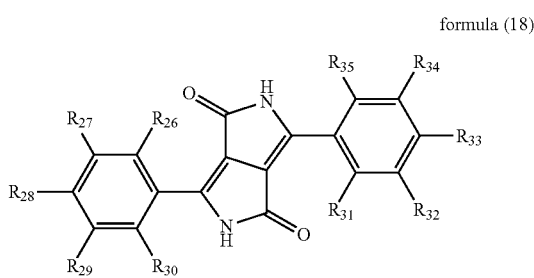

[In the formula (18), $R_{26}$ to $R_{35}$ each independently represent a hydrogen atom, a chlorine atom, a tert-butyl group, a cyano group, or a phenyl group.]

formula (19)

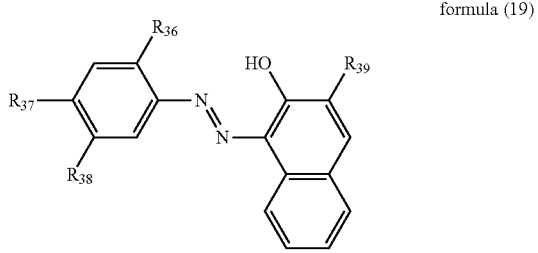

[In the formula (19), $R_{36}$ to $R_{38}$ each independently represent a hydrogen atom, a methoxy group, a methyl group, a nitro group, a chlorine atom, an N,N-diethylaminosulfonyl group, a sulfonic group, a sulfonate group, or a $CONHR_{40}$ group, $R_{39}$ represents an amino group, a carboxylic group, a carboxylate group, or a $CONHR_{41}$ group, and $R_{40}$ and $R_{41}$ each independently represent a hydrogen atom or a phenyl group.]

An example of the quinacridone-based pigment represented by the formula (17) is C.I. Pigment Red 202, 122, 192, or 209.

In the formula (17), it is preferred that $R_{18}$, $R_{19}$, $R_{21}$ to $R_{23}$, and $R_{25}$ each represent a hydrogen atom, and $R_{20}$ and $R_{24}$ each represent a hydrogen atom, a chlorine atom, or a methyl group from the viewpoint of the affinity for the compound having a colorant skeleton structure obtained by the production method of the present invention.

An example of the diketopyrrolopyrrole-based pigment represented by the formula (18) is C.I. Pigment Red 255, 254, or 264.

In the formula (18), it is preferred that $R_{26}$, $R_{27}$, $R_{29}$ to $R_{32}$, $R_{34}$, and $R_{35}$ each represent a hydrogen atom, and $R_{28}$ and $R_{33}$ each represent a hydrogen atom or a phenyl group from the viewpoint of the affinity for the compound having an azo skeleton structure obtained by the production method of the present invention.

An example of the naphthol AS-based pigment represented by the formula (19) is C.I. Pigment Red 2, 3, 5, 6, 7, 23, 150, 146, 184, or 269.

An example of the BONA lake-based pigment represented by the formula (19) is C.I. Pigment Red 48:2, 48:3, 48:4, or 57:1.

With regard to $R_{36}$ to $R_{41}$ in the formula (19), it is preferred that at least one of $R_{36}$ to $R_{38}$ represent a $CONHR_{40}$ group out of the foregoing groups, and $R_{39}$ represent a $CONHR_{41}$ group out of the foregoing groups from the viewpoint of the affinity for the compound having a colorant skeleton structure obtained by the production method of the present invention. Further, $R_{41}$ preferably represents a hydrogen atom from the viewpoint of the affinity for the compound having a colorant skeleton structure obtained by the production method of the present invention.

In the present invention, a quinacridone-based pigment such as C.I. Pigment Red 122 or 202, or a naphthol AS-based pigment such as C.I. Pigment Red 255, 264, or 150 is particularly preferred from the viewpoint of the affinity for the compound having a colorant skeleton structure obtained by the production method of the present invention.

One kind of the magenta pigments may be used alone, or two or more kinds thereof may be mixed.

A known magenta colorant can be used in combination with the magenta pigment as a magenta colorant to be incorporated into the pigment composition of the present invention as long as the dispersibility of the pigment is not inhibited.

Examples of the magenta colorant that can be used in combination include a condensed azo compound, anthraquinone, a base colorant lake compound, a benzimidazolone compound, a thioindigo compound, and a perylene compound.

Specific examples thereof include C.I. Pigment Red 81:1, 144, 166, 169, 177, 185, 220, 221, and 238.

A phthalocyanine pigment represented by the following formula (20) or the following formula (B) can be suitably used as a cyan pigment to be incorporated into the pigment composition of the present invention.

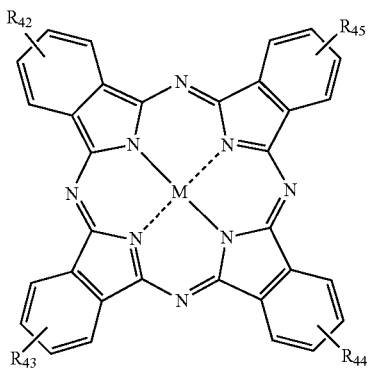

formula (20)

[In the formula (20), $R_{42}$ to $R_{45}$ each independently represent hydrogen, an alkyl group, a sulfonic group, or a sulfonate group, and M represents a metal atom.]

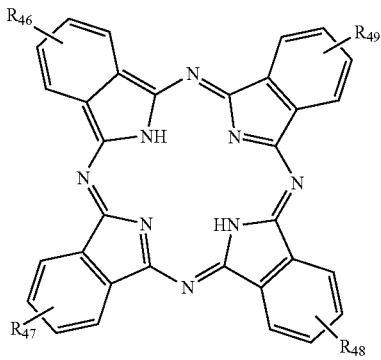

formula (B)

[In the formula (B), $R_{46}$ to $R_{49}$ each independently represent hydrogen, an alkyl group, a sulfonic group, or a sulfonate group.]

Examples of the phthalocyanine pigment represented by the formula (20) or (B) include C.I. Pigment Blue 15, 15:1, 15:2, 15:3, 15:4, 15:5, 15:6, 16, 17, 17:1, 68, 70, 75, 76, and 79.

Of those, C.I. Pigment Blue 15, 15:1, 15:2, 15:3, 15:4, 15:5, or 15:6 is particularly preferred from the viewpoint of the affinity for the compound having a colorant skeleton structure obtained by the production method of the present invention.

One kind of the cyan pigments may be used alone, or two or more kinds thereof may be mixed.

A known cyan colorant can be used in combination with the cyan pigment as a cyan colorant to be incorporated into the pigment composition of the present invention as long as the dispersibility of the pigment is not inhibited.

Examples of the cyan colorant that can be used in combination with the cyan pigment include C.I. Pigment Blue 1, 1:2, 1:3, 2, 2:1, 2:2, 3, 4, 5, 6, 7, 8, 9, 9:1, 10, 10:1, 11, 12, 13, 14, 18, 19, 20, 21, 22, 23, 24, 24:1, 25, 26, 27, 28, 29, 30, 31, 32, 33, 34, 35, 36, 36:1, 52, 53, 56, 56:1, 57, 58, 59, 60, 61, 61:1, 62, 63, 64, 65, 66, 67, 69, 71, 72, 73, 74, 77, 78, 80, 81, 82, 83, and 84.

In addition, a colorant except the cyan colorant can be used for adjusting the color tone of the pigment composition. For example, the use of a mixture of C.I. Pigment Blue 15:3 and C.I. Pigment Green 7 can improve a cyan color purity.

Carbon black can be suitably used as a black colorant to be incorporated into the pigment composition of the present invention.

The carbon black to be used in the present invention is not particularly limited. However, carbon black obtained by a production method such as a thermal method, an acetylene method, a channel method, a furnace method, or a lamp black method can be used.

The number-average particle diameter of the primary particles of the carbon black to be used in the present invention, which is not particularly limited, is preferably from 14 to 80 nm, more preferably from 25 to 50 nm from the viewpoint of the color tone.

It should be noted that the number-average particle diameter of the primary particles of the carbon black can be measured by photographing an enlarged photograph with a scanning electron microscope.

The DBP oil absorption of the carbon black to be used in the present invention, which is not particularly limited, is preferably from 30 to 200 ml/100 g, more preferably from 40 to 150 ml/100 g. When the DBP oil absorption of the carbon black falls within the range, the coloring power of a printed image can be additionally improved.

It should be noted that the DBP oil absorption of the carbon black refers to the amount of dibutyl phthalate (DBP) to be absorbed by 100 g of the carbon black, and can be measured in conformity with "JIS K6217."

In addition, the pH of the carbon black is not particularly limited as long as the dispersibility of the carbon black in the compound having a colorant skeleton structure is not remarkably inhibited. It should be noted that a value obtained by subjecting a mixed liquid of the carbon black and distilled water to measurement with a pH electrode can be used as the pH of the carbon black.

The specific surface area of the carbon black, which is not particularly limited, is preferably 300 m$^2$/g or less, more preferably 100 m$^2$/g or less. When the specific surface area of the carbon black falls within the range, the addition amount of the compound having a colorant skeleton structure can be additionally reduced.

It should be noted that the specific surface area of the carbon black is a BET specific surface area and can be measured in conformity with "JIS K4652."

One kind of the carbon blacks may be used alone, or two or more kinds thereof may be mixed.

A known black colorant can be used in combination with the carbon black as a black colorant to be used in the present invention as long as the dispersibility of the carbon black is not inhibited.

Examples of the black colorant that can be used in combination include C.I. Pigment Black 1, 10, and 31, C.I. Natural Black 1, 2, 3, 4, 5, and 6, and activated carbon.

Further, the black colorant to be incorporated into the pigment composition of the present invention may be used in combination with a known magenta colorant, cyan colorant, or yellow colorant for toning.

It should be noted that a pigment that can be used in the present invention is not limited to the foregoing pigments because a pigment except such yellow pigment, magenta pigment, cyan pigment, or carbon black as described above can be used as long as the pigment has an affinity for the pigment dispersant of the present invention.

Any such pigment may be a crude pigment (pigment that is produced from a raw material corresponding to any one of the foregoing pigments, and is not prepared by purification, the control of a crystal form or a particle diameter, and a surface treatment). In addition, the pigment may be a prepared pigment composition as long as an effect of the compound having a colorant skeleton structure is not remarkably inhibited.

A composition ratio [(the mass of the pigment):(the mass of the compound having a colorant skeleton structure)] between the pigment and the compound having a colorant skeleton structure in the pigment composition of the present invention on a mass basis preferably falls within the range of from 100:0.1 to 100:100 from the viewpoint of the pigment dispersibility. In addition, the composition ratio more preferably falls within the range of from 100:0.5 to 100:20.

The pigment composition can be produced by a wet or dry process. The pigment composition is preferably produced by the wet process by which a uniform pigment composition can be easily produced because the compound having a colorant skeleton structure obtained by the production method of the present invention has a high affinity for a water-insoluble solvent. Specifically, the pigment composition can be produced as described below.

The pigment dispersant, and as required, a resin are dissolved in a dispersion medium. While the solution is stirred, pigment powder is gradually added to the solution and sufficiently conformed to the dispersion medium. When a mechanical shear force is applied with a dispersing machine, the pigment dispersant can be adsorbed to the surface of the pigment and hence the pigment can be finely dispersed in a uniform fine particle shape with stability. Examples of the dispersing machine include a dispersing machine such as a kneader, a roll mill, a ball mill, a paint shaker, a dissolver, an attritor, a sand mill, and a high-speed mill.

An auxiliary may be further added to the pigment composition of the present invention at the time of its production. Examples of the auxiliary include a surface-active agent, a dispersant, a filler, a standardizer, a resin, a wax, a defoaming agent, an antistatic agent, a dust-proof agent, a bulking agent, a shading colorant, a preservative, a drying inhibitor, a rheology control additive, a wetting agent, an antioxidant, a UV absorber, and a light stabilizer. The auxiliaries may be used in combination. In addition, the pigment dispersant of the present invention may be added in advance upon production of a crude pigment.

Next, a pigment dispersion of the present invention is described.

The pigment dispersion of the present invention includes the pigment composition and a water-insoluble solvent as a dispersion medium. The pigment dispersion may be obtained by dispersing the pigment composition in the water-insoluble solvent, or may be obtained by dispersing each constituent component of the pigment composition in the water-insoluble solvent. For example, the pigment dispersion can be produced as described below.

As required, the pigment dispersant and a resin are dissolved in a dispersion medium, and then a pigment or pigment composition powder is gradually added so as to be sufficiently conformed to the dispersion medium while the solution is stirred. Further, a mechanical shear force is applied to the resultant with a dispersing machine such as a ball mill, a paint shaker, a dissolver, an attritor, a sand mill, or a high-speed mill so that the pigment may be dispersed in a stably uniform fine particulate fashion.

The water-insoluble solvent as the dispersion medium in the pigment dispersion of the present invention is determined depending on the purposes and applications of the pigment dispersion, and is not particularly limited. Examples thereof include: esters such as methyl acetate, ethyl acetate, and propyl acetate; hydrocarbons such as hexane, octane, petroleum ether, cyclohexane, benzene, toluene, and xylene; and halogenated hydrocarbons such as carbon tetrachloride, trichloroethylene, and tetrabromoethane.

The water-insoluble solvent as the dispersion medium in the pigment dispersion of the present invention may be a polymerizable monomer. Examples of the polymerizable monomer include the following monomers.

For example, there can be given styrene, α-methylstyrene, α-ethylstyrene, o-methylstyrene, m-methylstyrene, p-methylstyrene, p-methoxystyrene, p-phenylstyrene, p-chlorostyrene, 3,4-dichlorostyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, ethylene, propylene, butylene, isobutylene, vinyl chloride, vinylidene chloride, vinyl bromide, vinyl iodide, vinyl acetate, vinyl propionate, vinyl benzoate, methyl methacrylate, ethyl methacrylate, propyl methacrylate, butyl methacrylate, n-octyl methacrylate, dodecyl methacrylate, 2-ethylhexyl methacrylate, stearyl methacrylate, behenyl methacrylate, phenyl methacrylate, dimethylaminoethyl methacrylate, diethylaminoethyl methacrylate, methyl acrylate, ethyl acrylate, n-butyl acrylate, isobutyl acrylate, propyl acrylate, n-octyl acrylate, dodecyl acrylate, 2-ethylhexyl acrylate, stearyl acrylate, behenyl acrylate, 2-chloroethyl acrylate, phenyl acrylate, vinyl methyl ether, vinyl ethyl ether, vinyl isobutyl ether, vinyl methyl ketone, vinyl hexyl ketone, methyl isopropenyl ketone, vinylnaphthalene, acrylonitrile, methacrylonitrile, and acrylamide. Of those, styrene is preferred as the water-insoluble solvent from the viewpoint of the affinity for the compound having a colorant skeleton structure obtained by the production method of the present invention.

The resin that can be dissolved in the water-insoluble solvent is determined depending on the purposes and applications of the pigment composition, and is not particularly limited. Examples thereof include a polystyrene resin, a styrene copolymer, a polyacrylic acid resin, a polymethacrylic acid resin, a polyacrylic acid ester resin, a polymethacrylic acid ester resin, an acrylic acid ester copolymer, a methacrylic acid ester copolymer, a polyester resin, a polyvinyl ether resin, a polyvinyl alcohol resin, a polyvinylbutyral resin, a polyurethane resin, and a polypeptide resin. Further, two or more kinds of those resins may be used as a mixture.

Next, a toner of the present invention is described.

The toner of the present invention includes toner particles each containing a binder resin and a colorant. Here, the use of the pigment composition as the colorant can provide a toner having high coloring power because the use keeps the dispersibility of the pigment in each toner particle at a satisfactory level.

A known resin that has been generally used can be used as the binder resin. Specific examples thereof include a styrene-methacrylic acid copolymer, a styrene-acrylic acid copolymer, a polyester resin, an epoxy resin, and a styrene-butadiene copolymer.

In addition, the toner particles may be directly obtained through the polymerization of a polymerizable monomer by a polymerization method, and examples of the polymerizable monomer to be used in this case include the following monomers.

For example, there are given: styrene-based monomers such as styrene, a-methylstyrene, a-ethylstyrene, o-methylstyrene, m-methylstyrene, p-methylstyrene, o-ethylstyrene, m-ethylstyrene, and p-ethylstyrene; methacrylate-based monomers such as methyl methacrylate, ethyl methacrylate, propyl methacrylate, butyl methacrylate, octyl methacrylate, dodecyl methacrylate, stearyl methacrylate, behenyl methacrylate, 2-ethylhexyl methacrylate, dimethylaminoethyl methacrylate, diethylaminoethyl methacrylate, methacrylonitrile, and methacrylamide; acrylate-based monomers such as methyl acrylate, ethyl acrylate, propyl acrylate, butyl acrylate, octyl acrylate, dodecyl acrylate, stearyl acrylate, behenyl acrylate, 2-ethylhexyl acrylate, dimethylaminoethyl acrylate, diethylaminoethyl acrylate, acrylonitrile, and acrylamide; and olefin-based monomers such as butadiene, isoprene, and cyclohexene.

Those monomers are used alone, or as an appropriate mixture thereof that exhibits a theoretical glass transition temperature (Tg) in the range of from 40 to 75° C. [see J. Brandrup, E. H. Immergut (ed.), "Polymer Handbook," (US), third edition, John Wiley & Sons, 1989, p. 209-277]. When the theoretical glass transition temperature falls within the range, the storage stability and endurance stability of toner and the clarity of a full-color image can be additionally improved.

The use of a nonpolar resin such as polystyrene in combination with a polar resin such as a polyester resin or a polycarbonate resin as the binder resin can control the distribution of an additive such as a colorant, a charge control agent, or a wax in the toner particles. For example, when the toner particles are directly produced by a suspension polymerization method or the like, the polar resin is added in a polymerization reaction commencing on a dispersing step and ending on a polymerizing step. The polar resin is added according to a balance between the polarities of a polymerizable monomer composition and an aqueous medium to serve as the toner particles. As a result, for example, a thin layer of the polar resin is formed on the surface of the toner particles, and the concentration of the resin may be controlled so as to continuously change from the surface of the toner particles toward the center. In this case, the use of the polar resin having interactions with the compound having a colorant skeleton structure, the colorant, and the charge control agent allows the colorant to be present in a desired form in the toner particles.

Further, in the present invention, a crosslinking agent may be used at the time of the synthesis of the binder resin for improving the mechanical strength of the toner particles and controlling the molecular weight of the binder resin.

As the crosslinking agent, there can be used a bifunctional crosslinking agent and tri- or more functional crosslinking agents.

Examples of the bifunctional crosslinking agent include divinylbenzene, bis(4-acryloxypolyethoxyphenyl)propane, ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, diacrylates of polyethylene glycols #200, #400, and #600, dipropylene glycol diacrylate, polypropylene glycol diacrylate, polyester-type diacrylates, and ones obtained by changing these diacrylates to dimethacrylates.

Examples of the tri- or more functional crosslinking agents include pentaerythritol triacrylate, trimethylolethane triacrylate, trimethylolpropane triacrylate, tetramethylolmethane tetraacrylate, oligoester acrylate and methacrylate thereof, 2,2-bis(4-methacryloxyphenyl)propane, diallyl phthalate, triallyl cyanurate, triallyl isocyanurate, and triallyl trimellitate.

The addition amount of any such crosslinking agent is preferably from 0.05 to 10 parts by mass, more preferably from 0.1 to 5 parts by mass with respect to 100 parts by mass of the polymerizable monomer in terms of toner fixability and offset resistance.

Further, in the present invention, a wax may be used at the time of the synthesis of the binder resin in order to prevent the toner from adhering to a fixing member.

Examples of the wax include petroleum-based waxes and derivatives thereof such as paraffin wax, microcrystalline wax, and petrolatum; montan wax and derivatives thereof; hydrocarbon waxes and derivatives thereof by a Fischer-Tropsch process; polyolefin waxes and derivatives thereof typified by polyethylene; and natural waxes and derivatives thereof such as carnauba wax and candelilla wax. The derivatives include an oxide, a block copolymer with a vinyl monomer, and a graft modified product. Further examples of the wax include: alcohols such as higher aliphatic alcohols; fatty acids such as stearic acid and palmitic acid; fatty acid amides; fatty acid esters; hydrogenated castor oil and derivatives thereof; plant waxes; and animal waxes. One kind of those waxes may be used alone, or two or more kinds thereof may be used in combination.

The addition amount of the wax is preferably from 2.5 to 15.0 parts by mass, more preferably from 3.0 to 10.0 parts by mass with respect to 100 parts by mass of the binder resin. When the addition amount of the wax falls within the range, the fixability and chargeability of the toner can be made additionally satisfactory. In addition, a charge control agent may be incorporated into each toner particle as required in order to control the triboelectric charge quantity of the toner to an optimum triboelectric charge quantity in accordance with the developing system of the toner.

A known agent can be utilized as the charge control agent. Of those, a charge control agent having a high charging speed and capable of stably maintaining a certain charge quantity is particularly preferred. Further, when the toner particles are directly produced from the polymerizable monomer by a polymerization method such as a suspension polymerization method, a charge control agent that has a low polymerization-inhibiting property and is substantially free of any matter soluble in an aqueous medium is particularly preferred.

A negatively chargeable charge control agent or a positively chargeable charge control agent can be used as the charge control agent.

Examples of the negatively chargeable charge control agent include a polymer or copolymer having a sulfonic group, a sulfonic acid salt group, or a sulfonic acid ester group, a salicylic acid derivative and a metal complex thereof, a monoazo metal compound, an acetylacetone metal compound, an aromatic oxycarboxylic acid, aromatic mono- and polycarboxylic acids and metal salts, anhydrides, and esters thereof, phenol derivatives such as bisphenol, a urea derivative, a metal-containing naphthoic acid-based compound, a boron compound, a quaternary ammonium salt, a calixarene, and a resin-based charge control agent.

In addition, examples of the positively chargeable charge control agent include: nigrosine-modified products with nigrosine and fatty acid metal salts; guanidine compounds; imidazole compounds; quaternary ammonium salts such as tributylbenzylammonium 1-hydroxy-4-naphthosulfonate and tetrabutylammonium tetrafluoroborate, and analogs thereof including onium salts such as phosphonium salts and lake pigments thereof; triphenylmethane colorants and lake pigments thereof (laking agents include phosphorus tungstate, phosphorus molybdate, phosphorus tungsten molybdate, tannic acid, lauric acid, gallic acid, ferricyanides, and ferrocyanides); metal salts of higher fatty acids; diorganotin oxides such as dibutyl tin oxide, dioctyl tin oxide, and dicyclohexyl tin oxide; diorganotin borates such as dibutyl tin borate, dioctyl tin borate, and dicyclohexyl tin borate; and a resin-based charge control agent.

One kind of those charge control agents may be used alone, or two or more kinds thereof may be used in combination.

In the toner of the present invention, inorganic fine powder may be added as a flowability-imparting agent to the toner particles. Silica, titanium oxide, alumina, or a multiple oxide thereof, or a product obtained by treating the surface of any such oxide can be used as the inorganic fine powder.

A method of producing the toner particles of the present invention is, for example, a pulverization method, a suspension polymerization method, a suspension granulation method, or an emulsion polymerization method, which has been conventionally employed. Of those production methods, it is preferred to produce the toner particles by the suspension polymerization method or the suspension granulation method is particularly preferred from the viewpoints of an environmental load at the time of the production and the controllability of a particle diameter.

The toner particles to be produced by the suspension polymerization method are produced, for example, as described below.

First, the colorant containing the pigment composition of the present invention, the polymerizable monomer, the wax, a polymerization initiator, and the like are mixed so that a polymerizable monomer composition may be prepared. Next, the polymerizable monomer composition is dispersed in the aqueous medium so that the polymerizable monomer composition may be granulated into particles. Then, the polymerizable monomer in each particle of the polymerizable monomer composition is polymerized in the aqueous medium so that the toner particles may be obtained.

The polymerizable monomer composition is preferably a composition prepared by first dispersing the colorant in a first polymerizable monomer to obtain a dispersion liquid, and mixing the dispersion liquid with a second polymerizable monomer. That is, the dispersed state of the pigment present in each toner particle can be additionally improved by sufficiently dispersing the pigment composition with the first polymerizable monomer and mixing the resultant with the second polymerizable monomer together with any other toner material.

A known polymerization initiator can be used as the polymerization initiator to be used in the suspension polymerization method. Examples thereof include an azo compound, an organic peroxide, an inorganic peroxide, an organometallic compound, and a photopolymerization initiator. Specific examples thereof include: azo-based polymerization initiators such as 2,2'-azobis(isobutyronitrile), 2,2'-azobis(2-methylbutyronitrile), 2,2'-azobis(4-methoxy-2,4-dimethylvaleronitrile), 2,2'-azobis(2,4-dimethylvaleronitrile), and dimethyl 2,2'-azobis (isobutyrate); organic peroxide-based polymerization initiators such as benzoyl peroxide, di-tert-butyl peroxide, tert-butylperoxyisopropyl monocarbonate, tert-hexylperoxy benzoate, and tert-butylperoxy benzoate; inorganic peroxide-based polymerization initiators such as potassium persulfate and ammonium persulfate; and a hydrogen peroxide-ferrous-based polymerization initiator, a BPO-dimethylaniline-based polymerization initiator, and a cerium (IV) salt-alcohol-based polymerization initiator. Examples of the photopolymerization initiator include acetophenones, benzoin ethers, and ketals. One kind of the polymerization initiators may be used alone, or two or more kinds thereof may be used in combination.

The addition amount of the polymerization initiator is preferably from 0.1 to 20 parts by mass, more preferably from 0.1 to 10 parts by mass with respect to 100 parts by mass of the polymerizable monomer.

A dispersion stabilizer is preferably incorporated into the aqueous medium to be used in the suspension polymerization method. The dispersion stabilizer to be used may be a known inorganic or organic dispersion stabilizer.

Examples of the inorganic dispersion stabilizer include calcium phosphate, magnesium phosphate, aluminum phosphate, zinc phosphate, magnesium carbonate, calcium carbonate, calcium hydroxide, magnesium hydroxide, aluminum hydroxide, calcium metasilicate, calcium sulfate, barium sulfate, bentonite, silica, and alumina.

Examples of the organic dispersion stabilizer include polyvinyl alcohol, gelatin, methylcellulose, methylhydroxypropylcellulose, ethylcellulose, carboxymethylcellulose sodium salt, and starch.

In addition, a nonionic, anionic, or cationic surfactant can also be utilized. Examples thereof include sodium dodecyl sulfate, sodium tetradecyl sulfate, sodium pentadecyl sulfate, sodium octyl sulfate, sodium oleate, sodium laurate, potassium stearate, and calcium oleate.

Out of the dispersion stabilizers, in the present invention, a poorly water-soluble inorganic dispersion stabilizer that is soluble in an acid is preferably used. In addition, in the present invention, when an aqueous medium is prepared with the poorly water-soluble inorganic dispersion stabilizer, such dispersion stabilizer is preferably used so that its addition amount may be from 0.2 to 2.0 parts by mass with respect to 100 parts by mass of the polymerizable monomer. When the dispersion stabilizer is used in the range, the droplet stability of the polymerizable monomer composition in the aqueous medium is improved. In addition, in the present invention, the aqueous medium is preferably prepared with water whose amount ranges from 300 to 3,000 parts by mass with respect to 100 parts by mass of the polymerizable monomer composition.

In the present invention, when the aqueous medium having dispersed therein the poorly water-soluble inorganic dispersion stabilizer is prepared, a commercial dispersion stabilizer may be used as it is and dispersed. Further, particles of the poorly water-soluble inorganic dispersion stabilizer having a fine and uniform particle size are preferably obtained by producing the dispersion stabilizer in water under high-speed stirring. For example, when calcium phosphate is used as a dispersion stabilizer, a preferred dispersion stabilizer can be obtained by mixing an aqueous solution of sodium phosphate and an aqueous solution of calcium chloride under high-speed stirring to form fine particles of calcium phosphate.

Even when the toner particles of the present invention are produced by the suspension granulation method, suitable toner particles can be obtained. As no heating step is included in the production steps of the suspension granulation method, the compatibilization of the resin and the wax that occurs when a low-melting wax is used is suppressed, and hence a reduction in the glass transition temperature of the toner resulting from the compatibilization can be prevented. In addition, the suspension granulation method offers a wide choice of toner materials each serving as the binder resin, and facilitates the use of a polyester resin generally credited with being advantageous for fixability as a main component. Accordingly, the suspension granulation method is a production method advantageous when toner particles having such resin composition that the suspension polymerization method cannot be applied are produced.

The toner particles to be produced by the suspension granulation method are produced, for example, as described below. First, the colorant containing the pigment composition of the present invention, the binder resin, the wax, and the like are mixed in a solvent so that a solvent composition may be prepared. Next, the solvent composition is dispersed in an aqueous medium so that the solvent composition may be granulated into particles. Thus, a toner particle suspension is obtained. Then, the solvent is removed from the resultant suspension by heating or decompression so that the toner particles may be obtained.

The solvent composition in the above-mentioned step is preferably a composition prepared by dispersing the colorant in a first solvent to obtain a dispersion liquid, and mixing the dispersion liquid with a second solvent. That is, the dispersed state of the pigment present in each toner particle can be additionally improved by sufficiently dispersing the colorant with the first solvent and mixing the resultant with the second solvent together with any other toner material.

Examples of the solvent that can be used in the suspension granulation method include hydrocarbons such as toluene, xylene, and hexane, halogen-containing hydrocarbons such as methylene chloride, chloroform, dichloroethane, trichloroethane, and carbon tetrachloride; alcohols such as methanol, ethanol, butanol, and isopropyl alcohol, polyhydric alcohols such as ethylene glycol, propylene glycol, diethylene glycol, and triethylene glycol; cellosolves such as methyl cellosolve and ethyl cellosolve, ketones such as acetone, methyl ethyl ketone, and methyl isobutyl ketone; ethers such as benzyl alcohol ethyl ether, benzyl alcohol isopropyl ether, and tetrahydrofuran; and esters such as methyl acetate, ethyl acetate, and butyl acetate. One kind of the solvents may be used alone, or two or more kinds thereof may be used as a mixture. Of those, a solvent having a low boiling point and capable of sufficiently dissolving the binder resin is preferably used in order to easily remove the solvent in the toner particle suspension.

The usage amount of the solvent falls within the range of preferably from 50 to 5,000 parts by mass, more preferably from 120 to 1,000 parts by mass with respect to 100 parts by mass of the binder resin.

A dispersion stabilizer is preferably incorporated into the aqueous medium to be used in the suspension granulation method. The dispersion stabilizer to be used may be a known inorganic or organic dispersion stabilizer. Examples of the inorganic dispersion stabilizer include calcium phosphate, calcium carbonate, aluminum hydroxide, calcium sulfate, and barium carbonate. Examples of the organic dispersion stabilizer include: water-soluble polymers such as polyvinyl alcohol, methylcellulose, hydroxyethylcellulose, ethylcellulose, carboxymethylcellulose sodium salt, sodium polyacrylate, and sodium polymethacrylate; anionic surfactants such as sodium dodecylbenzene sulfonate, sodium octadecyl sulfate, sodium oleate, sodium lauryl sulfate, and potassium stearate; cationic surfactants such as lauryl amine acetate, stearyl amine acetate, and lauryl trimethylammonium chloride; zwitterionic surfactants such as lauryl dimethylamine oxide; and nonionic surfactants such as a polyoxyethylene alkyl ether, a polyoxyethylene alkyl phenyl ether, and a polyoxyethylene alkyl amine.

The usage amount of the dispersion stabilizer preferably falls within the range of from 0.01 to 20 parts by mass with respect to 100 parts by mass of the binder resin in terms of the droplet stability of the solvent composition in the aqueous medium.

The weight-average particle diameter (hereinafter also referred to as "D4") of the toner is preferably from 3.0 to 15.0 μm, more preferably from 4.0 to 12.0 μm. When the weight-average particle diameter of the toner falls within the range, charge stability can be improved, and in continuous development on a large number of sheets, fogging and toner scattering can be suppressed. Further, reproducibility at a half-tone portion is improved, and the surface unevenness of an image to be obtained can be easily reduced.

In addition, the ratio of the weight-average particle diameter D4 of the toner to the number-average particle diameter (hereinafter also referred to as "D1") thereof (hereinafter also referred to as "D4/D1") is preferably 1.35 or less, more preferably 1.30 or less. When the ratio D4/D1 falls within the range, the occurrence of fog and a reduction in transfer efficiency can be suppressed, and a high-resolution image can be easily obtained.

It should be noted that the D4 and D1 of the toner can be adjusted depending on a method of producing the toner particles. In the case of, for example, the suspension polymerization method, the adjustment can be performed by controlling the concentration of the dispersion stabilizer to be used at the time of the preparation of the aqueous medium, a reaction stirring speed, a reaction stirring time, or the like.

The toner of the present invention may be a magnetic toner or may be a non-magnetic toner. When the toner of the present invention is used as a magnetic toner, the toner particles constituting the toner of the present invention may each be mixed with a magnetic material before use. Examples of the magnetic material include iron oxides such as magnetite, maghemite, and ferrite or iron oxides containing other metal oxides, metals such as Fe, Co, and Ni or alloys of these metals and metals such as Al, Co, Cu, Pb, Mg, Ni, Sn, Zn, Sb, Be, Bi, Cd, Ca, Mn, Se, Ti, W, and V, and mixtures thereof. The magnetic material that is particularly suitable for the object of the present invention is fine powder of triiron tetraoxide or γ-diiron trioxide.

The average particle diameter of such magnetic material is preferably from 0.1 to 2.0 μm, more preferably from 0.1 to 0.3 μm. In addition, the magnetic characteristics thereof under application of a magnetic field of 795.8 kA/m are preferably a coercive force of from 1.6 to 12 kA/m, a saturation magnetization of from 5 to 200 $Am^2/kg$ (preferably from 50 to 100 $Am^2/kg$), and a residual magnetization of from 2 to 20 $Am^2/kg$ in terms of the developability of the toner.

The addition amount of such magnetic material is preferably from 10 to 200 parts by mass, more preferably from 20 to 150 parts by mass with respect to 100 parts by mass of the binder resin.

EXAMPLES

The present invention is hereinafter described in more detail by way of Examples and Comparative Examples. However, the present invention is by no means limited to Examples shown below. It should be noted that, in the following description, unless otherwise stated, the terms "part(s)" and "%" refer to "part(s) by mass" and "mass %", respectively.

Measurement methods to be employed in production examples of the present invention are described below.

(1) Molecular Weight Measurement

The molecular weight of the compound having a colorant skeleton structure is calculated by size exclusion chromatography (SEC) in terms of polystyrene. The measurement of the molecular weight by SEC was performed as described below.

A sample was added to the following eluent so that a sample concentration became 1.0%. The mixture was left at rest at room temperature for 24 hours. The resultant solution was filtered with a solvent-resistant membrane filter having a pore size of 0.2 µm. The resultant filtrate was defined as a sample solution. Then, the sample solution was subjected to measurement under the following conditions.

Apparatus: High-speed GPC apparatus "HLC-8220GPC" [manufactured by TOSOH CORPORATION]
Column: Twin LF-804
Eluent: THF
Flow rate: 1.0 ml/min
Oven temperature: 40° C.
Sample injection amount: 0.025 ml In addition, in the calculation of the molecular weight of the sample, a molecular weight calibration curve prepared with standard polystyrene resins [TSK standard polystyrenes F-850, F-450, F-288, F-128, F-80, F-40, F-20, F-10, F-4, F-2, F-1, A-5000, A-2500, A-1000, and A-500 manufactured by Tosoh Corporation] was used.

(2) Acid Value Measurement

The acid value of the compound having a colorant skeleton structure was measured by the following method.

Basic operations are based on JIS K-0070.

(1) 0.5 to 2.0 Grams of a sample is precisely weighed. The mass at this time is represented by M (g).

(2) The sample is loaded into a 50-ml beaker, and ml of a mixed liquid of tetrahydrofuran and ethanol (2/1) are added to dissolve the sample.

(3) The resultant solution is titrated with a 0.1 mol/l solution of KOH in ethanol by using a potentiometric titration measuring apparatus [for example, an automatic titration measuring apparatus "COM-2500" manufactured by Hiranuma Sangyo Co., Ltd. may be utilized].

(4) The usage amount of the KOH solution at the time is represented by S (ml). Blank measurement is simultaneously performed, and the usage amount of the KOH solution at this time is represented by B (ml).

(5) The acid value is calculated from the following equation where f represents the factor of the KOH solution.

$$\text{Acid value [mg }KOH\text{/g]} = \frac{(S-B) \times f \times 5.61}{M}$$

(3) Composition Analysis

The structures of the compound having a high-molecular-weight portion and a colorant skeleton structure were determined with the following apparatus.

$^1$H NMR:
ECA-400 manufactured by JEOL Ltd. (solvent used: deuterated chloroform)

$^{13}$C NMR:
FT-NMR AVANCE-600 manufactured by Bruker BioSpin K.K. (solvent used: deuterated chloroform)

It should be noted that, in the $^{13}$C NMR, composition analysis was performed through quantification by an inverse gated decoupling method involving using chromium(III) acetylacetonate as a relaxation agent.

(4) Number of Colorant Skeleton Structures

The number of colorant skeleton structures per molecule was calculated from: the number-average molecular weight obtained by the molecular weight measurement described in the section (1); and the ratio of the number of carbon atoms constituting a copolymer assigned to each peak determined from the results of the data analysis of the $^{13}$C NMR obtained by the composition analysis described in the section (3).

(5) Introduction Ratio of Colorant Skeleton Structure

A value obtained by multiplying the number of colorant skeleton structures per molecule by 100 was calculated as an introduction ratio (%). It should be noted that the following assumption was made: only up to one colorant skeleton structure was introduced into one molecule.

Example 1

A compound having a colorant skeleton structure was produced by the following method.

Production Example of Compound (102)

A compound (102) having a colorant skeleton structure represented by the following structure was produced in accordance with the following scheme.

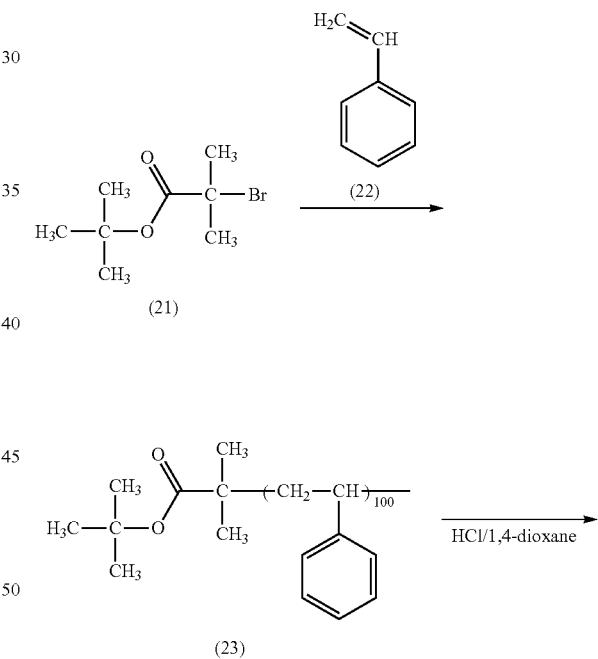

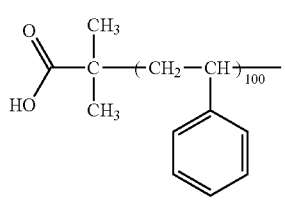

(P-2)

First, a polymer moiety (P-2) was synthesized. 1.1 Parts of a compound (21) as a radical initiator having a protective group, 50 parts of styrene (22), and 0.83 part of N,N,N',N",N"-pentamethyldiethylenetriamine were added to 5.0 parts of anisole, and the mixture was subjected to freeze deaeration three times, followed by the addition of 0.69 part of copper bromide under a nitrogen atmosphere. After the solution had been subjected to a reaction under a nitrogen atmosphere at 100° C. for 8 hours, the reaction solution was exposed to the air. Thus, the reaction was completed. After the completion of the reaction, the reaction liquid was concentrated and then reprecipitated with methanol, and the resultant precipitate was dissolved in tetrahydrofuran. Copper bromide was removed by passing the solution through activated alumina. After the solvent had been removed by evaporation under reduced pressure, the precipitate was dried under reduced pressure to provide 40 parts of a polymer compound (23).

40 Parts of the resultant polymer compound (23) was dissolved in 200 parts of 1,4-dioxane, and 100 parts of a 12 M aqueous solution of hydrochloric acid was added to the solution, followed by stirring at 120° C. for 12 hours. After the completion of the reaction, the reaction liquid was concentrated and then reprecipitated with methanol, and the resultant precipitate was dried under reduced pressure to provide 36 parts of a compound (P-2).

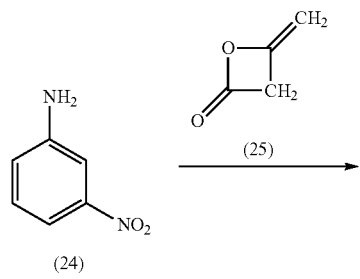

(24)

(25)

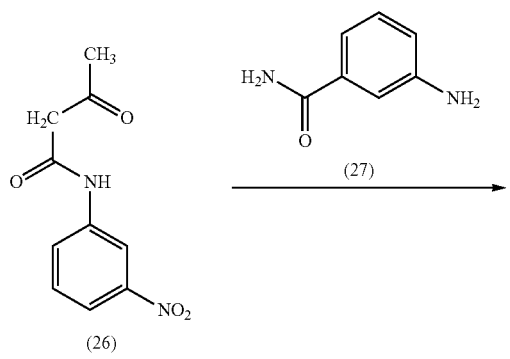

(26)

(27)

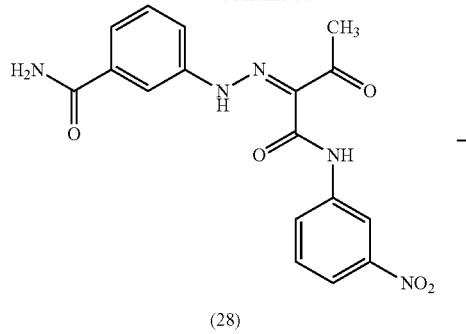

(28)

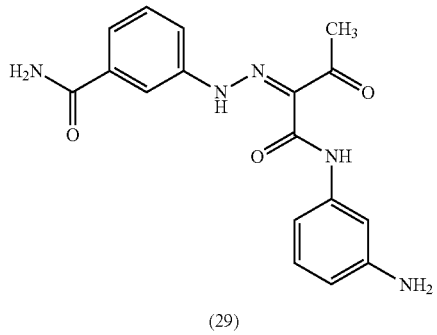

(29)

Next, a colorant was synthesized. 25.0 Parts of a compound (24), 15.4 parts of a compound (25), and 15.0 parts of acetone were added to 140 parts of acetic acid, and the mixture was stirred at 65° C. for 3 hours. After the completion of the reaction, the mixture was discharged to 1,200 parts of water, and the resultant was filtered. Thus, 38.4 parts of a compound (26) was obtained (yield: 96.0%).

25.0 Parts of methanol and 6.00 parts of concentrated hydrochloric acid were added to 2.45 parts of a compound (27), and the mixture was cooled with ice to 10° C. or less. A solution prepared by dissolving 1.37 parts of sodium nitrite in 5.50 parts of water was added to the solution, and the mixture was subjected to a reaction at the temperature for 1 hour (diazonium salt solution). Subsequently, 4.00 parts of the compound (26) was added to 40.0 parts of methanol, and the mixture was cooled with ice to 10° C. or less, followed by the addition of the diazonium salt solution. After that, a solution prepared by dissolving 8.86 parts of sodium acetate in 35.0 parts of water was added to the resultant, and the mixture was subjected to a reaction at 10° C. or less for 2 hours. After the completion of the reaction, 300 parts of water was added to the resultant, and the mixture was stirred for 30 minutes. After that, the solid was separated by filtration and purified by a recrystallization method from N,N-dimethylformamide to provide 6.37 parts of a compound (28) (yield: 95.8%).

6.00 Parts of the compound (28) and 0.3 part of palladium-activated carbon (palladium: 5%) were added to 150 parts of N,N-dimethylformamide, and the mixture was stirred under a hydrogen gas atmosphere (reaction pressure: 0.1 to 0.4 MPa) at 40° C. for 3 hours. After the completion of the reaction, the solution was separated by filtration and concentrated to provide 4.84 parts of a compound (29) (yield: 87.9%).

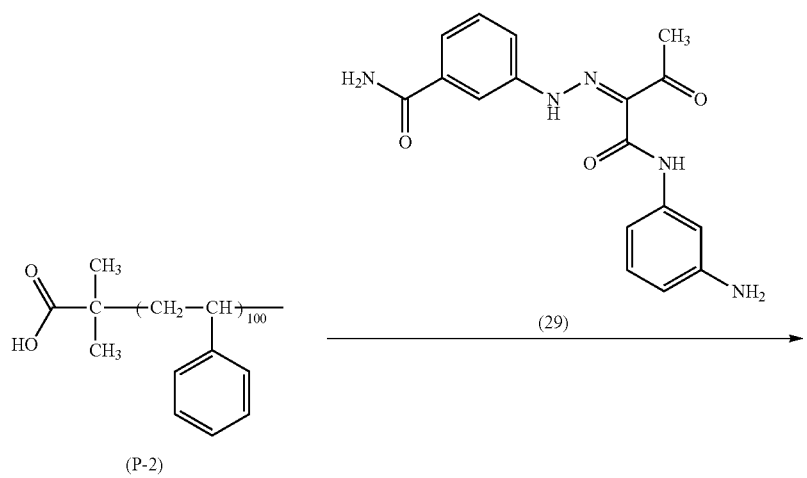

(P-2) (29)

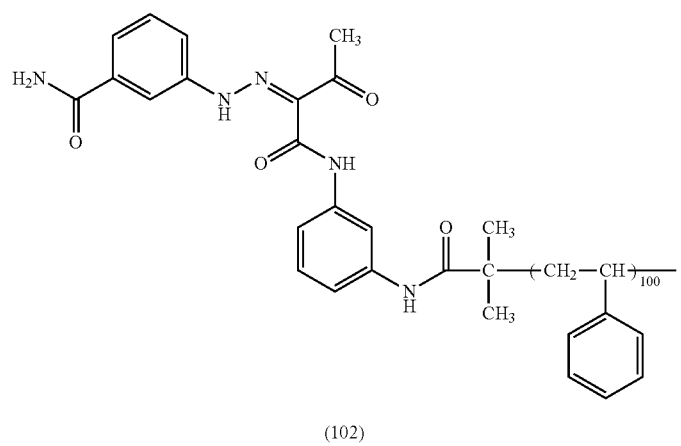

(102)

Finally, the compound (102) having a colorant skeleton structure was synthesized. 5.00 Parts of the compound (P-2) was dissolved in 50.0 parts of chloroform, and 0.346 part of thionyl chloride was dropped to the solution, followed by stirring at room temperature for 24 hours. After that, chloroform and excess thionyl chloride were removed by concentrating the reaction liquid. The resultant resin solid matter was recovered and dissolved in 34.6 parts of N,N-dimethylacetamide again. 0.231 Part of the compound (29) was added to the solution, and the mixture was stirred under a nitrogen atmosphere at 65° C. for 7.5 hours. After the completion of the reaction, the reaction liquid was concentrated and then reprecipitated with methanol to provide 4.56 parts of the compound (102) having a colorant skeleton structure.

It should be noted that the fact that the resultant compound had the structure of the compound (102) having a colorant skeleton structure was confirmed by using the above-mentioned respective apparatus. Analysis results are described below.

[Analysis Results of Compound (102) Having Colorant Skeleton Structure]

[1] Results of molecular weight measurement (GPC):
Weight-average molecular weight (Mw)=12,327; number average molecular weight (Mn)=10,683

[2] Result of acid value measurement:
0.0 mgKOH/g

[3] Results of $^{13}$C NMR (150 MHz, CDCl$_3$, room temperature) (see FIG. 1):
δ [ppm]=199.4 (1C), 175.4 (1C), 170.6 (1C), 168.4 (1C), 162.7 (1C), 146.0-144.9 (119.3C), 142.1 (1C), 138.3 (1C), 137.3 (1C), 135.0 (1C), 130.1 (1C), 129.2 (1C), 128.2-127.2, 125.6-125.5, 118.3 (1C), 116.4-116.3 (2C), 115.6 (1C), 112.2 (1C), 46.3-40.3, 26.3 (1C), 26.0 (1C)

The number of carbon atoms constituting a polymer assigned to each peak was determined from the results of the data analysis of the $^{13}$C NMR. The number of monomer units constituting the compound (102) having a colorant skeleton structure was calculated from those measurement results. As a result, the number of styrene molecules was 100 and the number of azo skeleton structures was about 0.90.

Example 2

Production Example of Compound (105)

A compound (105) having a colorant skeleton structure represented by the following structure was produced by the same method as described above in accordance with the following scheme.

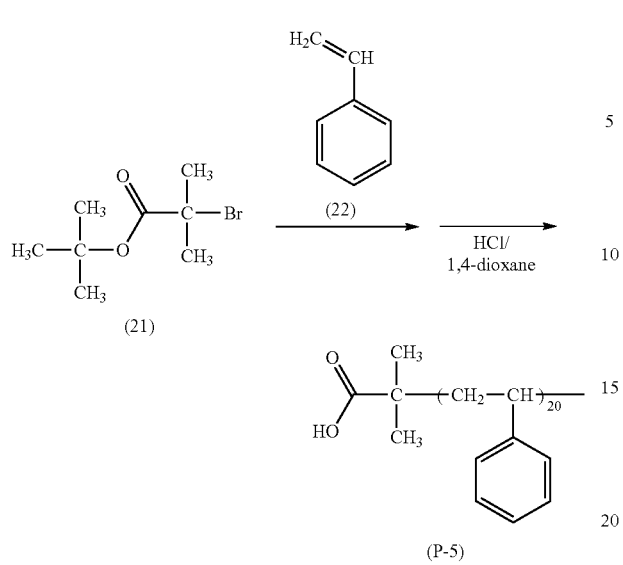

First, a polymer moiety (P-5) was synthesized. 4.32 Parts of a compound (21) as a radical initiator having a protective group, 80 parts of styrene (22), and 1.36 parts of N,N,N',N'',N''-pentamethyldiethylenetriamine were added to 8.0 parts of anisole, and the mixture was subjected to freeze deaeration three times, followed by the addition of 1.12 parts of copper bromide under a nitrogen atmosphere. After the solution had been subjected to a reaction under a nitrogen atmosphere at 100° C. for 3 hours, the reaction solution was exposed to the air. Thus, the reaction was completed. After the completion of the reaction, the reaction liquid was concentrated and then reprecipitated with methanol, and the resultant precipitate was dissolved in tetrahydrofuran. Copper bromide was removed by passing the solution through activated alumina. After the solvent had been removed by evaporation under reduced pressure, the precipitate was dried under reduced pressure to provide 43 parts of a polymer compound.

43 Parts of the resultant polymer compound was dissolved in 300 parts of 1,4-dioxane, and 100 parts of a 12 mol/L aqueous solution of hydrochloric acid was added to the solution, followed by stirring at 120° C. for 12 hours. After the completion of the reaction, the reaction liquid was concentrated and then reprecipitated with methanol, and the resultant precipitate was dried under reduced pressure to provide 30 parts of a compound (P-5).

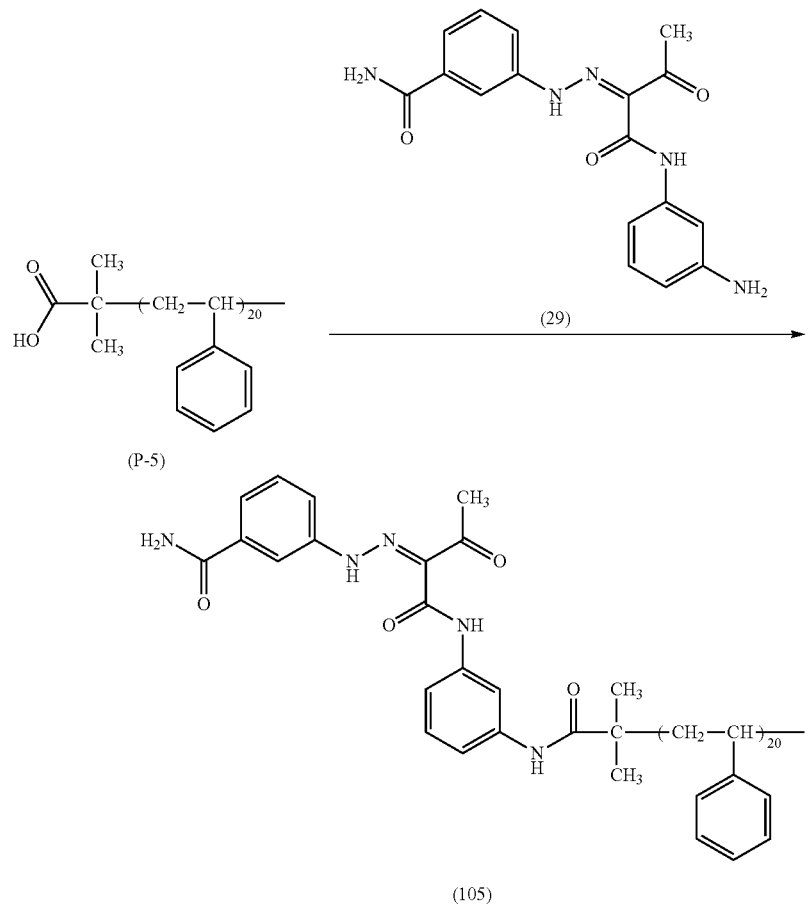

Next, the compound (105) having a colorant skeleton structure was synthesized. 5.00 Parts of the compound (P-5) was dissolved in 50.0 parts of chloroform, and 1.18 parts of thionyl chloride was dropped to the solution, followed by stirring at room temperature for 24 hours. After that, chloroform and excess thionyl chloride were removed by concentrating the reaction liquid. The resultant resin solid matter was recovered and dissolved in 34.6 parts of N,N-dimethylacetamide again. 0.759 Part of the compound (29) was added to the solution, and the mixture was stirred under a nitrogen atmosphere at 65° C. for 7.5 hours. After the completion of the reaction, the reaction liquid was concentrated and then reprecipitated with methanol to provide 5.17 parts of the compound (105) having a colorant skeleton structure.

It should be noted that the fact that the resultant compound had the structure of the compound (105) having a colorant skeleton structure was confirmed by using the above-mentioned respective apparatus. Analysis results are described below.

[Analysis Results of Compound (105) Having Colorant Skeleton Structure]

[1] Results of molecular weight measurement (GPC):

Weight-average molecular weight (Mw)=2,397, number average molecular weight (Mn)=2,235

[2] Result of acid value measurement:

0.0 mgKOH/g

Figure 2:
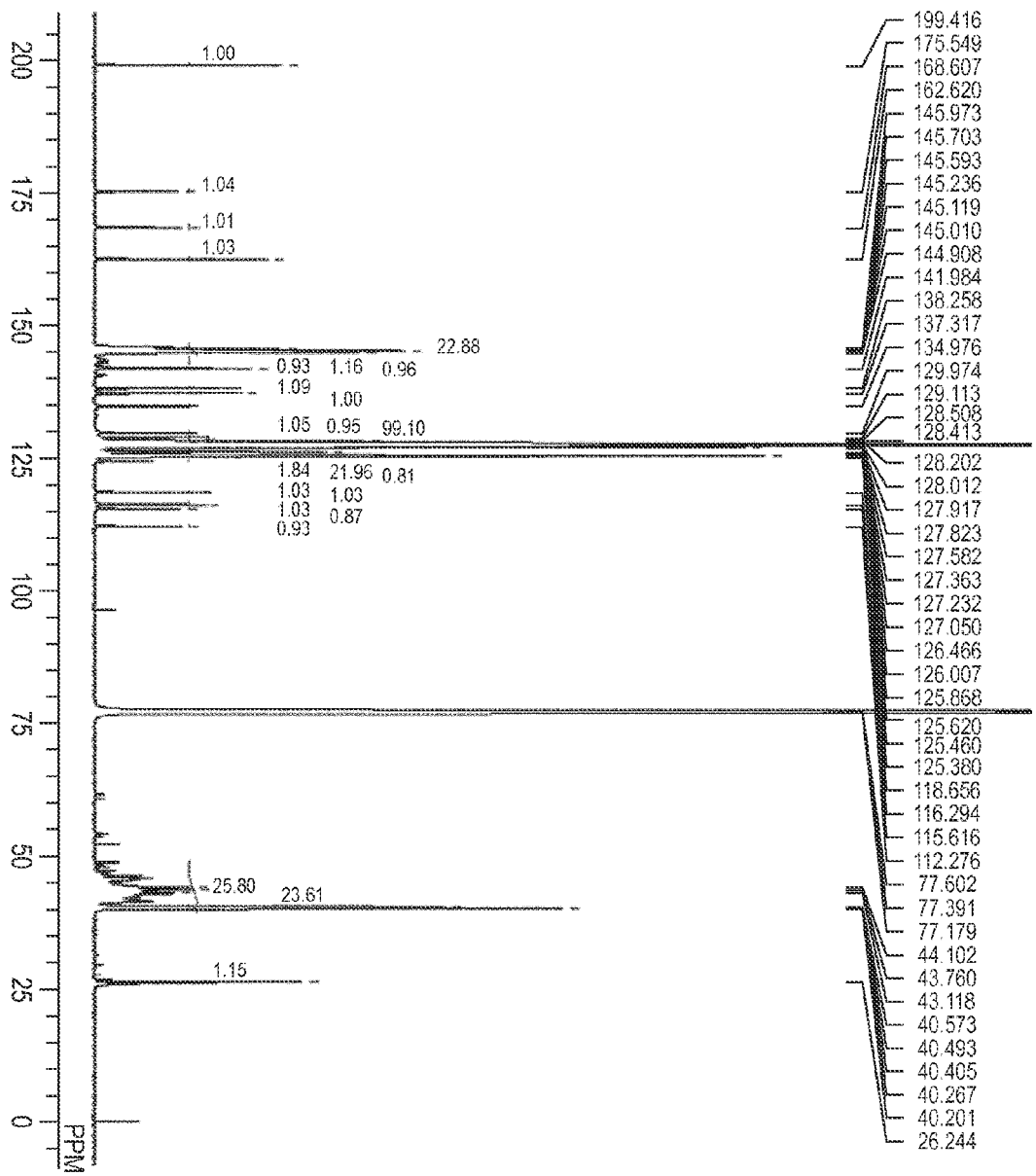
FIG. 2 shows the $^{13}$C NMR spectrum of a compound (105) of the present invention in CDCl$_3$ at room temperature and 150 MHz.

[3] Results of $^{13}$C NMR (150 MHz, CDCl$_3$, room temperature) (see FIG. 2):

δ [ppm]=199.4 (1C), 175.5 (1C), 168.6 (1C), 162.6 (1C), 146.0-144.9 (22.9), 144.0-143.0 (1C), 142.0 (1C), 138.3 (1C), 137.3 (1C), 135.0 (1C), 130.0 (1C), 129.1 (1C), 128.5-127.1, 126.7-125.4, 124.5, 118.7 (1C), 116.5 (1C), 116.3 (1C), 115.6 (1C), 112.3 (1C), 46.3-41.5, 40.6-40.2, 26.2 (1C)

The number of carbon atoms constituting a polymer assigned to each peak was determined from the results of the data analysis of the $^{13}$C NMR. The number of monomer units constituting the compound (105) having a colorant skeleton structure was calculated from those measurement results. As a result, the number of styrene molecules was 20 and the number of colorant skeleton structures was about 0.93.

Example 3

Production Example of Compound (122)

A compound (122) having a colorant skeleton structure represented by the following structure was produced in accordance with the following scheme.

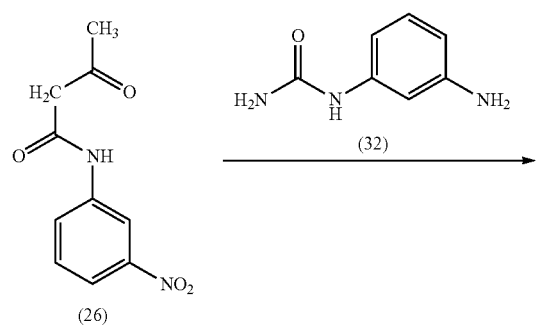

(26)

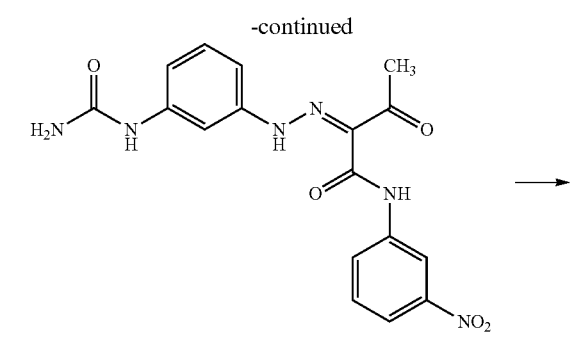

(33)

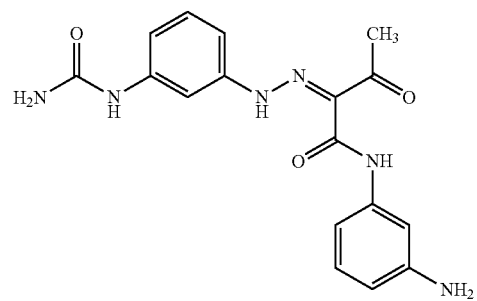

(34)

71.0 Parts of N,N-dimethylformamide and 14.5 parts of concentrated hydrochloric acid were added to 7.49 parts of a compound (32), and the mixture was cooled with ice to 5° C. or less. A solution prepared by dissolving 3.56 parts of sodium nitrite in 20.0 parts of water was added to the solution, and the mixture was stirred at the temperature for 1 hour (diazonium salt solution). 10.0 Parts of the compound (26) and 32.1 parts of calcium carbonate were added to 94.4 parts of N,N-dimethylformamide, and the mixture was cooled with ice to 5° C. or less. The diazonium salt solution was added to the cooled product, and the mixture was subjected to a reaction at 5° C. or less for 3 hours. After the completion of the reaction, the reaction liquid was filtered and the solvent was removed by evaporation under reduced pressure. The deposited precipitate was washed with dilute hydrochloric acid and water to provide 15.0 parts of a compound (33) (yield: 80.2%).

Next, 15.0 parts of the compound (33) and 1.67 parts of palladium-activated carbon (palladium: 5%) were added to 188 parts of N,N-dimethylformamide, and the mixture was stirred under a hydrogen gas atmosphere (reaction pressure: 0.1 to 0.4 MPa) at room temperature for 16 hours. After the completion of the reaction, a component containing the palladium-activated carbon was separated by filtration by passing the reaction liquid through activated alumina. The solvent of the filtrate was removed by evaporation under reduced pressure, and the deposited precipitate was washed with methanol to provide 10.7 parts of a compound (34) (yield: 81.7%).

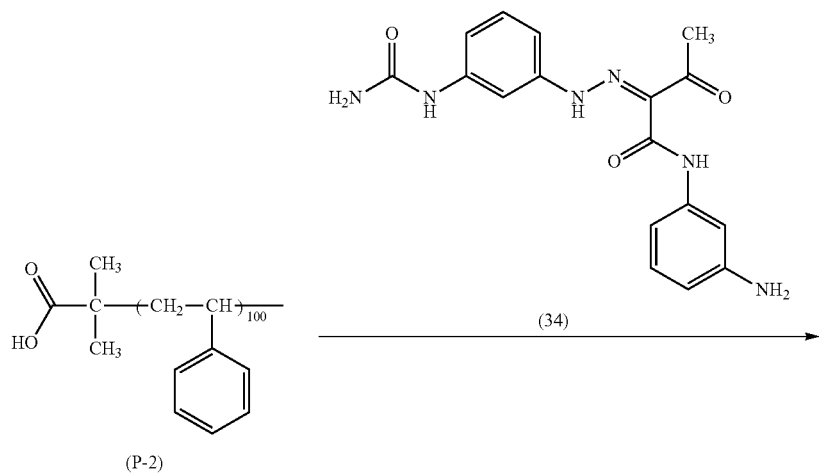

(P-2)    (34)

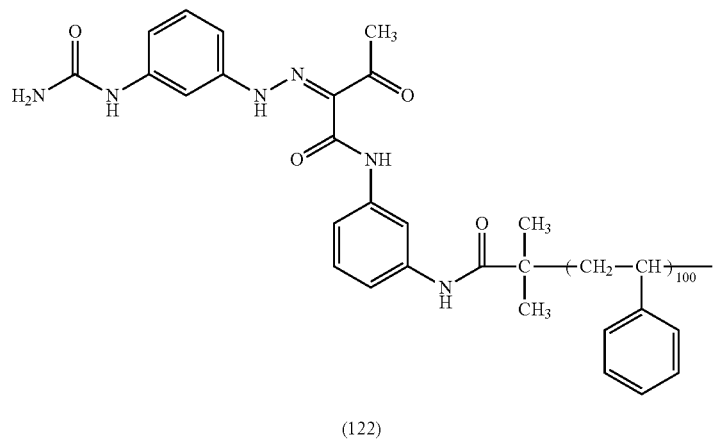

(122)

1.00 Part of the compound (P-2) was dissolved in 50.0 parts of chloroform, and 0.346 part of thionyl chloride was dropped to the solution, followed by stirring at room temperature for 24 hours. After that, chloroform and excess thionyl chloride were removed by concentrating the reaction liquid. The resultant resin solid matter was recovered and dissolved in 34.6 parts of N,N-dimethylacetamide again. 0.231 Part of the compound (34) was added to the solution, and the mixture was stirred under a nitrogen atmosphere at 65° C. for 7.5 hours. After the completion of the reaction, the reaction liquid was concentrated and then reprecipitated with methanol to provide 0.91 part of the compound (122) having a colorant skeleton structure.

It should be noted that the fact that the resultant compound had the structure of the compound (122) having a colorant skeleton structure was confirmed by using the above-mentioned respective apparatus. Analysis results are described below.

[Analysis Results of Compound (122) Having Colorant Skeleton Structure]

[1] Results of molecular weight measurement (GPC):
Weight-average molecular weight (Mw)=12,102; number-average molecular weight (Mn)=10,861

[2] Result of acid value measurement:
0.97 mgKOH/g

Figure 3:
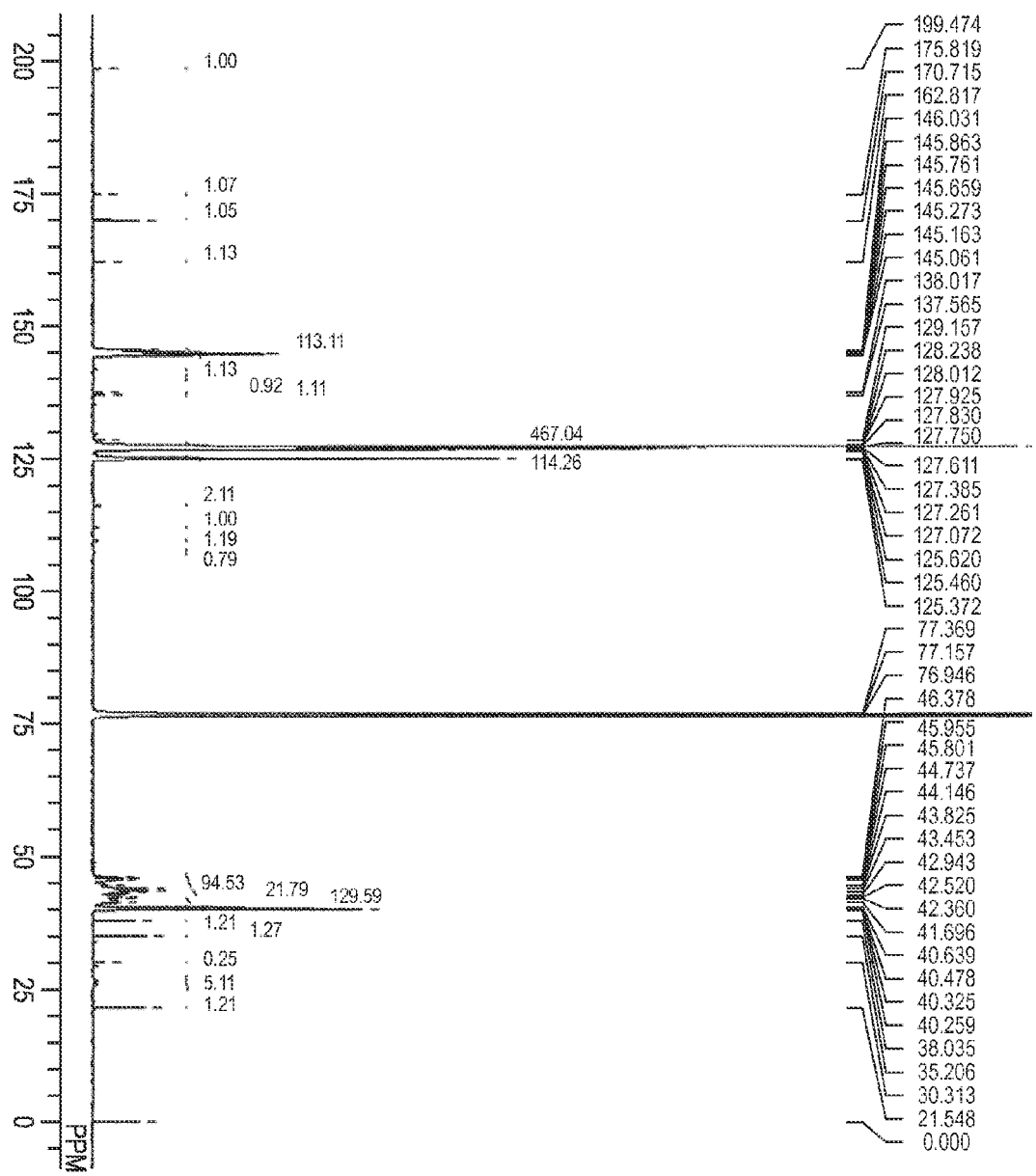
FIG. 3 shows the $^{13}$C NMR spectrum of a compound (122) of the present invention in CDCl$_3$ at room temperature and 150 MHz.

[3] Results of $^{13}$C NMR (150 MHz, CDCl$_3$, room temperature) (see FIG. 3):

δ [ppm]=199.5 (1C), 175.8 (1C), 170.7 (1C), 162.8 (1C), 146.0-145.1 (113.1C), 142.4 (1C), 138.0 (1C), 137.6 (1C), 128.2-127.1, 125.6-125.4, 116.7 (1C), 116.4 (1C), 112.5 (1C), 110.0 (1C), 108.0 (1C), 46.4-41.7, 40.6-40.3, 38.0 (1C), 35.2 (1C), 27.0-25.4, 21.5 (1C)

The number of carbon atoms constituting a copolymer assigned to each peak was determined from the results of the data analysis of the $^{13}$C NMR. The number of monomer units constituting the compound (122) having a colorant skeleton structure was calculated from those measurement results. As a result, the number of styrene molecules was 100 and the number of colorant skeleton structures was 0.92.

Example 4

Production Example of Compound (123)

A compound (123) having a colorant skeleton structure represented by the following structure was produced in accordance with the following scheme.

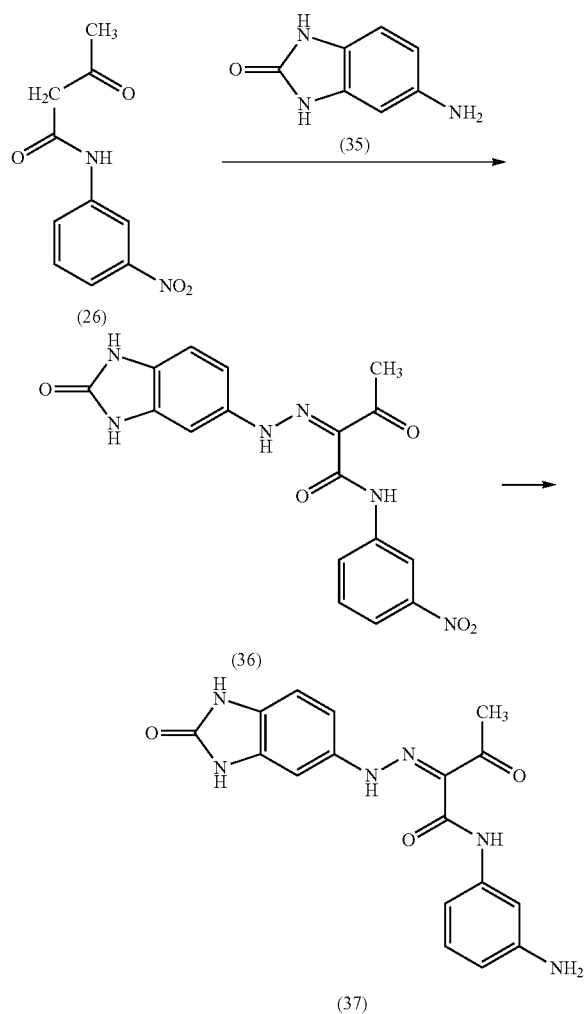

142 Parts of N,N-dimethylformamide and 30.8 parts of concentrated hydrochloric acid were added to 15.0 parts of a compound (35), and the mixture was cooled with ice to 5° C. or less. A solution prepared by dissolving 7.25 parts of sodium nitrite in 50.0 parts of water was added to the solution, and the mixture was stirred at the temperature for 1 hour (diazonium salt solution). 21.9 Parts of the compound (26) and 68.4 parts of calcium carbonate were added to 142 parts of N,N-dimethylformamide, and the mixture was cooled with ice to 5° C. or less. The diazonium salt solution was added to the cooled product, and the mixture was subjected to a reaction at 5° C. or less for 3 hours. After the completion of the reaction, the reaction liquid was filtered and the solvent was removed by evaporation under reduced pressure. The deposited precipitate was washed with dilute hydrochloric acid, water, and methanol to provide 36.0 parts of a compound (36) (yield: 94.3%).

The resultant compound (36) was added to 203 parts of 1,4-dioxane, and a solution prepared by dissolving 12.4 parts of sodium hydrosulfide in 80 parts of water was dropped to the mixture under room temperature. After the dropping, the temperature of the resultant solution was increased and the solution was stirred at 50° C. for 26 hours. After the completion of the reaction, the reaction liquid was poured into water and the deposited precipitate was separated by filtration. The precipitate was washed with dilute hydrochloric acid, water, and methanol to provide 10.0 parts of a compound (37) (yield: 50.6%).

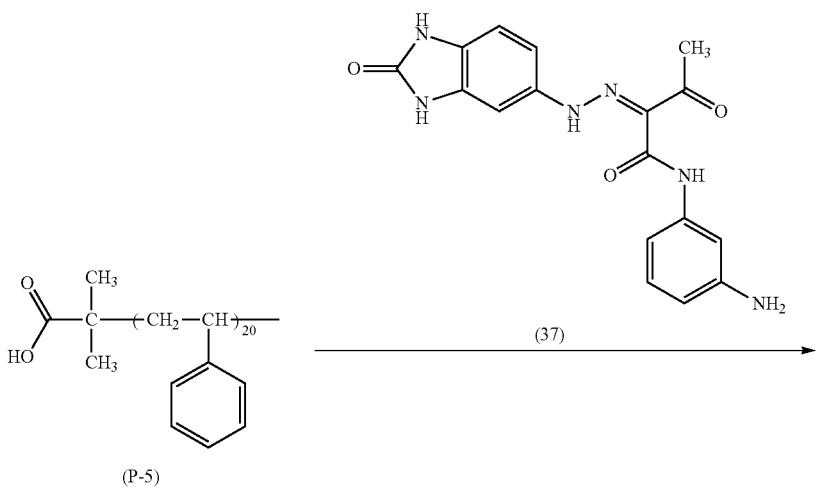

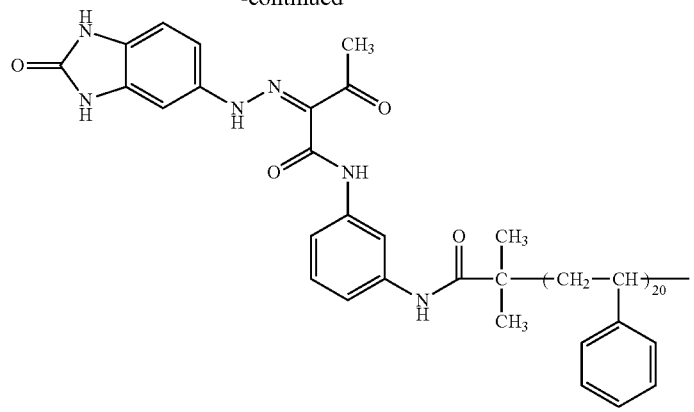

(123)

5.00 Parts of the compound (P-5) was dissolved in 50.0 parts of chloroform, and 1.18 parts of thionyl chloride was dropped to the solution, followed by stirring at room temperature for 24 hours. After that, chloroform and excess thionyl chloride were removed by concentrating the reaction liquid. The resultant resin solid matter was recovered and dissolved in 34.6 parts of N,N-dimethylacetamide again. 0.814 Part of the compound (37) was added to the solution, and the mixture was stirred under a nitrogen atmosphere at 65° C. for 8 hours. After the completion of the reaction, the reaction liquid was concentrated and then reprecipitated with methanol and the deposited precipitate was separated by filtration. The precipitate was washed by being dispersed in methanol to provide 4.85 parts of the compound (123) having a colorant skeleton structure.

It should be noted that the fact that the resultant compound had the structure of the compound (123) having a colorant skeleton structure was confirmed by using the above-mentioned respective apparatus. Analysis results are described below.

[Analysis Results of Compound (123) Having Colorant Skeleton Structure]

[1] Results of molecular weight measurement (GPC):

Weight-average molecular weight (Mw)=2,450; number-average molecular weight (Mn)=2,408

[2] Result of acid value measurement:

0.0 mgKOH/g

Figure 4:
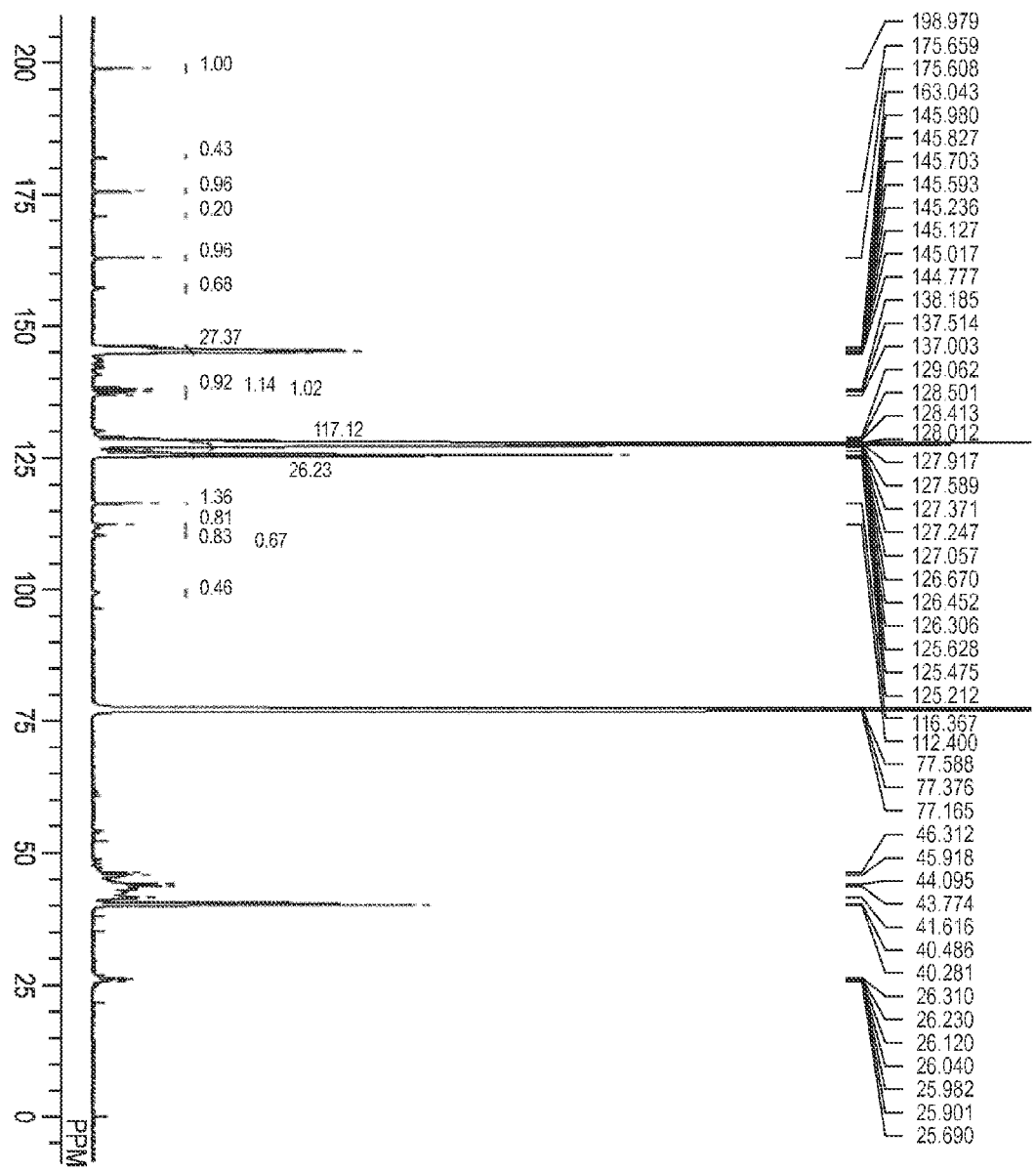
FIG. 4 shows the $^{13}$C NMR spectrum of a compound (123) of the present invention in CDCl$_3$ at room temperature and 150 MHz.

[3] Results of $^{13}$C NMR (150 MHz, CDCl$_3$, room temperature) (see FIG. 4):

δ [ppm]=199.0 (1C), 182.0 (1C), 175.7 (1C), 163.0 (1C), 157.2 (1C), 146.0-144.8 (27.4C), 138.2 (1C), 137.5 (1C), 137.0 (1C), 130.2-127.1, 125.6-125.2, 116.4 (1C), 112.4 (1C), 111.8-110.4 (1C), 99.4 (1C), 48.7-41.6, 40.5-40.3, 26.7-25.7

The number of carbon atoms constituting a copolymer assigned to each peak was determined from the results of the data analysis of the $^{13}$C NMR. The number of monomer units constituting the compound (123) having a colorant skeleton structure was calculated from those measurement results. As a result, the number of styrene molecules was 20 and the number of colorant skeleton structures was 0.86.

Example 5

Production Example of Compound (110)

A compound (110) having a colorant skeleton structure represented by the following structure was produced in accordance with the following scheme.

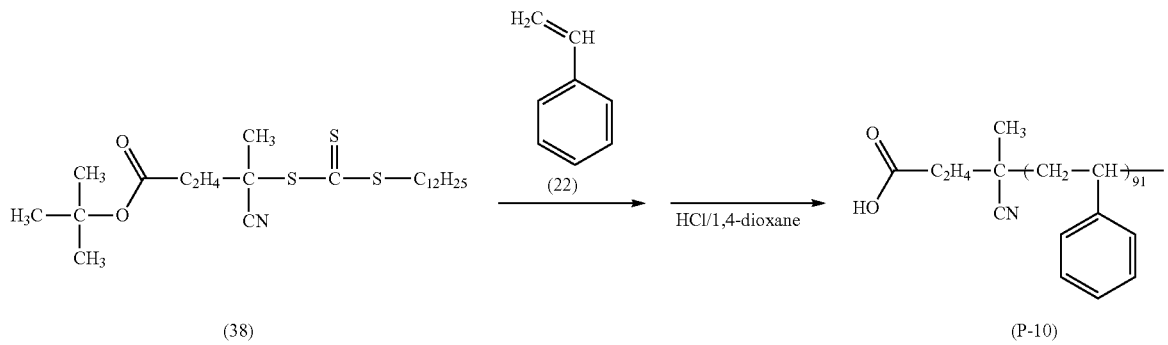

First, a polymer moiety (P-10) was synthesized. 30 Parts of styrene (22) and 0.077 part of 4,4'-azobis(4-cyanovaleric acid) were added to 3.0 parts of 1,4-dioxane, and the mixture was subjected to freeze deaeration three times, followed by the addition of 0.88 part of a compound (38) as an initiator (RAFT agent) having a protective group under a nitrogen atmosphere. After the solution had been subjected to a reaction under a nitrogen atmosphere at 100° C. for 8 hours, the reaction solution was exposed to the air. Thus, the reaction was completed. After the completion of the reaction, the reaction liquid was concentrated and then reprecipitated with methanol, and the resultant precipitate was dissolved in tetrahydrofuran. Copper bromide was removed by passing the solution through activated alumina. After the solvent had been removed by evaporation under reduced pressure, the precipitate was dried under reduced pressure to provide 20 parts of a polymer compound.

20 Parts of the resultant polymer compound was dissolved in 50 parts of 1,4-dioxane, and 25 parts of a 12 M aqueous solution of hydrochloric acid was added to the solution, followed by stirring at 120° C. for 12 hours. After the completion of the reaction, the reaction liquid was concentrated and then reprecipitated with methanol, and the resultant precipitate was dried under reduced pressure to provide 16 parts of a compound (P-10).

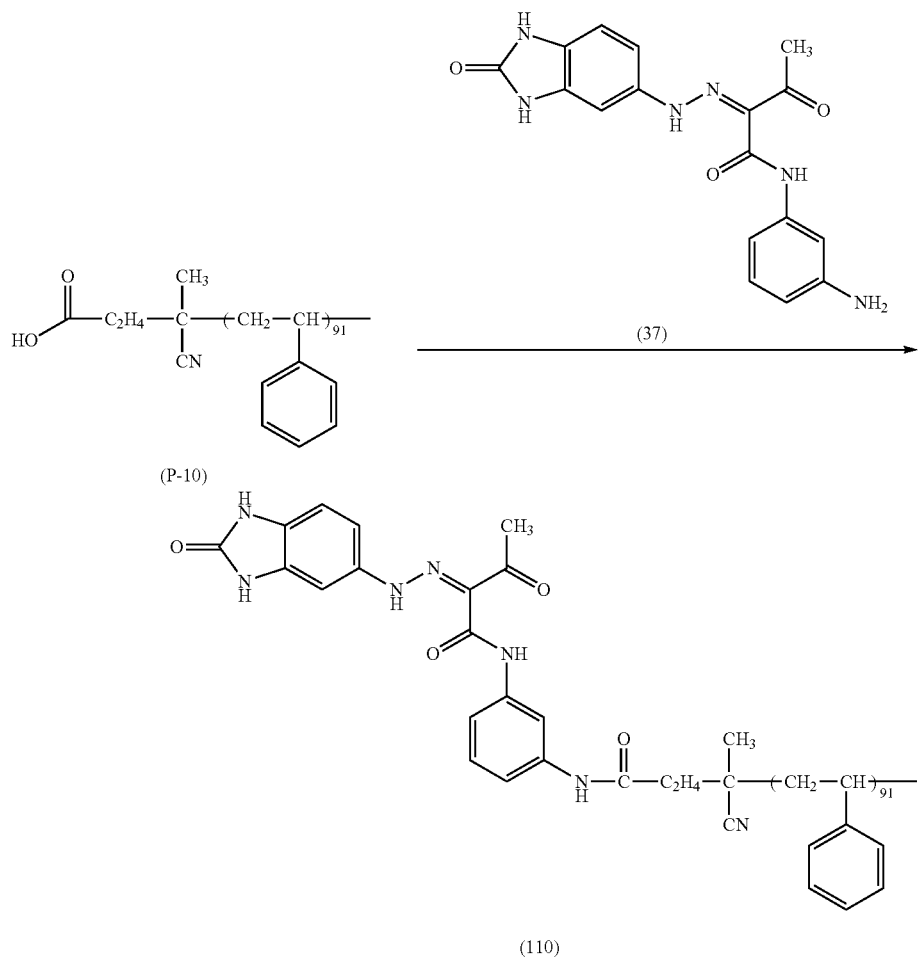

10.0 Parts of the compound (P-10) was dissolved in 148.0 parts of chloroform, and 0.75 part of thionyl chloride was dropped to the solution, followed by stirring at room temperature for 24 hours. After that, chloroform and excess thionyl chloride were removed by concentrating the reaction liquid. The resultant resin solid matter was recovered and dissolved in 61.1 parts of N,N-dimethylacetamide again. 0.514 Part of the compound (37) was added to the solution, and the mixture was stirred under a nitrogen atmosphere at 65° C. for 8 hours. After the completion of the reaction, the reaction liquid was concentrated and then reprecipitated with methanol and the deposited precipitate was separated by filtration. The precipitate was washed by being dispersed in methanol to provide 4.85 parts of the compound (110) having a colorant skeleton structure.

It should be noted that the fact that the resultant compound had the structure of the compound (110) having a colorant skeleton structure was confirmed by using the above-mentioned respective apparatus. Analysis results are described below.

(Analysis Results of Compound (110) Having Colorant Skeleton Structure)

[1] Results of molecular weight measurement (GPC):
Weight-average molecular weight (Mw)=8,924; number-average molecular weight (Mn)=6,941

[2] Result of acid value measurement:
0.0 mgKOH/g

Figure 5:
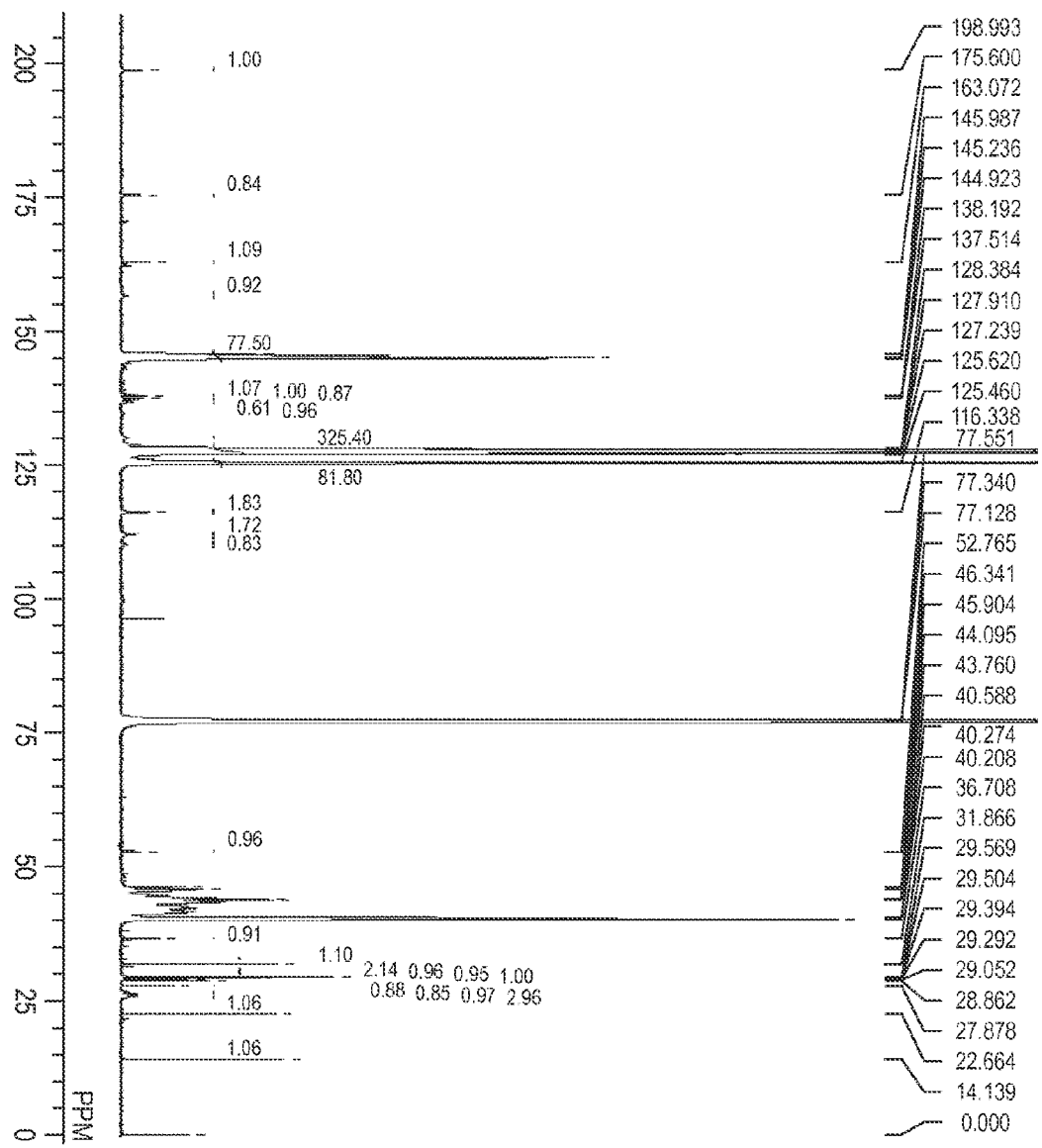
FIG. 5 shows the $^{13}$C NMR spectrum of a compound (110) of the present invention in CDCl$_3$ at room temperature and 150 MHz.

[3] Results of $^{13}$C NMR (150 MHz, CDCl$_3$, room temperature) (see FIG. 5):

δ [ppm]=199.0 (1C), 175.6 (1C), 163.1 (1C), 156.9 (1C), 146.0-144.9 (77.5C), 138.2 (1C), 137.5 (1C), 137.0 (1C), 130.3 (1C), 129.1 (1C), 128.4-127.2, 125.6-125.5, 116.3 (1C), 112.3 (1C), 110.3 (1C), 53.1-52.8 (1C), 46.3-40.2, 36.7 (1C), 31.9 (1C), 29.6 (2C), 29.5 (1C), 29.4 (1C), 29.3 (1C), 29.1 (1C), 28.9 (1C), 27.9 (1C), 26.7-25.7, 22.7 (1C), 14.1 (1C)

The number of carbon atoms constituting a copolymer assigned to each peak was determined from the results of the data analysis of the $^{13}$C NMR. The number of monomer units constituting the compound (110) having a colorant skeleton structure was calculated from those measurement results. As a result, the number of styrene molecules was 91 and the number of colorant skeleton structures was 0.85.

Comparative Example 1

Production Example of Comparative Compound (134)

A comparative compound (134) having a colorant skeleton structure was produced in conformity with Example 1 of Japanese Patent Application Laid-Open No. 2012-077297 in accordance with the following scheme. The number of monomer units constituting the compound (134) having a colorant skeleton structure was calculated from the results of $^{13}C$ NMR measurement. As a result, the number of styrene molecules was 60 and the number of the colorant skeleton structures was about 0.61 (see Table 2).

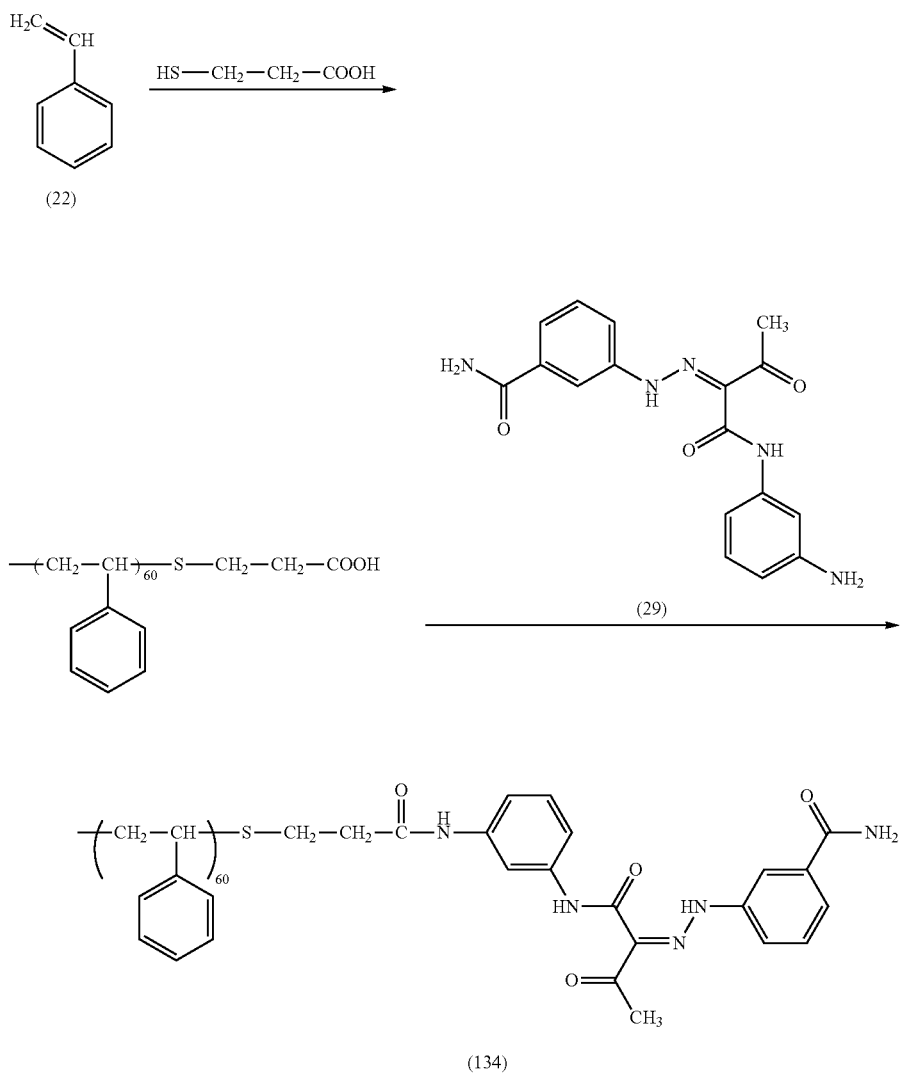

Production Examples of Compounds (101), (103) and (104), (106) to (121), and (124) to (133)

Compounds (101), (103) and (104), (106) to (121), and (124) to (133) having colorant skeleton structures shown in Table 2 were produced by performing the same operations as those of the production examples of the compounds (102), (105), (122), and (123) except that the used raw materials were changed.

Table 1 below shows the structures of the polymer moieties and Table 2 below shows the structures of the compounds having colorant skeleton structures.

TABLE 1

| Polymer moiety No. | Polymerization method | Protective group | Sequential arrangement of monomers | Number of X's | Number of Y's | $R_{46}$ | $R_{47}$ | $R_{48}$ |
|---|---|---|---|---|---|---|---|---|
| P-1 | ATRP | tert-Butyl ester | α-W-polyX | 296 | — | H | — | — |
| P-2 | ATRP | tert-Butyl ester | α-W-polyX | 100 | — | H | — | — |
| P-3 | ATRP | tert-Butyl ester | α-W-polyX | 51 | — | H | — | — |
| P-4 | ATRP | tert-Butyl ester | α-W-polyX | 31 | — | H | — | — |
| P-5 | ATRP | tert-Butyl ester | α-W-polyX | 20 | — | H | — | — |
| P-6 | ATRP | Methyl ester | α-W-polyX | 105 | — | H | — | — |
| P-7 | ATRP | Methyl ester | α-W-polyX | 20 | — | H | — | — |
| P-8 | ATRP | Methyl ester | α-W-polyX | 106 | — | H | — | — |
| P-9 | ATRP | Benzyl ester | α-W-polyX | 102 | — | H | — | — |
| P-10 | RAFT | tert-Butyl ester | α-W-polyX | 91 | — | H | — | — |
| P-11 | RAFT | tert-Butyl ester | α-W-polyX | 100 | — | H | — | — |
| P-12 | ATRP | tert-Butyl ester | α-W-polyY | — | 98 | — | $CH_3$ | $CH_3$ |
| P-13 | ATRP | tert-Butyl ester | α-W-polyY | — | 100 | — | H | (n)-$C_4H_9$ |
| P-14 | ATRP | tert-Butyl ester | α-W-polyY | — | 105 | — | H | (n)-$C_{18}H_{37}$ |
| P-15 | ATRP | tert-Butyl ester | α-W-poly(X-co-Y) | 101 | 20 | H | $CH_3$ | $CH_3$ |
| P-16 | ATRP | tert-Butyl ester | α-W-poly(X-co-Y) | 95 | 25 | H | H | (n)-$C_4H_9$ |
| P-17 | ATRP | tert-Butyl ester | α-W-poly(X-co-Y) | 98 | 18 | H | H | (n)-$C_{18}H_{37}$ |
| P-18 | ATRP | tert-Butyl ester | α-W-poly(Y-b-X) | 92 | 19 | H | H | (n)-$C_{18}H_{37}$ |

[In Table 1, a prefix α means that one terminal of a structure is substituted. W represents a COOH group, and X and Y represent the following monomer units. The symbol (n) means that an alkyl group is linear. The symbol co means that the arrangement of the respective monomer units constituting a copolymer is disordered. The symbol b means that the arrangement of the respective monomer units constituting a copolymer is block arrangement.]

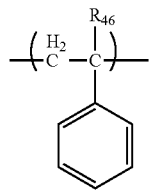

X

[In the formula X, $R_{46}$ represents a hydrogen atom or an alkyl group.]

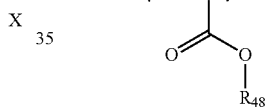

Y

[In the formula Y, $R_{47}$ and $R_{48}$ each represent a hydrogen atom or an alkyl group.]

TABLE 2

Compound having colorant skeleton structure

| Compound No. | Polymer moiety | Introduction ratio of colorant skeleton structure | $R_3$ | $R_8$ | $R_9$ | $R_{10}$ | $R_{11}$ | $R_{12}$ | $R_{13}$ | $R_{14}$ | $R_{15}$ | $R_{16}$ | $R_{17}$ |
|---|---|---|---|---|---|---|---|---|---|---|---|---|---|
| 101 | P-1 | 0.90 | $CH_3$ | H | H | H | $L_2$ | H | H | H | H | $CONH_2$ | H |
| 102 | P-2 | 0.90 | $CH_3$ | H | H | H | $L_2$ | H | H | H | H | $CONH_2$ | H |
| 103 | P-3 | 1.00 | $CH_3$ | H | H | H | $L_2$ | H | H | H | H | $CONH_2$ | H |
| 104 | P-4 | 1.00 | $CH_3$ | H | H | H | $L_2$ | H | H | H | H | $CONH_2$ | H |
| 105 | P-5 | 0.93 | $CH_3$ | H | H | H | $L_2$ | H | H | H | H | $CONH_2$ | H |
| 106 | P-6 | 1.00 | $CH_3$ | H | H | H | $L_8$ | H | H | H | H | $CONH_2$ | H |
| 107 | P-7 | 1.00 | $CH_3$ | H | H | H | $L_8$ | H | H | H | H | $CONH_2$ | H |
| 108 | P-8 | 0.90 | $CH_3$ | H | H | H | $L_{15}$ | H | H | H | H | $CONH_2$ | H |
| 109 | P-9 | 1.00 | $CH_3$ | H | H | H | $L_2$ | H | H | H | H | $CONH_2$ | H |
| 110 | P-10 | 0.85 | $CH_3$ | H | H | H | $L_{18}$ | H | H | H | H | $CONH_2$ | H |
| 111 | P-11 | 0.90 | $CH_3$ | H | H | H | $L_{19}$ | H | H | H | H | $CONH_2$ | H |
| 112 | P-12 | 0.90 | $CH_3$ | H | H | H | $L_2$ | H | H | H | H | $CONH_2$ | H |
| 113 | P-13 | 1.00 | $CH_3$ | H | H | H | $L_2$ | H | H | H | H | $CONH_2$ | H |
| 114 | P-14 | 1.00 | $CH_3$ | H | H | H | $L_2$ | H | H | H | H | $CONH_2$ | H |
| 115 | P-15 | 1.00 | $CH_3$ | H | H | H | $L_2$ | H | H | H | H | $CONH_2$ | H |
| 116 | P-16 | 1.00 | $CH_3$ | H | H | H | $L_2$ | H | H | H | H | $CONH_2$ | H |
| 117 | P-17 | 1.00 | $CH_3$ | H | H | H | $L_2$ | H | H | H | H | $CONH_2$ | H |

TABLE 2-continued

Compound having colorant skeleton structure

| Compound No. | Polymer moiety | Introduction ratio of colorant skeleton structure | $R_3$ | $R_8$ | $R_9$ | $R_{10}$ | $R_{11}$ | $R_{12}$ | $R_{13}$ | $R_{14}$ | $R_{15}$ | $R_{16}$ | $R_{17}$ |
|---|---|---|---|---|---|---|---|---|---|---|---|---|---|
| 118 | P-18 | 1.00 | $CH_3$ | H | H | H | $L_2$ | H | H | H | H | $CONH_2$ | H |
| 119 | P-5 | 1.00 | $CH_3$ | H | $CONH_2$ | H | H | H | H | H | H | $L_2$ | H |
| 120 | P-5 | 1.00 | $CH_3$ | H | H | H | $L_2$ | H | H | $CONH_2$ | H | H | H |
| 121 | P-5 | 1.00 | $CH_3$ | H | H | H | $L_2$ | H | H | H | $CONH_2$ | H | H |
| 122 | P-5 | 0.92 | $CH_3$ | H | H | H | $L_2$ | H | H | H | H | $NHCONH_2$ | H |
| 123 | P-5 | 0.86 | $CH_3$ | H | H | H | $L_2$ | H | H | H | —NHCONH— | | H |
| 124 | P-5 | 1.00 | $CH_3$ | H | H | H | $L_2$ | H | H | H | H | $SO_2NH_2$ | H |
| 125 | P-5 | 1.00 | $CH_3$ | H | H | H | $L_2$ | H | H | H | $SO_2NH_2$ | H | H |
| 126 | P-5 | 1.00 | $CH_3$ | H | H | H | $L_2$ | H | H | $SO_3CH_3$ | H | H | H |
| 127 | P-5 | 1.00 | $CH_3$ | H | H | H | $L_2$ | H | H | H | $SO_3CH_3$ | H | H |
| 128 | P-5 | 1.00 | $CH_3$ | H | H | H | $L_2$ | H | $SO_3^-Na^+$ | H | H | H | H |
| 129 | P-5 | 1.00 | $CH_3$ | H | H | H | $L_2$ | H | H | H | $NHCSNH_2$ | H | H |
| 130 | P-5 | 1.00 | $CH_3$ | H | H | H | $L_2$ | H | $CO_2CH_3$ | H | H | $CO_2CH_3$ | H |
| 131 | P-5 | 1.00 | $CH_3$ | H | H | H | $L_2$ | H | $SO_3^-(N(C_4H_9)_4)^+$ | H | H | H | H |
| 132 | P-7 | 1.00 | $CH_3$ | H | H | H | $L_8$ | H | H | H | H | $NHCONH_2$ | H |
| 133 | P-7 | 1.00 | $CH_3$ | H | H | H | $L_8$ | H | H | H | —NHCONH— | | H |
| 134 | — | 0.61 | $CH_3$ | H | H | H | $L_1$ | H | H | H | H | $CONH_2$ | H |

[In Table 2, $R_3$ and $R_8$ to $R_{17}$ are identical in meaning to $R_3$ and $R_8$ to $R_{17}$ in the formula (4), respectively. In addition, $L_2$, $L_8$, $L_{15}$, $L_{18}$, and $L_{19}$ in Table 2 represent linking groups, and are identical in meaning to $L_2$, $L_8$, $L_{15}$, $L_{18}$, and $L_{19}$ described above, respectively. The introduction ratio of a colorant skeleton structure in Table 2 represents the introduction ratio of the colorant skeleton structure with respect to a polymer moiety.]

As is apparent from Table 2, it was confirmed that the employment of the production method of the present invention increased the introduction ratio of a colorant compound with respect to a polymer.

Example 6-1

A yellow pigment dispersion was prepared by the following method.

<Yellow Pigment Dispersion Preparation Example 1>

18.0 Parts of C.I. Pigment Yellow 155 represented by the following formula (Pig-A) as a yellow pigment, 1.80 parts of the compound (102) having a colorant skeleton structure, 180 parts of styrene as a water-insoluble solvent, and 130 parts of glass beads (diameter: 1 mm) were mixed, and the mixture was dispersed with an attritor [manufactured by NIPPON COKE & ENGINEERING CO., LTD.] for 3 hours, followed by filtration with a mesh. Thus, a yellow pigment dispersion (Dis-Y102) was obtained.

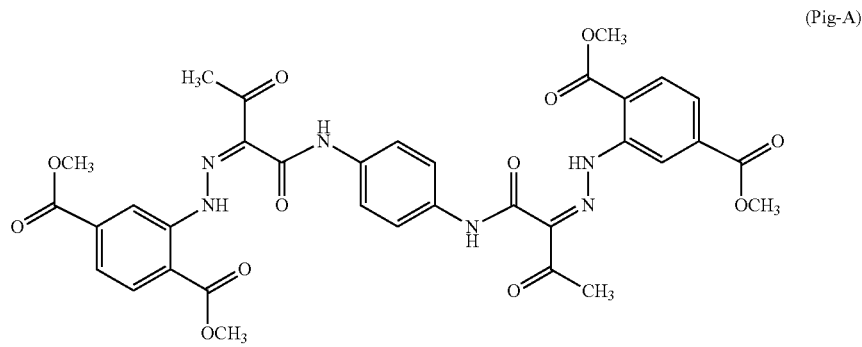 [SMILES: COC(=O)c1ccc(C(=O)OC)c(N/N=C(/C(C)=O)C(=O)Nc2ccc(NC(=O)/C(=N\Nc3cc(C(=O)OC)ccc3C(=O)OC)C(C)=O)cc2)c1]

(Pig-A)

<Yellow Pigment Dispersion Preparation Example 2>

A yellow pigment dispersion (Dis-Y101) and yellow pigment dispersions (Dis-Y103) to (Dis-Y133) were obtained by performing the same operations as those in Yellow Pigment Dispersion Preparation Example 1 described above except that the compound (102) having a colorant skeleton structure was changed to the compound (101) and the compounds (103) to (133) having colorant skeleton structures, respectively.

<Yellow Pigment Dispersion Preparation Example 3>

Yellow pigment dispersions (Dis-Y151) and (Dis-Y152) were obtained by performing the same operations as those in Yellow Pigment Dispersion Preparation Example 1 described above except that C.I. Pigment Yellow 155 represented by the formula (Pig-A) was changed to C.I. Pigment Yellow 180 represented by the following formula (Pig-B) and C.I. Pigment Yellow 185 represented by the following formula (Pig-C), respectively.

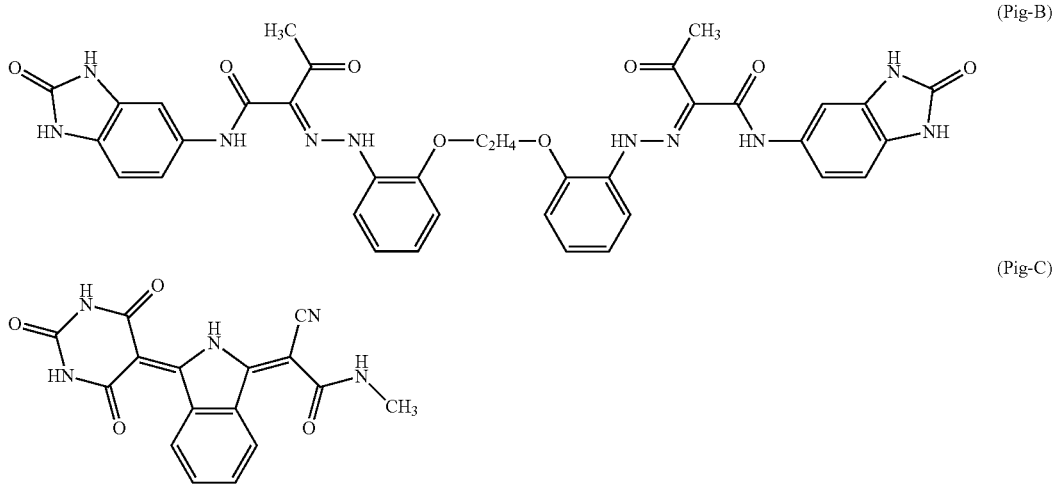

(Pig-B)

(Pig-C)

<Yellow Pigment Dispersion Preparation Example 4>

42.0 Parts of C.I. Pigment Yellow 155 represented by the formula (Pig-A) as a yellow pigment and 4.2 parts of the compound (102) having a colorant skeleton structure as a pigment dispersant were subjected to dry mixing with Hybridization System NHS-0 [manufactured by NARA MACHINERY CO., LTD.] to prepare a pigment composition. 19.8 Parts of the resultant pigment composition was mixed with 180 parts of styrene and 130 parts of glass beads (diameter: 1 mm), and the mixture was dispersed with a paint shaker [manufactured by Toyo Seiki Seisaku-sho, Ltd.] for 1 hour, followed by filtration with a mesh. Thus, a yellow pigment dispersion (Dis-Y153) was obtained.

Comparative Example 2-1

A reference yellow pigment dispersion providing a reference value for an evaluation and a comparative yellow pigment dispersion were prepared by the following methods.

<Reference Yellow Pigment Dispersion Preparation Example 1>

A reference yellow pigment dispersion (Dis-Y154) was obtained by performing the same operations as those in Yellow Pigment Dispersion Preparation Example 1 described above except that the compound (102) having a colorant skeleton structure was not added.

<Reference Yellow Pigment Dispersion Preparation Example 2>

Reference yellow pigment dispersions (Dis-Y155) and (Dis-Y156) were obtained by performing the same operations as those in Yellow Pigment Dispersion Preparation Example 3 described above except that the compound (102) having a colorant skeleton structure was not added.

<Reference Yellow Pigment Dispersion Preparation Example 3>

A reference yellow pigment dispersion (Dis-Y157) was obtained by performing the same operations as those in Yellow Pigment Dispersion Preparation Example 4 described above except that the compound (102) having a colorant skeleton structure was not added.

<Comparative Yellow Pigment Dispersion Preparation Example 1>

Comparative yellow pigment dispersions (Dis-Y158) to (Dis-Y162) were obtained by performing the same operations as those in Yellow Pigment Dispersion Preparation Example 1 described above except that the compound (102) having a colorant skeleton structure was changed to the comparative compound (134) (comparative compound 1), an azo compound described in Japanese Patent Application Laid-Open No. 2012-067285 (comparative compound 2), DISPARLON DA-703-50 [manufactured by Kusumoto Chemicals, Ltd., acid value; 15 mgKOH/g, amine value; 40 mgKOH/g] described in Japanese Patent Application Laid-Open No. 2006-030760 (comparative compound 3), a methyl methacrylate/sodium styrene sulfonate copolymer described in Japanese Patent Application Laid-Open No. H03-113462 (comparative compound 4), and a styrene/butyl acrylate [copolymerization ratio (mass ratio)=95/5] block copolymer (Mw=9,718) described in Japanese Patent Application Laid-Open No. H06-148927 (comparative compound 5), respectively.

Example 6-2

A magenta pigment dispersion was prepared by the following method.

<Magenta Pigment Dispersion Preparation Example 1>

18.0 Parts of C.I. Pigment Red 122 represented by the formula (Pig-D) as a magenta pigment, 1.80 parts of the compound (102) having a colorant skeleton structure, 180 parts of styrene as a water-insoluble solvent, and 130 parts of glass beads (diameter: 1 mm) were mixed, and the mixture was dispersed with an attritor [manufactured by NIPPON COKE & ENGINEERING CO., LTD.] for 3 hours, followed by filtration with a mesh. Thus, a magenta pigment dispersion (Dis-M102) was obtained.

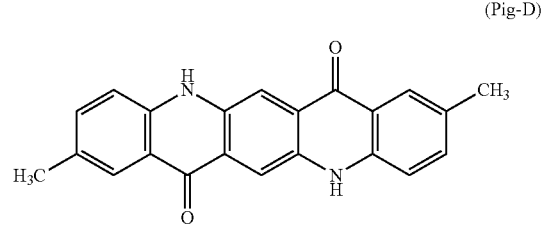

(Pig-D)

<Magenta Pigment Dispersion Preparation Example 2>

A magenta pigment dispersion (Dis-M101) and magenta pigment dispersions (Dis-M103) to (Dis-M133) were obtained by performing the same operations as those in Magenta Pigment Dispersion Preparation Example 1 described above except that the compound (102) having a colorant skeleton structure was changed to the compound (101) and the compounds (103) to (133) having colorant skeleton structures, respectively.

<Magenta Pigment Dispersion Preparation Example 3>

Magenta pigment dispersions (Dis-M151) and (Dis-M152) were obtained by performing the same operations as those in Magenta Pigment Dispersion Preparation Example 1 described above except that C.I. Pigment Red 122 represented by the formula (Pig-D) was changed to C.I. Pigment Red 255 represented by the formula (Pig-E) and C.I. Pigment Red 150 represented by the formula (Pig-F), respectively.

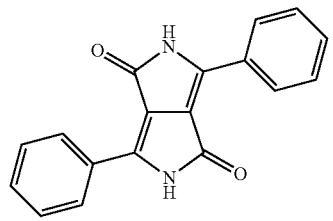

(Pig-E)

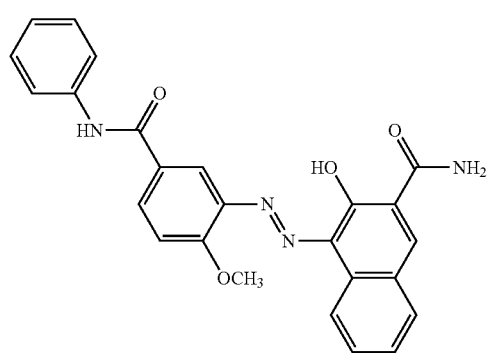

(Pig-F)

<Magenta Pigment Dispersion Preparation Example 4>

42.0 Parts of C.I. Pigment Red 122 represented by the formula (Pig-D) as a magenta pigment and 4.2 parts of the compound (102) having a colorant skeleton structure as a pigment dispersant were subjected to dry mixing with Hybridization System NHS-0 [manufactured by NARA MACHINERY CO., LTD.] to prepare a pigment composition. 19.8 Parts of the resultant pigment composition was mixed with 180 parts of styrene and 130 parts of glass beads (diameter: 1 mm), and the mixture was dispersed with a paint shaker [manufactured by Toyo Seiki Seisaku-sho, Ltd.] for 1 hour, followed by filtration with a mesh. Thus, a magenta pigment dispersion (Dis-M153) was obtained.

Comparative Example 2-2

A reference magenta pigment dispersion providing a reference value for an evaluation and a comparative magenta pigment dispersion were prepared by the following methods.

<Reference Magenta Pigment Dispersion Preparation Example 1>

A reference magenta pigment dispersion (Dis-M154) was obtained by performing the same operations as those in Magenta Pigment Dispersion Preparation Example 1 described above except that the compound (102) having a colorant skeleton structure was not added.

<Reference Magenta Pigment Dispersion Preparation Example 2>

Reference magenta pigment dispersions (Dis-M155) and (Dis-M156) were obtained by performing the same operations as those in Magenta Pigment Dispersion Preparation Example 3 described above except that the compound (102) having a colorant skeleton structure was not added.

<Reference Magenta Pigment Dispersion Preparation Example 3>

A reference magenta pigment dispersion (Dis-M157) was obtained by performing the same operations as those in Magenta Pigment Dispersion Preparation Example 4 described above except that the compound (102) having a colorant skeleton structure was not added.

<Comparative Magenta Pigment Dispersion Preparation Example 1>

Comparative magenta pigment dispersions (Dis-M158) to (Dis-M162) were obtained by performing the same operations as those in Magenta Pigment Dispersion Preparation Example 1 described above except that the compound (102) having a colorant skeleton structure was changed to the comparative compound (134) (comparative compound 1), the comparative compound 2, the comparative compound 3, the comparative compound 4, and the comparative compound 5, respectively.

Example 6-3

A cyan pigment dispersion was prepared by the following method.

<Cyan Pigment Dispersion Preparation Example 1>

18.0 Parts of C.I. Pigment Blue 15:3 represented by the formula (Pig-G) as a cyan pigment, 1.80 parts of the compound (102) having a colorant skeleton structure, 180 parts of styrene as a water-insoluble solvent, and 130 parts of glass beads (diameter: 1 mm) were mixed, and the mixture was dispersed with an attritor [manufactured by NIPPON COKE & ENGINEERING CO., LTD.] for 3 hours, followed by filtration with a mesh. Thus, a cyan pigment dispersion (Dis-C102) was obtained.

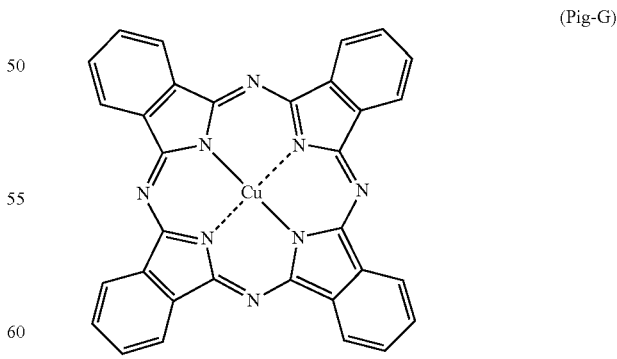

(Pig-G)

<Cyan Pigment Dispersion Preparation Example 2>

A cyan pigment dispersion (Dis-C101) and cyan pigment dispersions (Dis-C103) to (Dis-C133) were obtained by performing the same operations as those in Cyan Pigment Dispersion Preparation Example 1 described above except that the compound (102) having a colorant skeleton structure was changed to the compound (101) and the compounds (103) to (133) having colorant skeleton structures, respectively.

<Cyan Pigment Dispersion Preparation Example 3>

Cyan pigment dispersions (Dis-C151) and (Dis-C152) were obtained by performing the same operations as those in Cyan Pigment Dispersion Preparation Example 1 described above except that C.I. Pigment Blue 15:3 represented by the formula (Pig-G) was changed to C.I. Pigment Blue 16 represented by the formula (Pig-H) and C.I. Pigment Blue 17:1 represented by the formula (Pig-I), respectively.

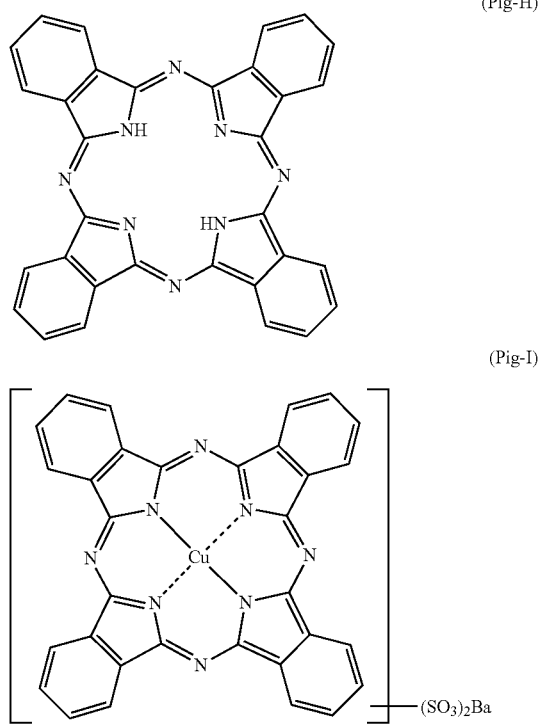

<Cyan Pigment Dispersion Preparation Example 4>

42.0 Parts of C.I. Pigment Blue 15:3 represented by the formula (Pig-G) as a cyan pigment and 4.2 parts of the compound (102) having a colorant skeleton structure as a pigment dispersant were subjected to dry mixing with Hybridization System NHS-0 [manufactured by NARA MACHINERY CO., LTD.] to prepare a pigment composition. 19.8 Parts of the resultant pigment composition was mixed with 180 parts of styrene and 130 parts of glass beads (diameter: 1 mm), and the mixture was dispersed with a paint shaker [manufactured by Toyo Seiki Seisaku-sho, Ltd.] for 1 hour, followed by filtration with a mesh. Thus, a cyan pigment dispersion (Dis-C153) was obtained.

Comparative Example 2-3

A reference cyan pigment dispersion providing a reference value for an evaluation and a comparative cyan pigment dispersion were prepared by the following methods.

<Reference Cyan Pigment Dispersion Preparation Example 1>

A reference cyan pigment dispersion (Dis-C154) was obtained by performing the same operations as those in Cyan Pigment Dispersion Preparation Example 1 described above except that the compound (102) having a colorant skeleton structure was not added.

<Reference Cyan Pigment Dispersion Preparation Example 2>

Reference cyan pigment dispersions (Dis-C155) and (Dis-C156) was obtained by performing the same operations as those in Cyan Pigment Dispersion Preparation Example 3 described above except that the compound (102) having a colorant skeleton structure was not added.

<Reference Cyan Pigment Dispersion Preparation Example 3>

A reference cyan pigment dispersion (Dis-C157) was obtained by performing the same operations as those in Cyan Pigment Dispersion Preparation Example 4 described above except that the compound (102) having a colorant skeleton structure was not added.

<Comparative Cyan Pigment Dispersion Preparation Example 1>

Comparative cyan pigment dispersions (Dis-C158) to (Dis-C162) were obtained by performing the same operations as those in Cyan Pigment Dispersion Preparation Example 1 described above except that the compound (102) having a colorant skeleton structure was changed to the comparative compound (134) (comparative compound 1), the comparative compound 2, the comparative compound 3, the comparative compound 4, and the comparative compound 5, respectively.

Example 6-4

A black pigment dispersion was prepared by the following method.

<Black Pigment Dispersion Preparation Example 1>

30.0 Parts of a carbon black (specific surface area=65 $m^2/g$, average particle diameter=30 nm, pH=9.0) as a black pigment, 3.0 parts of the compound (102) having a colorant skeleton structure, 150 parts of styrene as a water-insoluble solvent, and 130 parts of glass beads (diameter: 1 mm) were mixed, and the mixture was dispersed with an attritor [manufactured by NIPPON COKE & ENGINEERING CO., LTD.] for 3 hours, followed by filtration with a mesh. Thus, a black pigment dispersion (Dis-Bk102) was obtained.

<Black Pigment Dispersion Preparation Example 2>

A black pigment dispersion (Dis-Bk101) and black pigment dispersions (Dis-Bk103) to (Dis-Bk133) were obtained by performing the same operations as those in Black Pigment Dispersion Preparation Example 1 described above except that the compound (102) having a colorant skeleton structure was changed to the compound (101) and the compounds (103) to (133) having colorant skeleton structures, respectively.

<Black Pigment Dispersion Preparation Example 3>

Black pigment dispersions (Dis-Bk151) and (Dis-Bk152) were obtained by performing the same operations as those in Black Pigment Dispersion Preparation Example 1 described above except that the carbon black (specific surface area=65 $m^2/g$, average particle diameter=30 nm, pH=9.0) was changed to a carbon black (specific surface area=77 $m^2/g$, average particle diameter=28 nm, pH=7.5) and a carbon black (specific surface area=370 $m^2/g$, average particle diameter=13 nm, pH=3.0), respectively.

<Black Pigment Dispersion Preparation Example 4>

42.0 Parts of a carbon black (specific surface area=65 $m^2/g$, average particle diameter=30 nm, pH=9.0) as a black pigment and 4.2 parts of the compound (102) having a colorant skeleton structure as a pigment dispersant were subjected to dry mixing with Hybridization System NHS-0 [manufactured by NARA MACHINERY CO., LTD.] to prepare a pigment composition. 33.0 Parts of the resultant pigment composition was mixed with 150 parts of styrene and 130 parts of glass beads (diameter: 1 mm), and the mixture was dispersed with a paint shaker [manufactured by Toyo Seiki Seisaku-sho, Ltd.] for 1 hour, followed by filtration with a mesh. Thus, a black pigment dispersion (Dis-Bk153) was obtained.

Comparative Example 2-4

A reference black pigment dispersion providing a reference value for an evaluation and a comparative black pigment dispersion were prepared by the following methods.

<Reference Black Pigment Dispersion Preparation Example 1>

A reference black pigment dispersion (Dis-Bk154) was obtained by performing the same operations as those in Black Pigment Dispersion Preparation Example 1 described above except that the compound (102) having a colorant skeleton structure was not added.

<Reference Black Pigment Dispersion Preparation Example 2>

Reference black pigment dispersions (Dis-Bk155) and (Dis-Bk156) were obtained by performing the same operations as those in Black Pigment Dispersion Preparation Example 3 described above except that the compound (102) having a colorant skeleton structure was not added.

<Reference Black Pigment Dispersion Preparation Example 3>

A reference black pigment dispersion (Dis-Bk157) was obtained by performing the same operations as those in Black Pigment Dispersion Preparation Example 4 described above except that the compound (102) having a colorant skeleton structure was not added.

<Comparative Black Pigment Dispersion Preparation Example 1>

Comparative black pigment dispersions (Dis-Bk158) to (Dis-Bk162) were obtained by performing the same operations as those in Black Pigment Dispersion Preparation Example 1 described above except that the compound (102) having a colorant skeleton structure was changed to the comparative compound (134) (comparative compound 1), the comparative compound 2, the comparative compound 3, the comparative compound 4, and the comparative compound 5, respectively.

Example 7

The pigment dispersions of the respective colors were evaluated by the following method.

<Pigment Dispersibility Evaluation>

The compound having a colorant skeleton structure of the present invention was evaluated for its pigment dispersibility by performing a gloss test for a coating film with each of the yellow pigment dispersions (Dis-Y101) to (Dis-Y133) and (Dis-Y151) to (Dis-Y153), the magenta pigment dispersions (Dis-M101) to (Dis-M133) and (Dis-M151) to (Dis-M153), the cyan pigment dispersions (Dis-C101) to (Dis-C133) and (Dis-C151) to (Dis-C153), and the black pigment dispersions (Dis-Bk101) to (Dis-Bk133) and (Dis-Bk151) to (Dis-Bk153). A specific evaluation method is as described below.

The pigment dispersion was skimmed with a dropping pipette, mounted in a linear fashion on the top of super art paper [SA Kinfuji, 180 kg, 80×160, manufactured by Oji Paper Co., Ltd.], and uniformly applied onto the art paper with a wire bar (#10). A gloss (angle of reflection: 75°) after drying was measured with a gloss meter Gloss Meter VG2000 [manufactured by NIPPON DENSHOKU INDUSTRIES CO., LTD.] and evaluated by the following criteria. It should be noted that as a pigment is dispersed more finely, the smoothness of the coating film is improved and its gloss value is also improved.

The increase ratios of the gloss values of the yellow pigment dispersions (Dis-Y101) to (Dis-Y133) were determined by using the gloss value of the reference yellow pigment dispersion (Dis-Y154) as a reference value. The increase ratio of the gloss value of the yellow pigment dispersion (Dis-Y151) was determined by using the gloss value of the reference yellow pigment dispersion (Dis-Y155) as a reference value. The increase ratio of the gloss value of the yellow pigment dispersion (Dis-Y152) was determined by using the gloss value of the reference yellow pigment dispersion (Dis-Y156) as a reference value. The increase ratio of the gloss value of the yellow pigment dispersion (Dis-Y153) was determined by using the gloss value of the reference yellow pigment dispersion (Dis-Y157) as a reference value.

The increase ratios of the gloss values of the magenta pigment dispersions (Dis-M101) to (Dis-M133) were determined by using the gloss value of the reference magenta pigment dispersion (Dis-M154) as a reference value. The increase ratio of the gloss value of the magenta pigment dispersion (Dis-M151) was determined by using the gloss value of the reference magenta pigment dispersion (Dis-M155) as a reference value. The increase ratio of the gloss value of the magenta pigment dispersion (Dis-M152) was determined by using the gloss value of the reference magenta pigment dispersion (Dis-M156) as a reference value. The increase ratio of the gloss value of the magenta pigment dispersion (Dis-M153) was determined by using the gloss value of the reference magenta pigment dispersion (Dis-M157) as a reference value.

The increase ratios of the gloss values of the cyan pigment dispersions (Dis-C101) to (Dis-C133) were determined by using the gloss value of the reference cyan pigment dispersion (Dis-C154) as a reference value. The increase ratio of the gloss value of the cyan pigment dispersion (Dis-C151) was determined by using the gloss value of the reference cyan pigment dispersion (Dis-C155) as a reference value. The increase ratio of the gloss value of the cyan pigment dispersion (Dis-C152) was determined by using the gloss value of the reference cyan pigment dispersion (Dis-C156) as a reference value. The increase ratio of the gloss value of the cyan pigment dispersion (Dis-C153) was determined by using the gloss value of the reference cyan pigment dispersion (Dis-C157) as a reference value.

Evaluation criteria for the pigment dispersions of the respective colors are described below.

Evaluation Criteria for Yellow Pigment Dispersion
A: The increase ratio of a gloss value is 10% or more.
B: The increase ratio of a gloss value is 5% or more and less than 10%.
C: The increase ratio of a gloss value is 0% or more and less than 5%.
D: A gloss value reduces.

When the increase ratio of a gloss value was 5% or more, it was judged that satisfactory pigment dispersibility was obtained.

Evaluation Criteria for Magenta Pigment Dispersion
A: The increase ratio of a gloss value is 35% or more.

B: The increase ratio of a gloss value is 20% or more and less than 35%.
C: The increase ratio of a gloss value is 5% or more and less than 20%.
D: The increase ratio of a gloss value is less than 5%.

When the increase ratio of a gloss value was 20% or more, it was judged that satisfactory pigment dispersibility was obtained.

Evaluation Criteria for Cyan Pigment Dispersion
A: The increase ratio of a gloss value is 25% or more.
B: The increase ratio of a gloss value is 15% or more and less than 25%.
C: The increase ratio of a gloss value is 5% or more and less than 15%.
D: The increase ratio of a gloss value is less than 5%.

When the increase ratio of a gloss value was 15% or more, it was judged that satisfactory pigment dispersibility was obtained.

Evaluation Criteria for Black Pigment Dispersion
A: A gloss value is 80 or more.
B: A gloss value is 50 or more and less than 80.
C: A gloss value is 20 or more and less than 50.
D: A gloss value is less than 20.

When the gloss value was 50 or more, it was judged that satisfactory pigment dispersibility was obtained.

Comparative Example 3

The comparative yellow pigment dispersions (Dis-Y158) to (Dis-Y162), the comparative magenta pigment dispersions (Dis-M158) to (Dis-M162), the comparative cyan pigment dispersions (Dis-C158) to (Dis-C162), and the comparative black pigment dispersions (Dis-Bk158) to (Dis-Bk162) were each evaluated for its gloss by the same method as that of Example 7.

It should be noted that the increase ratios of the gloss values of the comparative yellow pigment dispersions (Dis-Y158) to (Dis-Y162) were determined by using the gloss value of the reference yellow pigment dispersion (Dis-Y154) as a reference value. The increase ratios of the gloss values of the comparative magenta pigment dispersions (Dis-M158) to (Dis-M162) were determined by using the gloss value of the reference magenta pigment dispersion (Dis-M154) as a reference value. The increase ratios of the gloss values of the cyan pigment dispersions (Dis-C158) to (Dis-C162) were determined by using the gloss value of the reference cyan pigment dispersion (Dis-C154) as a reference value.

Table 3 shows the results of the evaluations of the yellow pigment dispersions, the magenta pigment dispersions, the cyan pigment dispersions, and the black pigment dispersions.

TABLE 3

Result of evaluation of pigment dispersion of the present invention

| | Yellow | | Magenta | | Cyan | | Black | |
|---|---|---|---|---|---|---|---|---|
| Compound No. | Dispersion | Gloss value | Dispersion | Gloss value | Dispersion | Gloss value | Dispersion | Gloss value |
| 101 | Dis-Y101 | A(73) | Dis-M101 | A(69) | Dis-C101 | A(60) | Dis-Bk101 | A(97) |
| 102 | Dis-Y102 | A(70) | Dis-M102 | A(69) | Dis-C102 | A(69) | Dis-Bk102 | A(101) |
| 103 | Dis-Y103 | A(70) | Dis-M103 | A(77) | Dis-C103 | A(60) | Dis-Bk103 | A(82) |
| 104 | Dis-Y104 | A(77) | Dis-M104 | A(75) | Dis-C104 | A(66) | Dis-Bk104 | A(82) |
| 105 | Dis-Y105 | A(71) | Dis-M105 | A(76) | Dis-C105 | A(66) | Dis-Bk105 | A(87) |
| 106 | Dis-Y106 | A(78) | Dis-M106 | A(73) | Dis-C106 | A(66) | Dis-Bk106 | A(89) |
| 107 | Dis-Y107 | A(75) | Dis-M107 | A(75) | Dis-C107 | A(69) | Dis-Bk107 | A(90) |
| 108 | Dis-Y108 | A(80) | Dis-M108 | A(75) | Dis-C108 | A(70) | Dis-Bk108 | A(86) |
| 109 | Dis-Y109 | A(76) | Dis-M109 | A(77) | Dis-C109 | A(61) | Dis-Bk109 | A(84) |
| 110 | Dis-Y110 | A(73) | Dis-M110 | A(77) | Dis-C110 | A(64) | Dis-Bk110 | A(91) |
| 111 | Dis-Y111 | A(77) | Dis-M111 | A(69) | Dis-C111 | A(62) | Dis-Bk111 | A(87) |
| 112 | Dis-Y112 | A(71) | Dis-M112 | A(67) | Dis-C112 | A(64) | Dis-Bk112 | A(88) |
| 113 | Dis-Y113 | A(77) | Dis-M113 | A(66) | Dis-C113 | A(69) | Dis-Bk113 | A(95) |
| 114 | Dis-Y114 | A(70) | Dis-M114 | A(71) | Dis-C114 | A(69) | Dis-Bk114 | A(87) |
| 115 | Dis-Y115 | A(67) | Dis-M115 | A(69) | Dis-C115 | A(66) | Dis-Bk115 | A(99) |
| 116 | Dis-Y116 | A(68) | Dis-M116 | A(74) | Dis-C116 | A(67) | Dis-Bk116 | A(79) |
| 117 | Dis-Y117 | A(72) | Dis-M117 | A(77) | Dis-C117 | A(66) | Dis-Bk117 | A(95) |
| 118 | Dis-Y118 | A(76) | Dis-M118 | A(75) | Dis-C118 | A(64) | Dis-Bk118 | A(93) |
| 119 | Dis-Y119 | A(75) | Dis-M119 | A(71) | Dis-C119 | A(61) | Dis-Bk119 | A(88) |
| 120 | Dis-Y120 | A(72) | Dis-M120 | A(67) | Dis-C120 | A(71) | Dis-Bk120 | A(84) |
| 121 | Dis-Y121 | A(73) | Dis-M121 | A(69) | Dis-C121 | A(63) | Dis-Bk121 | A(89) |
| 122 | Dis-Y122 | A(79) | Dis-M122 | A(70) | Dis-C122 | A(62) | Dis-Bk122 | A(98) |
| 123 | Dis-Y123 | A(67) | Dis-M123 | A(73) | Dis-C123 | A(66) | Dis-Bk123 | A(79) |
| 124 | Dis-Y124 | A(68) | Dis-M124 | A(76) | Dis-C124 | A(63) | Dis-Bk124 | A(102) |
| 125 | Dis-Y125 | A(77) | Dis-M125 | A(77) | Dis-C125 | A(67) | Dis-Bk125 | A(100) |
| 126 | Dis-Y126 | A(77) | Dis-M126 | A(76) | Dis-C126 | A(65) | Dis-Bk126 | A(80) |
| 127 | Dis-Y127 | A(73) | Dis-M127 | A(70) | Dis-C127 | A(63) | Dis-Bk127 | A(96) |
| 128 | Dis-Y128 | A(71) | Dis-M128 | A(67) | Dis-C128 | A(68) | Dis-Bk128 | A(93) |
| 129 | Dis-Y129 | A(75) | Dis-M129 | A(65) | Dis-C129 | A(69) | Dis-Bk129 | A(82) |
| 130 | Dis-Y130 | A(67) | Dis-M130 | A(69) | Dis-C130 | A(65) | Dis-Bk130 | A(89) |
| 131 | Dis-Y131 | A(70) | Dis-M131 | A(77) | Dis-C131 | A(61) | Dis-Bk131 | A(102) |
| 132 | Dis-Y132 | A(72) | Dis-M132 | A(66) | Dis-C132 | A(64) | Dis-Bk132 | A(88) |
| 133 | Dis-Y133 | A(72) | Dis-M133 | A(77) | Dis-C133 | A(69) | Dis-Bk133 | A(98) |
| 102 | Dis-Y151 | A(74) | Dis-M151 | A(67) | Dis-C151 | A(91) | Dis-Bk151 | A(100) |
| 102 | Dis-Y152 | A(62) | Dis-M152 | A(80) | Dis-C152 | A(84) | Dis-Bk152 | A(79) |
| 102 | Dis-Y153 | A(73) | Dis-M153 | A(68) | Dis-C153 | A(63) | Dis-Bk153 | A(88) |
| None | Dis-Y154 | (57) | Dis-M154 | (47) | Dis-C154 | (46) | Dis-Bk154 | (7) |
| None | Dis-Y155 | (60) | Dis-M155 | (42) | Dis-C155 | (63) | Dis-Bk155 | (12) |
| None | Dis-Y156 | (53) | Dis-M156 | (56) | Dis-C156 | (63) | Dis-Bk156 | (2) |
| None | Dis-Y157 | (55) | Dis-M157 | (48) | Dis-C157 | (49) | Dis-Bk157 | (5) |

TABLE 3-continued

Result of evaluation of pigment dispersion of the present invention

| | Yellow | | Magenta | | Cyan | | Black | |
|---|---|---|---|---|---|---|---|---|
| Compound No. | Dispersion | Gloss value | Dispersion | Gloss value | Dispersion | Gloss value | Dispersion | Gloss value |
| Comparative compound (1) | Dis-Y158 | B(60) | Dis-M158 | A(69) | Dis-C158 | B(59) | Dis-Bk158 | A(101) |
| Comparative compound (2) | Dis-Y159 | B(61) | Dis-M159 | A(66) | Dis-C159 | C(49) | Dis-Bk159 | A(105) |
| Comparative compound (3) | Dis-Y160 | B(60) | Dis-M160 | B(62) | Dis-C160 | B(55) | Dis-Bk160 | B(77) |
| Comparative compound (4) | Dis-Y161 | B(60) | Dis-M161 | B(63) | Dis-C161 | B(55) | Dis-Bk161 | B(64) |
| Comparative compound (5) | Dis-Y162 | C(59) | Dis-M162 | C(56) | Dis-C162 | D(47) | Dis-Bk162 | D(6) |

As is apparent from Table 3, it was confirmed that the use of the compound having a colorant skeleton structure obtained by the production method of the present invention provided a pigment composition and a pigment dispersion each having satisfactory pigment dispersibility.

Example 8-1

Next, a yellow toner based on a suspension polymerization method was produced by the following method.
<Yellow Toner Production Example 1>
(Preparation of Aqueous Medium)
710 Parts of ion-exchanged water and 450 parts of a 0.1 mol/l aqueous solution of $Na_3PO_4$ were added to a four-necked flask provided with a high-speed stirring apparatus T.K. homomixer [manufactured by PRIMIX Corporation], and the mixture was heated to 60° C. while the number of revolutions was adjusted to 12,000 rpm. 68 Parts of a 1.0 mol/l aqueous solution of $CaCl_2$ was gradually added to the heated mixture to prepare an aqueous medium containing a fine and poorly water-soluble dispersion stabilizer $Ca_3(PO_4)_2$.

(Suspension Polymerization Step)
Next, the following composition was heated to 60° C., and was then uniformly dissolved and dispersed with a high-speed stirring apparatus T.K. homomixer [manufactured by PRIMIX Corporation] at 5,000 rpm.
Yellow pigment dispersion (Dis-Y102): 132 parts
Styrene monomer: 46 parts
n-Butyl acrylate monomer: 34 parts
Polar resin [saturated polyester resin (terephthalic acid-propylene oxide modified bisphenol A, acid value=15 mgKOH/g, peak molecular weight=6,000)]: 10 parts
Ester wax (maximum endothermic peak in DSC measurement=70° C., Mn=704): 25 parts
Aluminum salicylate compound [manufactured by Orient Chemical Industries Co., Ltd., trade name: BONTRON E-108]: 2 parts
Divinylbenzene monomer: 0.1 part
10 Parts of 2,2'-azobis(2,4-dimethylvaleronitrile) as a polymerization initiator were added to the composition, and the mixture was loaded into the aqueous medium. The resultant was granulated for 15 minutes while the number of revolutions was maintained at 12,000 rpm. After that, the stirrer was changed from the high-speed stirrer to a propeller stirring blade, and polymerization was continued at a liquid temperature of 60° C. for 5 hours. After that, the liquid temperature was increased to 80° C., and then the polymerization was continued for 8 hours. After the completion of the polymerization reaction, the remaining monomer was removed by evaporation at 80° C. under reduced pressure. After that, the residue was cooled to 30° C. Thus, a polymer fine particle dispersion liquid was obtained.

(Washing/Dehydrating Step)
The polymer fine particle dispersion liquid thus obtained was transferred to a washing container, and then dilute hydrochloric acid was added to the dispersion liquid under stirring. The mixture was stirred at a pH of 1.5 for 2 hours so that compounds of phosphoric acid and calcium containing $Ca_3(PO_4)_2$ were dissolved. After that, the resultant was subjected to solid-liquid separation with a filter. Thus, polymer fine particles were obtained. The polymer fine particles were loaded into water, and the mixture was stirred so as to turn into a dispersion liquid again. After that, the dispersion liquid was subjected to solid-liquid separation with a filter. The redispersion of the polymer fine particles in water and the solid-liquid separation were repeatedly performed until the compounds of phosphoric acid and calcium containing $Ca_3(PO_4)_2$ were sufficiently removed. After that, the polymer fine particles after the final solid-liquid separation were sufficiently dried with a dryer. Thus, toner particles were obtained.

100 Parts of the resultant toner particles were dry-mixed with 1.0 part of hydrophobic silica fine powder whose surface had been treated with hexamethyldisilazane (number-average particle diameter of primary particles: 7 nm), 0.15 part of rutile-type titanium oxide fine powder (number-average particle diameter of primary particles: 45 nm), and 0.5 part of rutile-type titanium oxide fine powder (number-average particle diameter of primary particles: 200 nm) with a Henschel mixer [manufactured by NIPPON COKE & ENGINEERING CO., LTD.] for 5 minutes. Thus, a yellow toner (Tnr-Y102) was obtained.

<Yellow Toner Production Example 2>
A yellow toner (Tnr-Y101) and yellow toners (Tnr-Y103) to (Tnr-Y133) of the present invention were obtained by performing the same operations as those in Yellow Toner Production Example 1 described above except that the yellow pigment dispersion (Dis-Y102) was changed to the yellow pigment dispersion (Dis-Y101) and the yellow pigment dispersions (Dis-Y103) to (Dis-Y133), respectively.

<Yellow Toner Production Example 3>
Yellow toners (Tnr-Y151) and (Tnr-Y152) were obtained by performing the same operations as those in Yellow Toner Production Example 1 described above except that the yellow pigment dispersion (Dis-Y102) was changed to the yellow pigment dispersions (Dis-Y151) and (Dis-Y152), respectively.

Comparative Example 4-1

A reference yellow toner providing a reference value for an evaluation and a comparative yellow toner were produced by the following methods.
<Reference Yellow Toner Production Example 1>
Reference yellow toners (Tnr-Y153) to (Tnr-Y155) were obtained by performing the same operations as those in Yellow Toner Production Example 1 described above except that the yellow pigment dispersion (Dis-Y102) was changed to the yellow pigment dispersions (Dis-Y154) to (Dis-Y156), respectively.
<Comparative Yellow Toner Production Example 1>
Comparative yellow toners (Tnr-Y156) to (Tnr-Y160) were obtained by performing the same operations as those in Yellow Toner Production Example 1 described above except that the yellow pigment dispersion (Dis-Y102) was changed to the yellow pigment dispersions (Dis-Y158) to (Dis-Y162), respectively.

Example 8-2

Next, a magenta toner based on a suspension polymerization method was produced by the following method.
<Magenta Toner Production Example 1>
A magenta toner (Tnr-M102) was obtained by performing the same operations as those in Yellow Toner Production Example 1 described above except that the yellow pigment dispersion (Dis-Y102) was changed to the magenta pigment dispersion (Dis-M102).
<Magenta Toner Production Example 2>
A magenta toner (Tnr-M101) and magenta toners (Tnr-M103) to (Tnr-M133) of the present invention were obtained by performing the same operations as those in Magenta Toner Production Example 1 described above except that the magenta pigment dispersion (Dis-M102) was changed to the magenta pigment dispersion (Dis-M101) and the magenta pigment dispersions (Dis-M103) to (Dis-M133), respectively.
<Magenta Toner Production Example 3>
Magenta toners (Tnr-M151) and (Tnr-M152) were obtained by performing the same operations as those in Magenta Toner Production Example 1 described above except that the magenta pigment dispersion (Dis-M102) was changed to the magenta pigment dispersions (Dis-M151) and (Dis-M152), respectively.

Comparative Example 4-2

A reference magenta toner providing a reference value for an evaluation and a comparative magenta toner were produced by the following methods.
<Reference Magenta Toner Production Example 1>
Reference magenta toners (Tnr-M153) to (Tnr-M155) were obtained by performing the same operations as those in Magenta Toner Production Example 1 described above except that the magenta pigment dispersion (Dis-M102) was changed to the magenta pigment dispersions (Dis-M154) to (Dis-M156), respectively.
<Comparative Magenta Toner Production Example 1>
Comparative magenta toners (Tnr-M156) to (Tnr-M160) were obtained by performing the same operations as those in Magenta Toner Production Example 1 described above except that the magenta pigment dispersion (Dis-M102) was changed to the magenta pigment dispersions (Dis-M158) to (Dis-M162), respectively.

Example 8-3

Next, a cyan toner based on a suspension polymerization method was produced by the following method.
<Cyan Toner Production Example 1>
A cyan toner (Tnr-C102) was obtained by performing the same operations as those in Yellow Toner Production Example 1 described above except that the yellow pigment dispersion (Dis-Y102) was changed to the cyan pigment dispersion (Dis-C102).
<Cyan Toner Production Example 2>
A cyan toner (Tnr-C101) and cyan toners (Tnr-C103) to (Tnr-C133) of the present invention were obtained by performing the same operations as those in Cyan Toner Production Example 1 described above except that the cyan pigment dispersion (Dis-C102) was changed to the cyan pigment dispersion (Dis-C101) and the cyan pigment dispersions (Dis-C103) to (Dis-C133), respectively.
<Cyan Toner Production Example 3>
Cyan toners (Tnr-C151) and (Tnr-C152) were obtained by performing the same operations as those in Cyan Toner Production Example 1 described above except that the cyan pigment dispersion (Dis-C102) was changed to the cyan pigment dispersions (Dis-C151) and (Dis-C152), respectively.

Comparative Example 4-3

A reference cyan toner providing a reference value for an evaluation and a comparative cyan toner were produced by the following methods.
<Reference Cyan Toner Production Example 1>
Reference cyan toners (Tnr-C153) to (Tnr-C155) were obtained by performing the same operations as those in Cyan Toner Production Example 1 described above except that the cyan pigment dispersion (Dis-C102) was changed to the cyan pigment dispersions (Dis-C154) to (Dis-C156), respectively.
<Comparative Cyan Toner Production Example 1>
Comparative cyan toners (Tnr-C156) to (Tnr-C160) were obtained by performing the same operations as those in Cyan Toner Production Example 1 described above except that the cyan pigment dispersion (Dis-C102) was changed to the cyan pigment dispersions (Dis-C158) to (Dis-C162), respectively.

Example 8-4

Next, a black toner based on a suspension polymerization method was produced by the following method.
<Black Toner Production Example 1>
A black toner (Tnr-Bk102) was obtained by performing the same operations as those in Yellow Toner Production Example 1 described above except that the yellow pigment dispersion (Dis-Y102) was changed to the black pigment dispersion (Dis-Bk102).
<Black Toner Production Example 2>
A black toner (Tnr-Bk101) and black toners (Tnr-Bk103) to (Tnr-Bk133) of the present invention were obtained by performing the same operations as those in Black Toner Production Example 1 described above except that the black pigment dispersion (Dis-Bk102) was changed to the black pigment dispersion (Dis-Bk101) and the black pigment dispersions (Dis-Bk103) to (Dis-Bk133), respectively.
<Black Toner Production Example 3>
Black toners (Tnr-Bk151) and (Tnr-Bk152) were obtained by performing the same operations as those in Black Toner Production Example 1 described above except that the black pigment dispersion (Dis-Bk102) was changed to the black pigment dispersions (Dis-Bk151) and (Dis-Bk152), respectively.

Comparative Example 4-4

A reference black toner providing a reference value for an evaluation and a comparative black toner were produced by the following methods.
<Reference Black Toner Production Example 1>
Reference black toners (Tnr-Bk153) to (Tnr-Bk155) were obtained by performing the same operations as those in Black Toner Production Example 1 described above except that the black pigment dispersion (Dis-Bk102) was changed to the black pigment dispersions (Dis-Bk154) to (Dis-Bk156), respectively.
<Comparative Black Toner Production Example 1>
Comparative black toners (Tnr-Bk156) to (Tnr-Bk160) were obtained by performing the same operations as those in Black Toner Production Example 1 described above except that the black pigment dispersion (Dis-Bk102) was changed to the black pigment dispersions (Dis-Bk158) to (Dis-Bk162), respectively.

Example 8-5

Next, a yellow toner based on a suspension granulation method was produced by the following method.
<Yellow Toner Production Example 4>
(Preparation of Yellow Pigment Dispersion)
180 Parts of ethyl acetate, 12 parts of C.I. Pigment Yellow 155, 1.2 parts of the compound (102) having a colorant skeleton structure, and 130 parts of glass beads (diameter: 1 mm) were mixed, and were then dispersed with an attritor [manufactured by NIPPON COKE & ENGINEERING CO., LTD.] for 3 hours, followed by filtration with a mesh. Thus, a yellow pigment dispersion was prepared.
(Mixing Step)
The following composition was dispersed with a ball mill for 24 hours. Thus, 200 parts of a toner composition mixed liquid was obtained.
Yellow pigment dispersion: 96.0 parts
Polar resin [saturated polyester resin (polycondensate of propylene oxide modified bisphenol A and phthalic acid, Tg=75.9° C., Mw=11,000, Mn=4,200, acid value=11 mgKOH/g)]: 85.0 parts
Hydrocarbon wax (Fischer Tropsch wax, maximum endothermic peak in DSC measurement=80° C., Mw=750): 9.0 parts
Aluminum salicylate compound [manufactured by Orient Chemical Industries Co., Ltd., trade name: BONTRON E-108]: 2 parts
Ethyl acetate (solvent): 10.0 parts
(Dispersing/Suspending Step)
The following composition was dispersed with a ball mill for 24 hours to dissolve carboxymethylcellulose. Thus, an aqueous medium was obtained.
Calcium carbonate (coated with acrylic acid-based copolymer): 20.0 parts
Carboxymethylcellulose [Cellogen BS-H, manufactured by DAI-ICHI KOGYO SEIYAKU CO., LTD.]: 0.5 part
Ion-exchanged water: 99.5 parts
1,200 Parts of the aqueous medium was charged in a high-speed stirring apparatus T.K. Homomixer (manufactured by PRIMIX Corporation), and was then stirred at a circumferential speed of a rotating blade of 20 m/sec. During the stirring, 1,000 parts of the toner composition mixed liquid was charged into the aqueous medium. The mixture was stirred for 1 minute while being kept constant at 25° C. Thus, a suspension liquid was obtained.
(Solvent-Removing Step)
While 2,200 parts of the suspension liquid was stirred with a Fullzone blade [manufactured by Kobelco Eco-Solutions Co., Ltd.] at a circumferential speed of 45 m/min, the liquid temperature was kept constant at 40° C., and a vapor phase on the surface of the suspension liquid was forcedly aspirated with a blower to initiate solvent removal. At that time, 75 parts of ammonia water diluted to 1% as an ionic substance was added after a lapse of 15 minutes from the initiation of the solvent removal. Subsequently, 25 parts of the ammonia water was added after a lapse of 1 hour from the initiation of the solvent removal. Subsequently, 25 parts of the ammonia water was added after a lapse of 2 hours from the initiation of the solvent removal. Finally, 25 parts of the ammonia water was added after a lapse of 3 hours from the initiation of the solvent removal so that the total addition amount was 150 parts. In addition, the resultant liquid was held for 17 hours from the initiation of the solvent removal while the liquid temperature was kept at 40° C. Thus, a toner dispersion liquid in which the solvent (ethyl acetate) had been removed from the suspended particles was obtained.
(Washing/Dehydrating Step)
80 Parts of 10 mol/l hydrochloric acid was added to 300 parts of the toner dispersion liquid obtained in the solvent-removing step. In addition, the mixture was subjected to neutralization treatment with a 0.1 mol/l aqueous solution of sodium hydroxide. After that, washing with ion-exchanged water by suction filtration was repeated four times. Thus, a toner cake was obtained. The resultant toner cake was dried with a vacuum dryer and sifted with a sieve having an opening of 45 μm. Thus, toner particles were obtained. Any operation hereafter was the same as that in Yellow Toner Production Example 1 of Example 7. Thus, a yellow toner (Tnr-Y202) of the present invention was obtained.
<Yellow Toner Production Example 5>
A yellow toner (Tnr-Y201) and yellow toners (Tnr-Y203) to (Tnr-Y233) of the present invention were obtained by performing the same operations as those in Yellow Toner Production Example 4 described above except that the compound (102) having a colorant skeleton structure was changed to the compound (101) and the compounds (103) to (133), respectively.
<Yellow Toner Production Example 6>
Yellow toners (Tnr-Y251) and (Tnr-Y252) of the present invention were obtained by performing the same operations as those in Yellow Toner Production Example 4 described above except that C.I. Pigment Yellow 155 represented by the formula (Pig-A) was changed to C.I. Pigment Yellow 180 represented by the formula (Pig-B) and C.I. Pigment Yellow 185 represented by the formula (Pig-C), respectively.

Comparative Example 4-5

A reference yellow toner providing a reference value for an evaluation and a comparative yellow toner were produced by the following methods.
<Reference Yellow Toner Production Example 2>
A reference yellow toner (Tnr-Y253) was obtained by performing the same operations as those in Yellow Toner Production Example 4 described above except that the compound (102) having a colorant skeleton structure was not added.

<Reference Yellow Toner Production Example 3>

Reference yellow toners (Tnr-Y254) and (Tnr-Y255) were obtained by performing the same operations as those in Yellow Toner Production Example 6 described above except that the compound (102) having a colorant skeleton structure was not added.

<Comparative Yellow Toner Production Example 2>

Comparative yellow toners (Tnr-Y256) to (Tnr-Y260) were obtained by performing the same operations as those in Yellow Toner Production Example 4 described above except that the compound (102) having a colorant skeleton structure was changed to the comparative compound (134) (comparative compound 1).

Example 8-6

Next, a magenta toner based on a suspension granulation method was produced by the following method.

<Magenta Toner Production Example 4>

A magenta toner (Tnr-M202) of the present invention was obtained by performing the same operations as those in Yellow Toner Production Example 4 described above except that C.I. Pigment Yellow 155 (yellow pigment a) represented by the formula (Pig-A) was changed to C.I. Pigment Red 122 represented by the formula (Pig-D).

<Magenta Toner Production Example 5>

A magenta toner (Tnr-M201) and magenta toners (Tnr-M203) to (Tnr-M233) of the present invention were obtained by performing the same operations as those in Magenta Toner Production Example 4 described above except that the compound (102) having a colorant skeleton structure was changed to the compound (101) and the compounds (103) to (133), respectively.

<Magenta Toner Production Example 6>

Magenta toners (Tnr-M251) and (Tnr-M252) of the present invention were obtained by performing the same operations as those in Magenta Toner Production Example 4 described above except that C.I. Pigment Red 122 represented by the formula (Pig-D) was changed to C.I. Pigment Red 255 represented by the formula (Pig-E) and C.I. Pigment Red 150 (magenta pigment c) represented by the formula (Pig-F), respectively.

Comparative Example 4-6

A reference magenta toner providing a reference value for an evaluation and a comparative magenta toner were produced by the following methods.

<Reference Magenta Toner Production Example 2>

A reference magenta toner (Tnr-M253) was obtained by performing the same operations as those in Magenta Toner Production Example 4 described above except that the compound (102) having a colorant skeleton structure was not added.

<Reference Magenta Toner Production Example 3>

Reference magenta toners (Tnr-M254) and (Tnr-M255) were obtained by performing the same operations as those in Magenta Toner Production Example 6 described above except that the compound (102) having a colorant skeleton structure was not added.

<Comparative Magenta Toner Production Example 2>

Comparative magenta toners (Tnr-M256) to (Tnr-M260) were obtained by performing the same operations as those in Magenta Toner Production Example 4 described above except that the compound (102) having a colorant skeleton structure was changed to the comparative compound (134) (comparative compound 1), the comparative compound 2, the comparative compound 3, the comparative compound 4, and the comparative compound 5, respectively.

Example 8-7

Next, a cyan toner based on a suspension granulation method was produced by the following method.

<Cyan Toner Production Example 4>

A cyan toner (Tnr-C202) of the present invention was obtained by performing the same operations as those in Yellow Toner Production Example 4 described above except that C.I. Pigment Yellow 155 represented by the formula (Pig-A) was changed to C.I. Pigment Blue 15:3 represented by the formula (Pig-G).

<Cyan Toner Production Example 5>

A cyan toner (Tnr-C201) and cyan toners (Tnr-C203) to (Tnr-C233) of the present invention were obtained by performing the same operations as those in Cyan Toner Production Example 4 described above except that the compound (102) having a colorant skeleton structure was changed to the compound (101) and the compounds (103) to (133), respectively.

<Cyan Toner Production Example 6>

Cyan toners (Tnr-C251) and (Tnr-C252) of the present invention were obtained by performing the same operations as those in Cyan Toner Production Example 4 described above except that C.I. Pigment Blue 15:3 represented by the formula (Pig-G) was changed to C.I. Pigment Blue 16 represented by the formula (Pig-H) and C.I. Pigment Blue 17:1 represented by the formula (Pig-I), respectively.

Comparative Example 4-7

A reference cyan toner providing a reference value for an evaluation and a comparative cyan toner were produced by the following methods.

<Reference Cyan Toner Production Example 2>

A reference cyan toner (Tnr-C253) was obtained by performing the same operations as those in Cyan Toner Production Example 4 described above except that the compound (102) having a colorant skeleton structure was not added.

<Reference Cyan Toner Production Example 3>

Reference cyan toners (Tnr-C254) and (Tnr-C255) were obtained by performing the same operations as those in Cyan Toner Production Example 6 described above except that the compound (102) having a colorant skeleton structure was not added.

<Comparative Cyan Toner Production Example 2>

Comparative cyan toners (Tnr-C256) to (Tnr-C260) were obtained by performing the same operations as those in Cyan Toner Production Example 4 described above except that the compound (102) having a colorant skeleton structure was changed to the comparative compound (134) (comparative compound 1), the comparative compound 2, the comparative compound 3, the comparative compound 4, and the comparative compound 5, respectively.

Example 8-8

Next, a black toner based on a suspension granulation method was produced by the following method.

<Black Toner Production Example 4>

A black toner (Tnr-Bk202) of the present invention was obtained by performing the same operations as those in Yellow Toner Production Example 4 described above except that 12 parts of C.I. Pigment Yellow 155 represented by the formula (Pig-A) and 1.2 parts of the compound (102) having a colorant skeleton structure were changed to 30 parts of a carbon black (specific surface area=65 m$^2$/g, average particle diameter=30 nm, pH=9.0) and 3.0 parts of the compound (102) having a colorant skeleton structure, respectively.

<Black Toner Production Example 5>

A black toner (Tnr-Bk201) and black toners (Tnr-Bk203) to (Tnr-Bk233) of the present invention were obtained by performing the same operations as those in Black Toner Production Example 4 described above except that the compound (102) having a colorant skeleton structure was changed to the compound (101) and the compounds (103) to (133), respectively.

<Black Toner Production Example 6>

Black toners (Tnr-Bk251) and (Tnr-Bk252) of the present invention were obtained by performing the same operations as those in Black Toner Production Example 4 described above except that the carbon black (specific surface area=65 m$^2$/g, average particle diameter=30 nm, pH=9.0) was changed to a carbon black (specific surface area=77 m$^2$/g, average particle diameter=28 nm, pH=7.5) and a carbon black (specific surface area=370 m$^2$/g, average particle diameter=13 nm, pH=3.0), respectively.

Comparative Example 4-8

A reference black toner providing a reference value for an evaluation and a comparative black toner were produced by the following methods.

<Reference Black Toner Production Example 2>

A reference black toner (Tnr-Bk253) was obtained by performing the same operations as those in Black Toner Production Example 4 described above except that the compound (102) having a colorant skeleton structure was not added.

<Reference Black Toner Production Example 3>

Reference black toners (Tnr-Bk254) and (Tnr-Bk255) were obtained by performing the same operations as those in Black Toner Production Example 6 described above except that the compound (102) having a colorant skeleton structure was not added.

<Comparative Black Toner Production Example 2>

Comparative black toners (Tnr-Bk256) to (Tnr-Bk260) were obtained by performing the same operations as those in Black Toner Production Example 4 described above except that the compound (102) having a colorant skeleton structure was changed to the comparative compound (134) (comparative compound 1), the comparative compound 2, the comparative compound 3, the comparative compound 4, and the comparative compound 5, respectively.

Example 9

The yellow toners, magenta toners, cyan toners, and black toners obtained by the above-mentioned method were evaluated by the following method.

<Evaluation of Toner for Coloring Power>

Image samples were output with the yellow toners (Tnr-Y101) to (Tnr-Y133), (Tnr-Y151) to (Tnr-Y155), (Tnr-Y201) to (Tnr-Y233), and (Tnr-Y251) to (Tnr-Y255), the magenta toners (Tnr-M101) to (Tnr-M133), (Tnr-M151) to (Tnr-M155), (Tnr-M201) to (Tnr-M233), and (Tnr-M251) to (Tnr-M255), the cyan toners (Tnr-C101) to (Tnr-C133), (Tnr-C151) to (Tnr-C155), (Tnr-C201) to (Tnr-C233), and (Tnr-C251) to (Tnr-C255), and the black toners (Tnr-Bk101) to (Tnr-Bk133), (Tnr-Bk151) to (Tnr-Bk155), (Tnr-Bk201) to (Tnr-Bk233), and (Tnr-Bk251) to (Tnr-Bk255), and subjected to comparative evaluations for image characteristics to be described later. It should be noted that in the comparison of the image characteristics, a paper-feeding durability test was performed using a remodeled machine of LBP-5300 [manufactured by Canon Inc.] as an image-forming apparatus (hereinafter sometimes referred to as "LBP"). Details of the remodeling were as follows: a developing blade in a process cartridge (hereinafter sometimes referred to as "CRG") was exchanged to an SUS blade having a thickness of 8 (μm); and the apparatus was configured so as to be able to apply a blade bias of −200 (V) with respect to a developing bias to be applied to a developing roller as a toner bearing member.

Under a normal-temperature and normal-humidity [N/N (23.5° C., 60% RH)] environment, a solid image having a toner laid-on level of 0.5 mg/cm$^2$ was produced on transfer paper (75-g/m$^2$ paper). The solid image was measured for its density with a reflection densitometer Spectrolino (manufactured by GretagMacbeth). The coloring power of each toner was evaluated based on the increase ratio of the solid image density.

The increase ratios of the solid image densities of the yellow toners (Tnr-Y101) to (Tnr-Y133) were determined by using the solid image density of the reference yellow toner (Tnr-Y153) as a reference value. The increase ratio of the solid image density of the yellow toner (Tnr-Y151) was determined by using the solid image density of the reference yellow toner (Tnr-Y154) as a reference value. The increase ratio of the solid image density of the yellow toner (Tnr-Y152) was determined by using the solid image density of the reference yellow toner (Tnr-Y155) as a reference value.

The increase ratios of the solid image densities of the yellow toners (Tnr-Y201) to (Tnr-Y233) were determined by using the solid image density of the reference yellow toner (Tnr-Y253) as a reference value. The increase ratio of the solid image density of the yellow toner (Tnr-Y251) was determined by using the solid image density of the reference yellow toner (Tnr-Y254) as a reference value. The increase ratio of the solid image density of the yellow toner (Tnr-Y252) was determined by using the solid image density of the reference yellow toner (Tnr-Y255) as a reference value.

The increase ratios of the solid image densities of the magenta toners (Tnr-M101) to (Tnr-M133) were determined by using the solid image density of the reference magenta toner (Tnr-M153) as a reference value. The increase ratio of the solid image density of the magenta toner (Tnr-M151) was determined by using the solid image density of the reference magenta toner (Tnr-M154) as a reference value. The increase ratio of the solid image density of the magenta toner (Tnr-M152) was determined by using the solid image density of the reference magenta toner (Tnr-M155) as a reference value.

The increase ratios of the solid image densities of the magenta toners (Tnr-M201) to (Tnr-M233) were determined by using the solid image density of the reference magenta toner (Tnr-M253) as a reference value. The increase ratio of the solid image density of the magenta toner (Tnr-M251) was determined by using the solid image density of the reference magenta toner (Tnr-M254) as a reference value. The increase ratio of the solid image density of the magenta toner (Tnr-M252) was determined by using the solid image density of the reference magenta toner (Tnr-M255) as a reference value.

The increase ratios of the solid image densities of the cyan toners (Tnr-C101) to (Tnr-C133) were determined by using the solid image density of the reference cyan toner (Tnr- C153) as a reference value. The increase ratio of the solid image density of the cyan toner (Tnr-C151) was determined by using the solid image density of the reference cyan toner (Tnr-C154) as a reference value. The increase ratio of the solid image density of the cyan toner (Tnr-C152) was determined by using the solid image density of the reference cyan toner (Tnr-C155) as a reference value.

The increase ratios of the solid image densities of the cyan toners (Tnr-C201) to (Tnr-C233) were determined by using the solid image density of the reference cyan toner (Tnr-C253) as a reference value. The increase ratio of the solid image density of the cyan toner (Tnr-C251) was determined by using the solid image density of the reference cyan toner (Tnr-C254) as a reference value. The increase ratio of the solid image density of the cyan toner (Tnr-C252) was determined by using the solid image density of the reference cyan toner (Tnr-C255) as a reference value.

The increase ratios of the solid image densities of the black toners (Tnr-Bk101) to (Tnr-Bk133) were determined by using the solid image density of the reference black toner (Tnr-Bk153) as a reference value. The increase ratio of the solid image density of the black toner (Tnr-Bk151) was determined by using the solid image density of the reference black toner (Tnr-Bk154) as a reference value. The increase ratio of the solid image density of the black toner (Tnr-Bk152) was determined by using the solid image density of the reference black toner (Tnr-Bk155) as a reference value.

The increase ratios of the solid image densities of the black toners (Tnr-Bk201) to (Tnr-Bk233) were determined by using the solid image density of the reference black toner (Tnr-Bk253) as a reference value. The increase ratio of the solid image density of the black toner (Tnr-Bk251) was determined by using the solid image density of the reference black toner (Tnr-Bk254) as a reference value. The increase ratio of the solid image density of the black toner (Tnr-Bk252) was determined by using the solid image density of the reference black toner (Tnr-Bk255) as a reference value.

Evaluation criteria for the increase ratios of the solid image densities of the toners of the respective colors are shown below.
Evaluation Criteria for Increase Ratio of Solid Image Density of Yellow Toner
A: The increase ratio of a solid image density is 5% or more.
B: The increase ratio of a solid image density is 1% or more and less than 5%.
C: The increase ratio of a solid image density is 0% or more and less than 1%.
D: A solid image density reduces.

The coloring power was judged as satisfactory when the increase ratio of a solid image density was 1% or more.
Evaluation Criteria for Increase Ratio of Solid Image Density of Magenta Toner
A: The increase ratio of a solid image density is 20% or more.
B: The increase ratio of a solid image density is 10% or more and less than 20%.
C: The increase ratio of a solid image density is 5% or more and less than 10%.
D: The increase ratio of a solid image density is less than 5%.

The coloring power was judged as satisfactory when the increase ratio of a solid image density was 10% or more.
Evaluation Criteria for Increase Ratio of Solid Image Density of Cyan Toner
A: The increase ratio of a solid image density is 30% or more.
B: The increase ratio of a solid image density is 20% or more and less than 30%.
C: The increase ratio of a solid image density is 10% or more and less than 20%.
D: The increase ratio of a solid image density is less than 10%.

The coloring power was judged as satisfactory when the increase ratio of a solid image density was 20% or more.
Evaluation Criteria for Increase Ratio of Solid Image Density of Black Toner
A: The increase ratio of a solid image density is 60% or more.
B: The increase ratio of a solid image density is 40% or more and less than 60%.
C: The increase ratio of a solid image density is 20% or more and less than 40%.
D: The increase ratio of a solid image density is less than 20%.

The coloring power was judged as satisfactory when the increase ratio of a solid image density was 40% or more.

Comparative Example 5

The comparative yellow toners (Tnr-Y156) to (Tnr-Y160) and (Tnr-Y256) to (Tnr-Y260), the comparative magenta toners (Tnr-M156) to (Tnr-M160) and (Tnr-M256) to (Tnr-M260), the comparative cyan toners (Tnr-C156) to (Tnr-C160) and (Tnr-C256) to (Tnr-C260), and the comparative black toners (Tnr-Bk156) to (Tnr-Bk160) and (Tnr-Bk256) to (Tnr-Bk260) were each evaluated for its coloring power by the same method as that of Example 8.

The increase ratios of the solid image densities of the comparative yellow toners (Tnr-Y156) to (Tnr-Y160) were determined by using the solid image density of the reference yellow toner (Tnr-Y153) as a reference value.

The increase ratios of the solid image densities of the comparative yellow toners (Tnr-Y256) to (Tnr-Y260) were determined by using the solid image density of the reference yellow toner (Tnr-Y253) as a reference value.

The increase ratios of the solid image densities of the comparative magenta toners (Tnr-M156) to (Tnr-M160) were determined by using the solid image density of the reference magenta toner (Tnr-M153) as a reference value.

The increase ratios of the solid image densities of the comparative magenta toners (Tnr-M256) to (Tnr-M260) were determined by using the solid image density of the reference magenta toner (Tnr-M253) as a reference value.

The increase ratios of the solid image densities of the comparative cyan toners (Tnr-C156) to (Tnr-C160) were determined by using the solid image density of the reference cyan toner (Tnr-C153) as a reference value.

The increase ratios of the solid image densities of the comparative cyan toners (Tnr-C256) to (Tnr-C260) were determined by using the solid image density of the reference cyan toner (Tnr-C253) as a reference value.

The increase ratios of the solid image densities of the comparative black toners (Tnr-Bk156) to (Tnr-Bk160) were determined by using the solid image density of the reference black toner (Tnr-Bk153) as a reference value.

The increase ratios of the solid image densities of the comparative black toners (Tnr-Bk256) to (Tnr-Bk260) were determined by using the solid image density of the reference black toner (Tnr-Bk253) as a reference value.

Table 4 shows the results of the coloring power evaluations of the toners of the respective colors based on the suspension polymerization method, and Table 5 shows the results of the coloring power evaluations of the toners of the respective colors based on the suspension granulation method.

TABLE 4

Result of evaluation of suspension polymerization toner

| Compound No. | Yellow Toner | Coloring power | Magenta Toner | Coloring power | Cyan Toner | Coloring power | Black Toner | Coloring power |
|---|---|---|---|---|---|---|---|---|
| 101 | Tnr-Y101 | A | Tnr-M101 | A | Tnr-C101 | A | Tnr-Bk101 | A |
| 102 | Tnr-Y102 | A | Tnr-M102 | A | Tnr-C102 | A | Tnr-Bk102 | A |
| 103 | Tnr-Y103 | A | Tnr-M103 | A | Tnr-C103 | A | Tnr-Bk103 | A |
| 104 | Tnr-Y104 | A | Tnr-M104 | A | Tnr-C104 | A | Tnr-Bk104 | A |
| 105 | Tnr-Y105 | A | Tnr-M105 | A | Tnr-C105 | A | Tnr-Bk105 | A |
| 106 | Tnr-Y106 | A | Tnr-M106 | A | Tnr-C106 | A | Tnr-Bk106 | A |
| 107 | Tnr-Y107 | A | Tnr-M107 | A | Tnr-C107 | A | Tnr-Bk107 | A |
| 108 | Tnr-Y108 | A | Tnr-M108 | A | Tnr-C108 | A | Tnr-Bk108 | A |
| 109 | Tnr-Y109 | A | Tnr-M109 | A | Tnr-C109 | A | Tnr-Bk109 | A |
| 110 | Tnr-Y110 | A | Tnr-M110 | A | Tnr-C110 | A | Tnr-Bk110 | A |
| 111 | Tnr-Y111 | A | Tnr-M111 | A | Tnr-C111 | A | Tnr-Bk111 | A |
| 112 | Tnr-Y112 | A | Tnr-M112 | A | Tnr-C112 | A | Tnr-Bk112 | A |
| 113 | Tnr-Y113 | A | Tnr-M113 | A | Tnr-C113 | A | Tnr-Bk113 | A |
| 114 | Tnr-Y114 | A | Tnr-M114 | A | Tnr-C114 | A | Tnr-Bk114 | A |
| 115 | Tnr-Y115 | A | Tnr-M115 | A | Tnr-C115 | A | Tnr-Bk115 | A |
| 116 | Tnr-Y116 | A | Tnr-M116 | A | Tnr-C116 | A | Tnr-Bk116 | A |
| 117 | Tnr-Y117 | A | Tnr-M117 | A | Tnr-C117 | A | Tnr-Bk117 | A |
| 118 | Tnr-Y118 | A | Tnr-M118 | A | Tnr-C118 | A | Tnr-Bk118 | A |
| 119 | Tnr-Y119 | A | Tnr-M119 | A | Tnr-C119 | A | Tnr-Bk119 | A |
| 120 | Tnr-Y120 | A | Tnr-M120 | A | Tnr-C120 | A | Tnr-Bk120 | A |
| 121 | Tnr-Y121 | A | Tnr-M121 | A | Tnr-C121 | A | Tnr-Bk121 | A |
| 122 | Tnr-Y122 | A | Tnr-M122 | A | Tnr-C122 | A | Tnr-Bk122 | A |
| 123 | Tnr-Y123 | A | Tnr-M123 | A | Tnr-C123 | A | Tnr-Bk123 | A |
| 124 | Tnr-Y124 | A | Tnr-M124 | A | Tnr-C124 | A | Tnr-Bk124 | A |
| 125 | Tnr-Y125 | A | Tnr-M125 | A | Tnr-C125 | A | Tnr-Bk125 | A |
| 126 | Tnr-Y126 | A | Tnr-M126 | A | Tnr-C126 | A | Tnr-Bk126 | A |
| 127 | Tnr-Y127 | A | Tnr-M127 | A | Tnr-C127 | A | Tnr-Bk127 | A |
| 128 | Tnr-Y128 | A | Tnr-M128 | A | Tnr-C128 | A | Tnr-Bk128 | A |
| 129 | Tnr-Y129 | A | Tnr-M129 | A | Tnr-C129 | A | Tnr-Bk129 | A |
| 130 | Tnr-Y130 | A | Tnr-M130 | A | Tnr-C130 | A | Tnr-Bk130 | A |
| 131 | Tnr-Y131 | A | Tnr-M131 | A | Tnr-C131 | A | Tnr-Bk131 | A |
| 132 | Tnr-Y132 | A | Tnr-M132 | A | Tnr-C132 | A | Tnr-Bk132 | A |
| 133 | Tnr-Y133 | A | Tnr-M133 | A | Tnr-C133 | A | Tnr-Bk133 | A |
| 101 | Tnr-Y151 | A | Tnr-M151 | A | Tnr-C151 | A | Tnr-Bk151 | A |
| 101 | Tnr-Y152 | A | Tnr-M152 | A | Tnr-C152 | A | Tnr-Bk152 | A |
| None | Tnr-Y153 | — | Tnr-M153 | — | Tnr-C153 | — | Tnr-Bk153 | — |
| None | Tnr-Y154 | — | Tnr-M154 | — | Tnr-C154 | — | Tnr-Bk154 | — |
| None | Tnr-Y155 | — | Tnr-M155 | — | Tnr-C155 | — | Tnr-Bk155 | — |
| Comparative compound (1) | Tnr-Y156 | B | Tnr-M156 | A | Tnr-C156 | B | Tnr-Bk156 | A |
| Comparative compound (2) | Tnr-Y157 | B | Tnr-M157 | A | Tnr-C157 | B | Tnr-Bk157 | A |
| Comparative compound (3) | Tnr-Y158 | D | Tnr-M158 | B | Tnr-C158 | D | Tnr-Bk158 | D |
| Comparative compound (4) | Tnr-Y159 | D | Tnr-M159 | D | Tnr-C159 | C | Tnr-Bk159 | D |
| Comparative compound (5) | Tnr-Y160 | D | Tnr-M160 | D | Tnr-C160 | D | Tnr-Bk160 | D |

TABLE 5

Result of evaluation of suspension granulation toner

| Compound No. | Yellow Toner | Coloring power | Magenta Toner | Coloring power | Cyan Toner | Coloring power | Black Toner | Coloring power |
|---|---|---|---|---|---|---|---|---|
| 101 | Tnr-Y201 | A | Tnr-M201 | A | Tnr-C201 | A | Tnr-Bk201 | A |
| 102 | Tnr-Y202 | A | Tnr-M202 | A | Tnr-C202 | A | Tnr-Bk202 | A |
| 103 | Tnr-Y203 | A | Tnr-M203 | A | Tnr-C203 | A | Tnr-Bk203 | A |
| 104 | Tnr-Y204 | A | Tnr-M204 | A | Tnr-C204 | A | Tnr-Bk204 | A |
| 105 | Tnr-Y205 | A | Tnr-M205 | A | Tnr-C205 | A | Tnr-Bk205 | A |
| 106 | Tnr-Y206 | A | Tnr-M206 | A | Tnr-C206 | A | Tnr-Bk206 | A |
| 107 | Tnr-Y207 | A | Tnr-M207 | A | Tnr-C207 | A | Tnr-Bk207 | A |
| 108 | Tnr-Y208 | A | Tnr-M208 | A | Tnr-C208 | A | Tnr-Bk208 | A |
| 109 | Tnr-Y209 | A | Tnr-M209 | A | Tnr-C209 | A | Tnr-Bk209 | A |
| 110 | Tnr-Y210 | A | Tnr-M210 | A | Tnr-C210 | A | Tnr-Bk210 | A |

TABLE 5-continued

Result of evaluation of suspension granulation toner

| Compound No. | Yellow Toner | Coloring power | Magenta Toner | Coloring power | Cyan Toner | Coloring power | Black Toner | Coloring power |
|---|---|---|---|---|---|---|---|---|
| 111 | Tnr-Y211 | A | Tnr-M211 | A | Tnr-C211 | A | Tnr-Bk211 | A |
| 112 | Tnr-Y212 | A | Tnr-M212 | A | Tnr-C212 | A | Tnr-Bk212 | A |
| 113 | Tnr-Y213 | A | Tnr-M213 | A | Tnr-C213 | A | Tnr-Bk213 | A |
| 114 | Tnr-Y214 | A | Tnr-M214 | A | Tnr-C214 | A | Tnr-Bk214 | A |
| 115 | Tnr-Y215 | A | Tnr-M215 | A | Tnr-C215 | A | Tnr-Bk215 | A |
| 116 | Tnr-Y216 | A | Tnr-M216 | A | Tnr-C216 | A | Tnr-Bk216 | A |
| 117 | Tnr-Y217 | A | Tnr-M217 | A | Tnr-C217 | A | Tnr-Bk217 | A |
| 118 | Tnr-Y218 | A | Tnr-M218 | A | Tnr-C218 | A | Tnr-Bk218 | A |
| 119 | Tnr-Y219 | A | Tnr-M219 | A | Tnr-C219 | A | Tnr-Bk219 | A |
| 120 | Tnr-Y220 | A | Tnr-M220 | A | Tnr-C220 | A | Tnr-Bk220 | A |
| 121 | Tnr-Y221 | A | Tnr-M221 | A | Tnr-C221 | A | Tnr-Bk221 | A |
| 122 | Tnr-Y222 | A | Tnr-M222 | A | Tnr-C222 | A | Tnr-Bk222 | A |
| 123 | Tnr-Y223 | A | Tnr-M223 | A | Tnr-C223 | A | Tnr-Bk223 | A |
| 124 | Tnr-Y224 | A | Tnr-M224 | A | Tnr-C224 | A | Tnr-Bk224 | A |
| 125 | Tnr-Y225 | A | Tnr-M225 | A | Tnr-C225 | A | Tnr-Bk225 | A |
| 126 | Tnr-Y226 | A | Tnr-M226 | A | Tnr-C226 | A | Tnr-Bk226 | A |
| 127 | Tnr-Y227 | A | Tnr-M227 | A | Tnr-C227 | A | Tnr-Bk227 | A |
| 128 | Tnr-Y228 | A | Tnr-M228 | A | Tnr-C228 | A | Tnr-Bk228 | A |
| 129 | Tnr-Y229 | A | Tnr-M229 | A | Tnr-C229 | A | Tnr-Bk229 | A |
| 130 | Tnr-Y230 | A | Tnr-M230 | A | Tnr-C230 | A | Tnr-Bk230 | A |
| 131 | Tnr-Y231 | A | Tnr-M231 | A | Tnr-C231 | A | Tnr-Bk231 | A |
| 132 | Tnr-Y232 | A | Tnr-M232 | A | Tnr-C232 | A | Tnr-Bk232 | A |
| 133 | Tnr-Y233 | A | Tnr-M233 | A | Tnr-C233 | A | Tnr-Bk233 | A |
| 101 | Tnr-Y251 | A | Tnr-M251 | A | Tnr-C251 | A | Tnr-Bk251 | A |
| 101 | Tnr-Y252 | A | Tnr-M252 | A | Tnr-C252 | A | Tnr-Bk252 | A |
| None | Tnr-Y253 | — | Tnr-M253 | — | Tnr-C253 | — | Tnr-Bk253 | — |
| None | Tnr-Y254 | — | Tnr-M254 | — | Tnr-C254 | — | Tnr-Bk254 | — |
| None | Tnr-Y255 | — | Tnr-M255 | — | Tnr-C255 | — | Tnr-Bk255 | — |
| Comparative compound (1) | Tnr-Y256 | B | Tnr-M256 | A | Tnr-C256 | B | Tnr-Bk256 | A |
| Comparative compound (2) | Tnr-Y257 | B | Tnr-M257 | A | Tnr-C257 | B | Tnr-Bk257 | A |
| Comparative compound (3) | Tnr-Y258 | B | Tnr-M258 | B | Tnr-C258 | D | Tnr-Bk258 | D |
| Comparative compound (4) | Tnr-Y259 | D | Tnr-M259 | D | Tnr-C259 | B | Tnr-Bk259 | D |
| Comparative compound (5) | Tnr-Y260 | D | Tnr-M260 | D | Tnr-C260 | D | Tnr-Bk260 | D |

As is apparent from Table 4 and Table 5, it was confirmed that the use of the compound having a colorant skeleton structure obtained by the production method of the present invention provided a yellow toner, a magenta toner, a cyan toner, and a black toner each of which was improved in dispersibility of a pigment in a binder resin and had high coloring power.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-075124, filed Apr. 1, 2014, which is hereby incorporated by reference herein in its entirety.

What is claimed is:

1. A method of producing a compound represented by formula (1), comprising the steps of:
(a) polymerizing a vinyl-based polymerizable monomer represented by the formula (A) with a radical initiator having a protective group by living radical polymerization to provide a polymer having the protective group at a terminal thereof;
(b) hydrolyzing the protective group of the polymer having the protective group at a terminal thereof obtained by the step (a) to deprotect the polymer; and
(c) bonding the deprotected polymer obtained by the step (b) and a colorant to each other through a covalent bond:

in which X represents a polymer portion having a monomer unit derived from the vinyl-based polymerizable monomer represented by formula (A), L represents a linking group, and Y represents a colorant portion; and

in which $R_1$ represents a hydrogen atom or an alkyl group, and $R_2$ represents a phenyl group, a phenyl group having a substituent, a carboxy group, an alkoxycarbonyl group, or a carboxamide group,
wherein the vinyl-based polymerizable monomer comprises one of styrene and an acrylic acid ester.

2. The production method according to claim 1, wherein the living radical polymerization comprises one of atom transfer radical polymerization (ATRP) and reversible addition-fragmentation chain transfer (RAFT) polymerization.

3. The production method according to claim 1, wherein the protective group comprises one of a tert-butoxycarbonyl group and a benzoxycarbonyl group.

4. The production method according to claim 1, wherein the linking group L has one of a carboxylic acid ester bond and a carboxylic acid amide bond.

5. The production method according to claim 1, wherein the colorant comprises an azo colorant.

6. The production method according to claim 1, wherein a moiety -L-Y in which the colorant portion Y and the linking group L are bonded to each other is represented by formula (3):

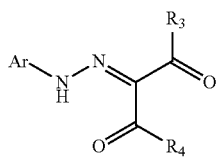

(3)

in which at least one of $R_3$, $R_4$, and Ar represents a functional group having bonded thereto the linking group L;

$R_3$ and $R_4$ when the linking group L is not bonded thereto each independently represent an alkyl group, an alkyl group having a substituent, a phenyl group, a phenyl group having a substituent, an $OR_5$ group, or an $NR_6R_7$ group, and $R_5$ to $R_7$ each independently represent a hydrogen atom, an alkyl group, a phenyl group, or an aralkyl group;

Ar when the linking group L is not bonded thereto represents an aryl group or an aryl group having a substituent;

when the linking group L is bonded to $R_3$, $R_3$ represents a group formed by removal of a hydrogen atom from the functional group that $R_3$ to which the linking group L is not bonded represents;

when the linking group L is bonded to $R_4$, $R_4$ represents a group formed by removal of a hydrogen atom from the functional group that $R_4$ to which the linking group L is not bonded represents; and when the linking group L is bonded to Ar, Ar represents a group formed by removal of a hydrogen atom from the functional group that Ar to which the linking group L is not bonded represents.

7. The production method according to claim 6, wherein the moiety -L-Y in which the colorant portion Y and the linking group L are bonded to each other is represented by formula (4):

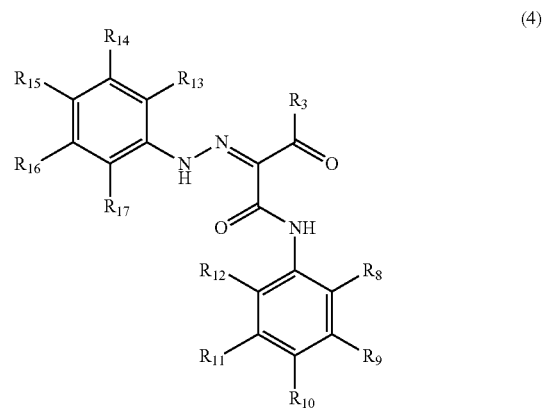

(4)

in which $R_3$ represents an alkyl group or a phenyl group; $R_8$ to $R_{12}$ and $R_{13}$ to $R_{17}$ satisfy at least one of the following condition (i) and (ii):
(i) at least one of $R_8$ to $R_{12}$ represents the linking group L; or
(ii) at least one of $R_{13}$ to $R_{17}$ represents the linking group L; and
when $R_8$ to $R_{12}$ and $R_{13}$ to $R_{17}$ do not represent the linking group L, $R_8$ to $R_{12}$ and $R_{13}$ to $R_{17}$ each independently represent a group represented by a hydrogen atom, a halogen atom, an alkyl group, an alkoxy group, a hydroxyl group, a cyano group, a trifluoromethyl group, a carboxy group, an alkoxycarbonyl group, an alkoxysulfonyl group, a sulfonate group, a carboxamide group, a sulofonamide group, a urea group, or a thiourea group, provided that the urea group may form a ring with two adjacent carbon atoms of $R_8$ to $R_{12}$ and $R_{13}$ to $R_{17}$ to provide a five-membered heterocycle.

8. A toner, comprising toner particles each containing a binder resin, a pigment and a compound, wherein the toner particles are produced by one of a suspension polymerization method and a suspension granulation method, and
the compound is represented by formula (1) produced by the method of claim 1.

* * * * *